Figure 1:
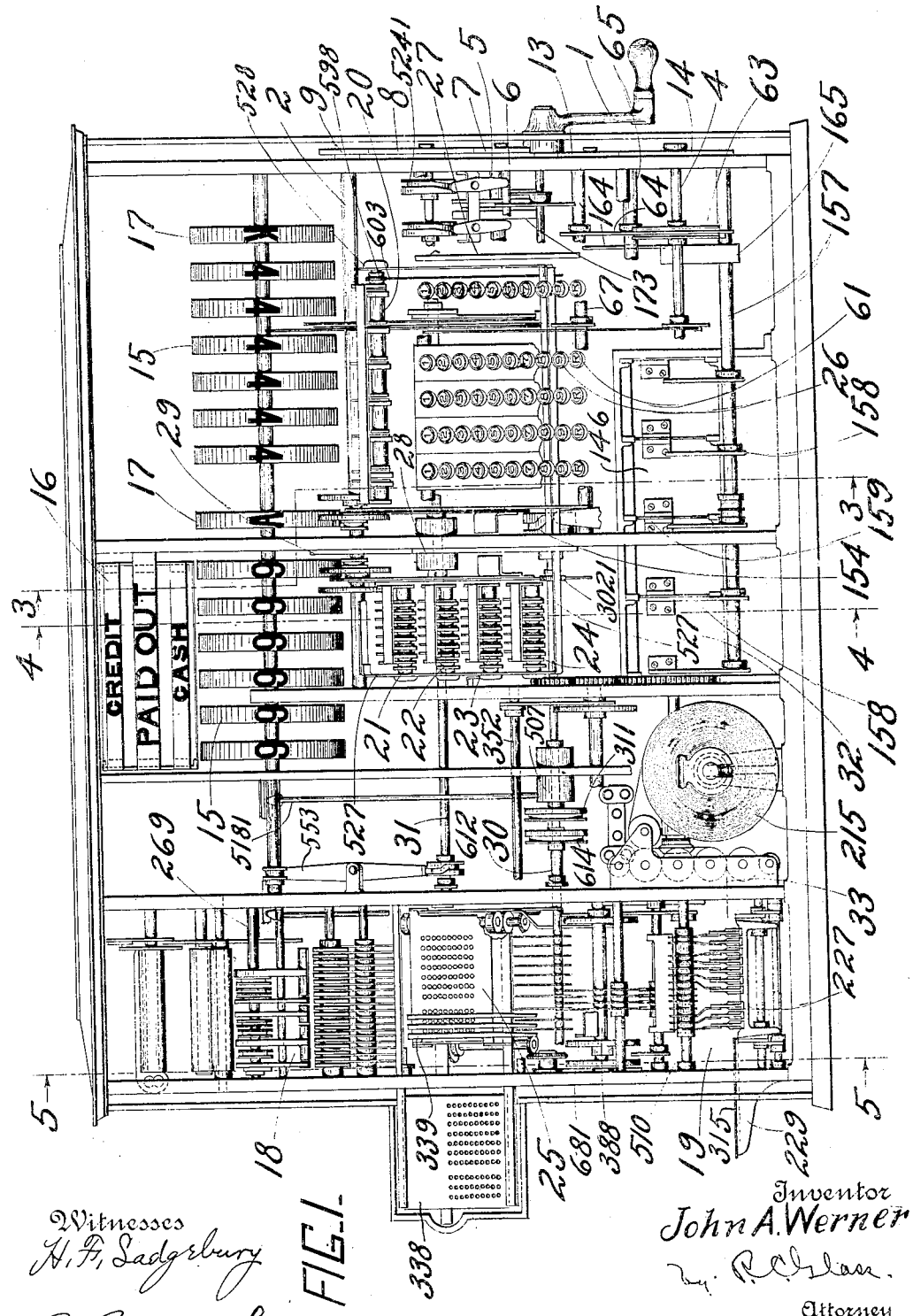

J. A. WERNER.
CASH AND CREDIT ACCOUNTING MACHINE.
APPLICATION FILED SEPT. 30, 1911.

1,205,298.

Patented Nov. 21, 1916.
48 SHEETS—SHEET 1.

Witnesses

Inventor
John A. Werner
Attorney

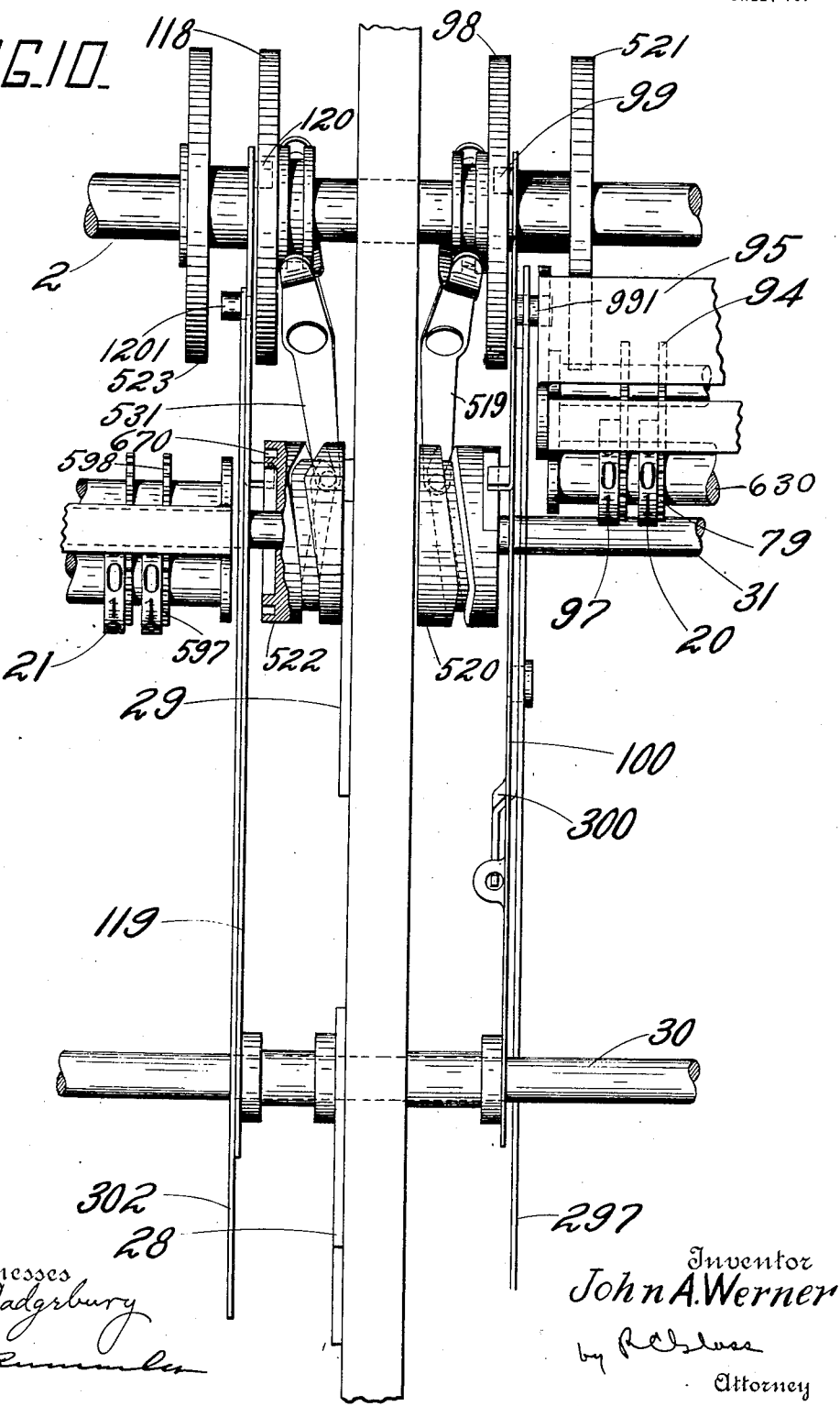

J. A. WERNER.
CASH AND CREDIT ACCOUNTING MACHINE.
APPLICATION FILED SEPT. 30, 1911.
1,205,298.
Patented Nov. 21, 1916.
48 SHEETS—SHEET 11.
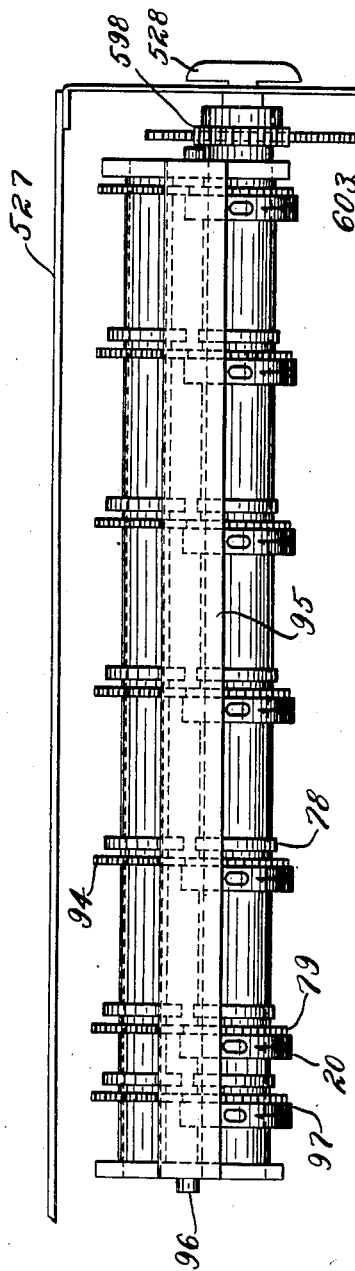
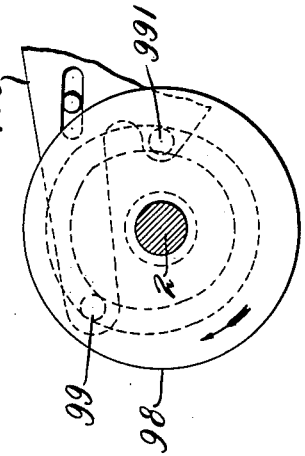
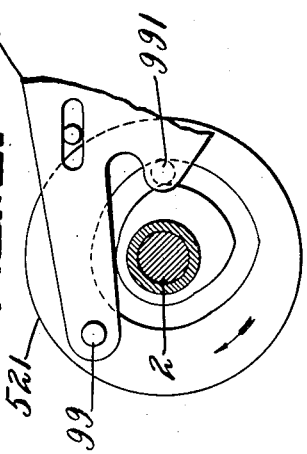
Witnesses
H. F. Sadgebury
J. B. Ricketts
Inventor
John A. Werner
by R. Ehlers
Chester H. Braselton
Attorneys

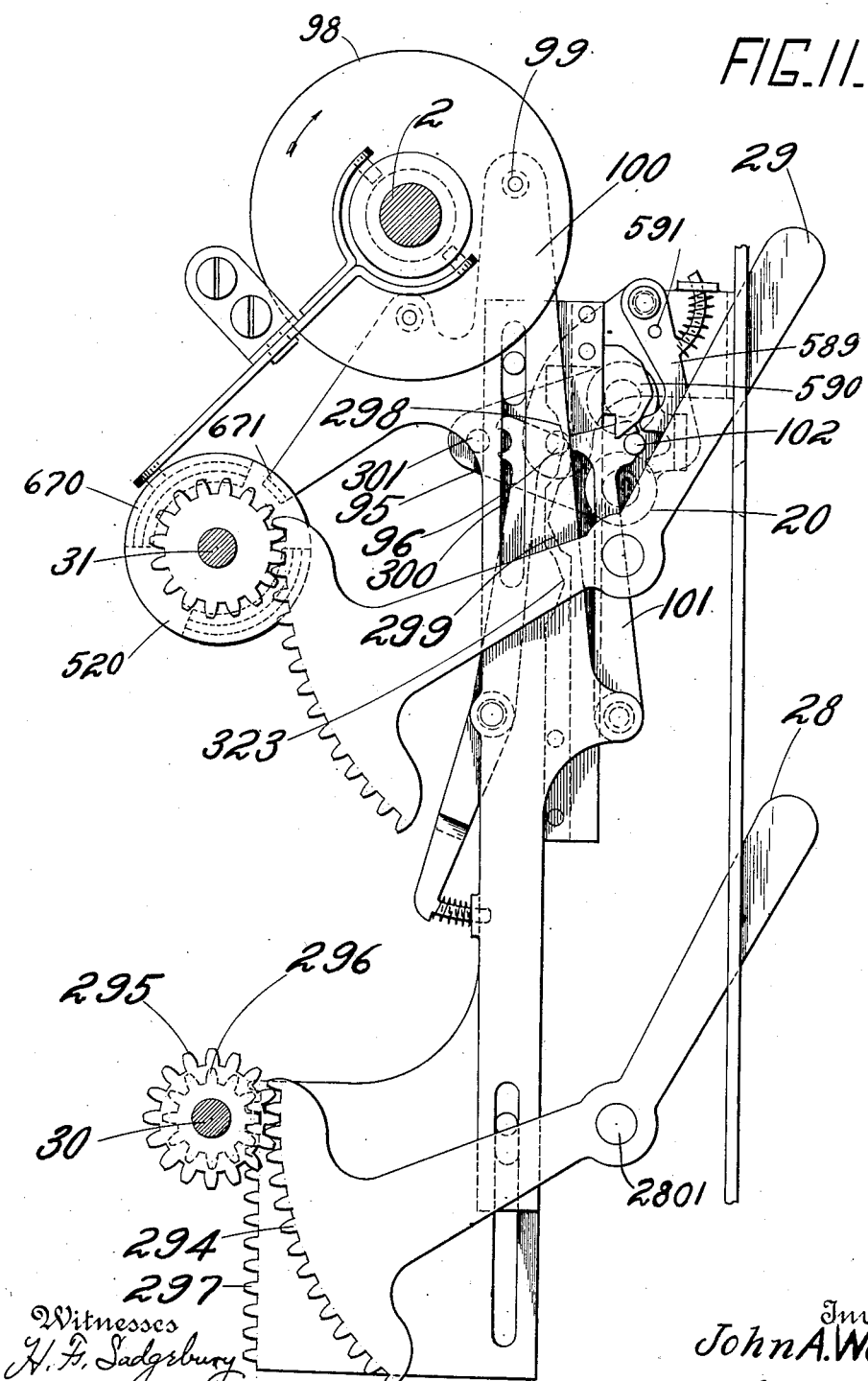

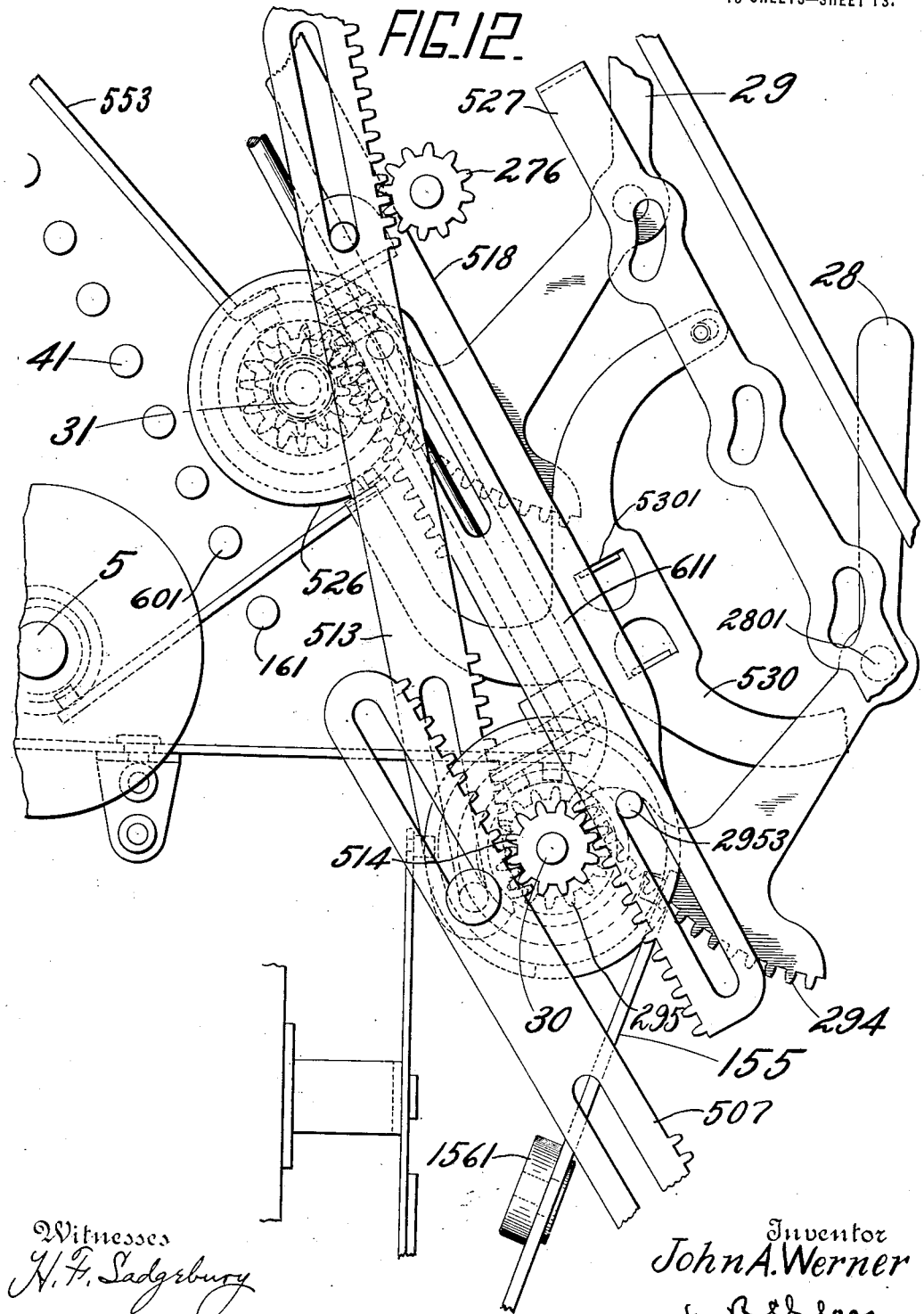

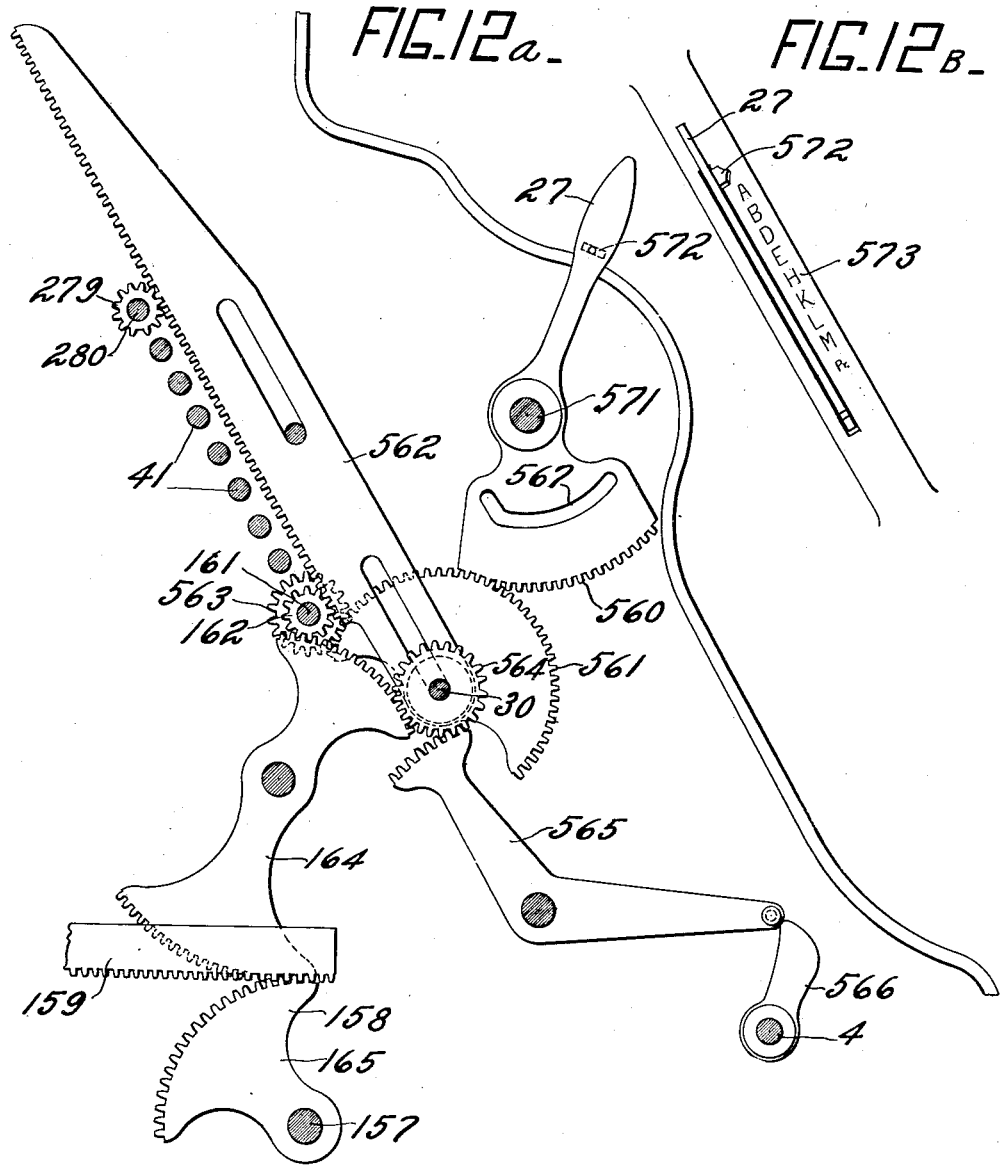

J. A. WERNER.
CASH AND CREDIT ACCOUNTING MACHINE.
APPLICATION FILED SEPT. 30, 1911.

1,205,298.

Patented Nov. 21, 1916.
48 SHEETS—SHEET 15.

INVENTOR
John A. Werner
BY
ATTORNEY

WITNESSES:

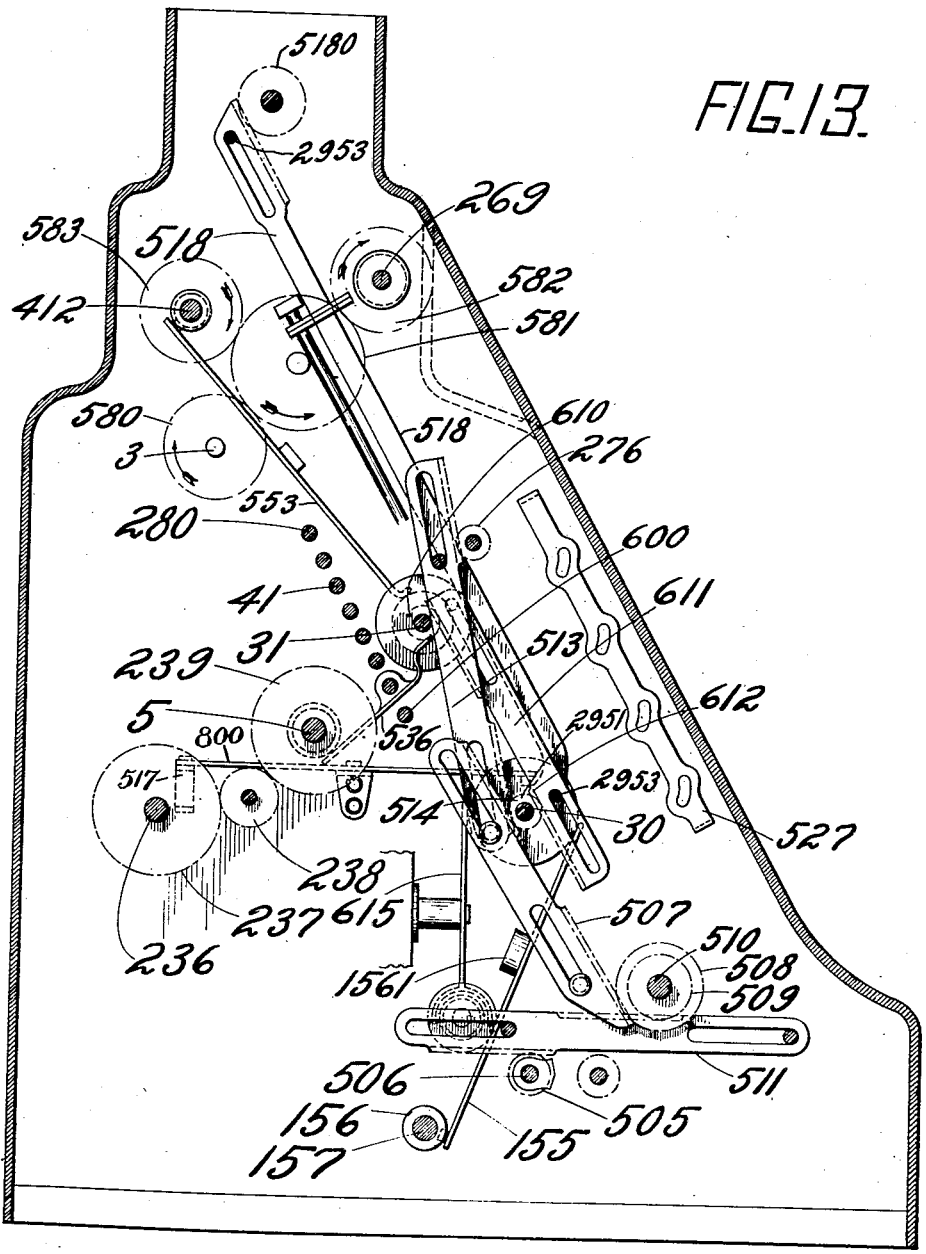

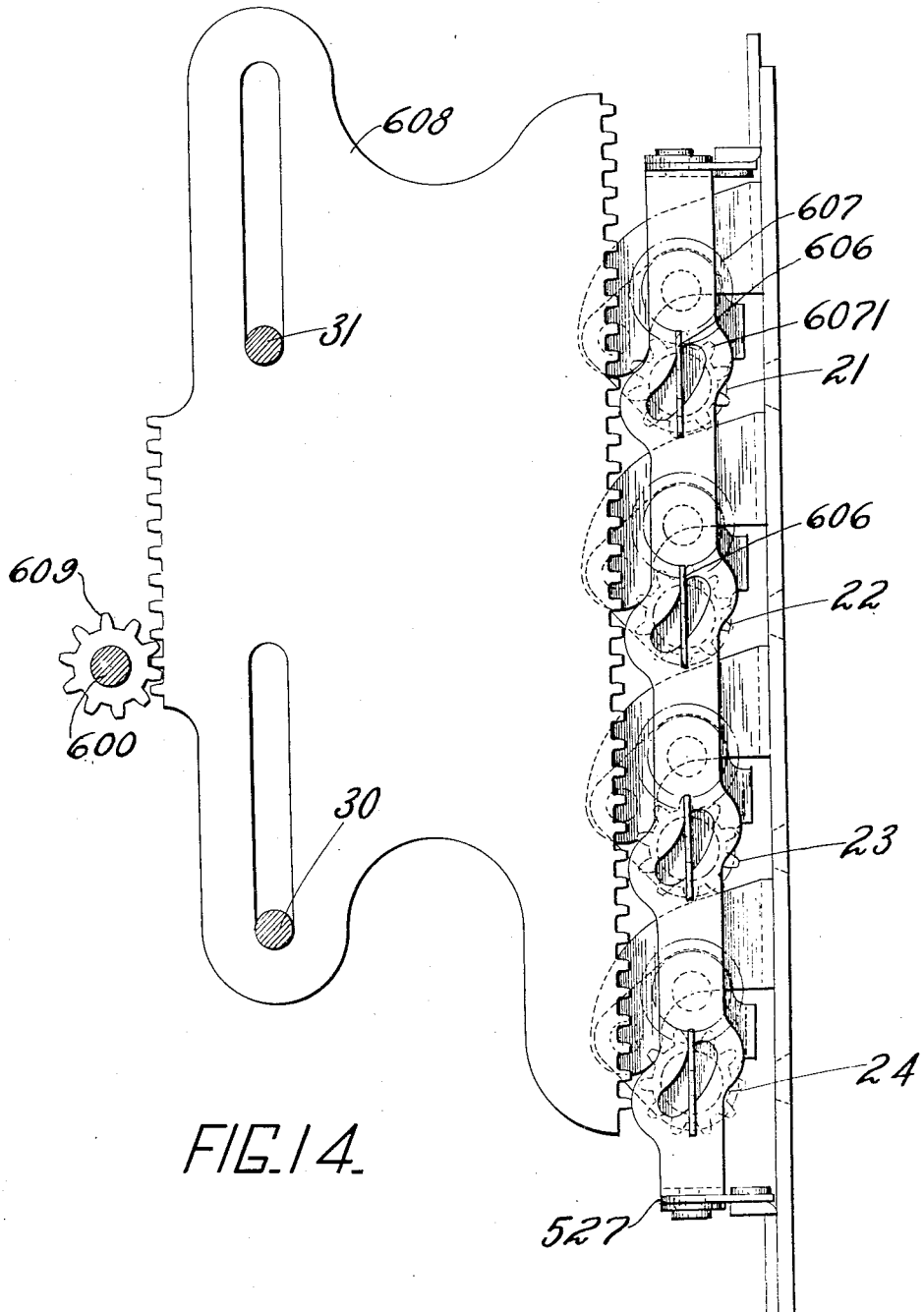

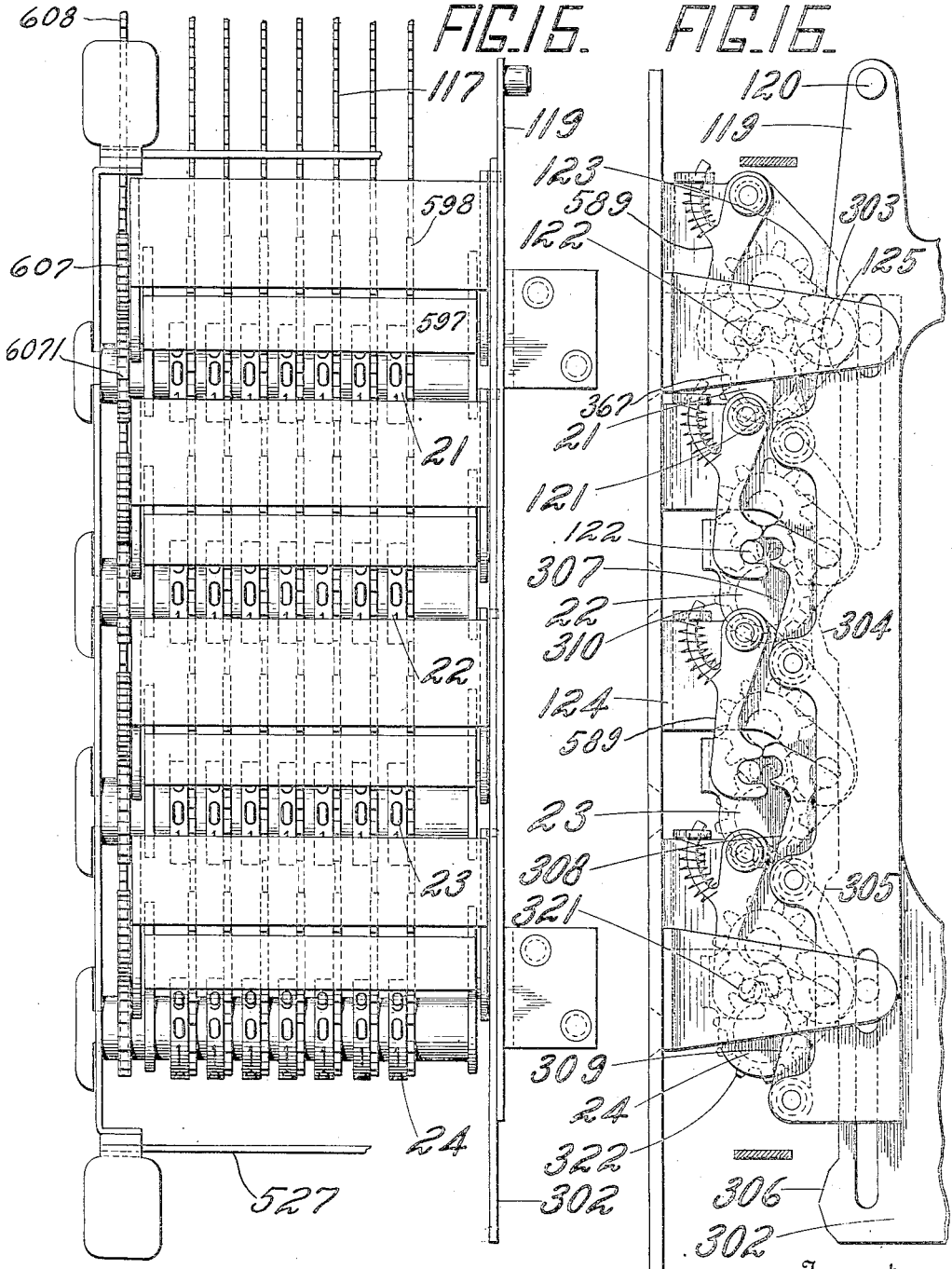

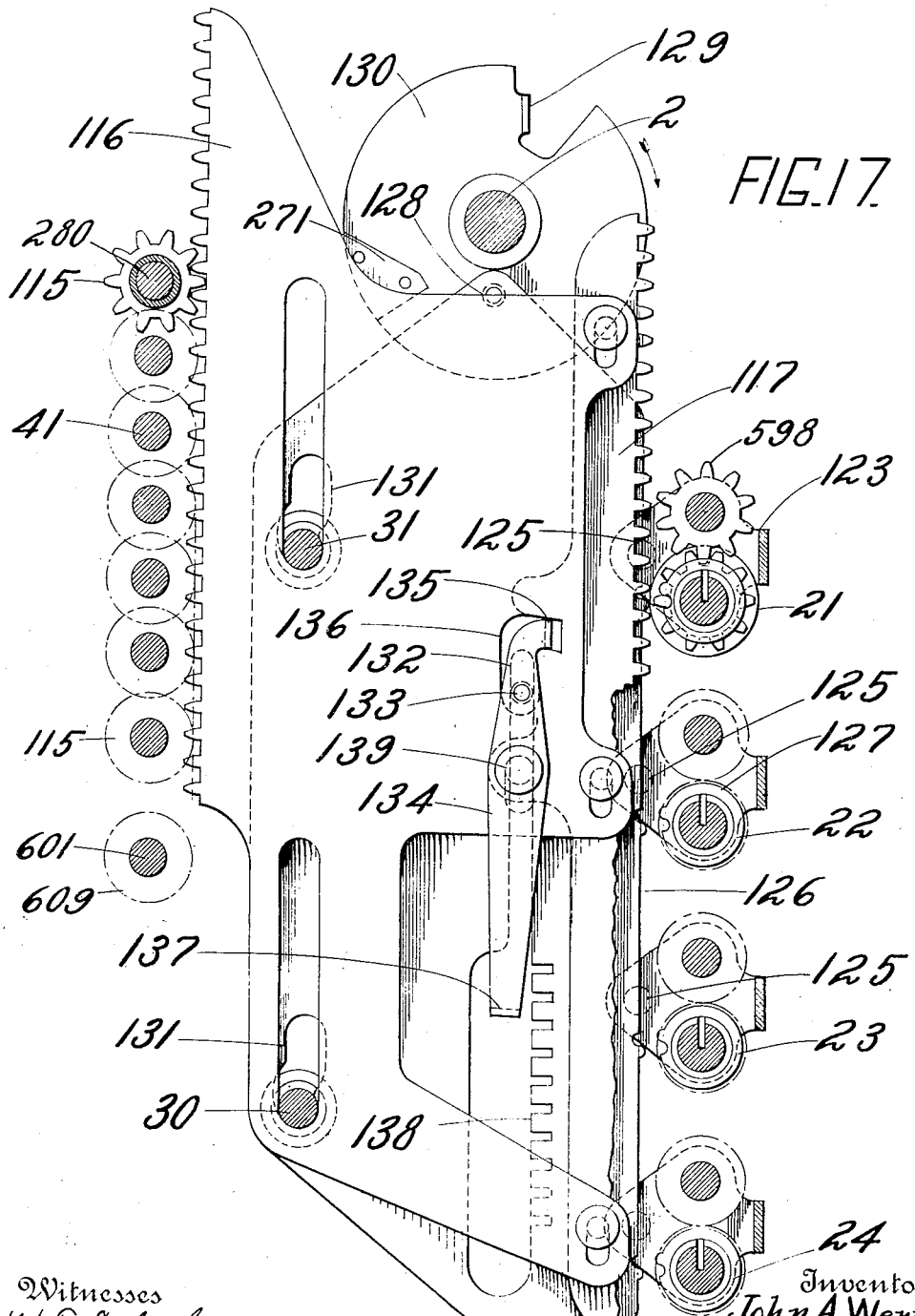

J. A. WERNER.
CASH AND CREDIT ACCOUNTING MACHINE.
APPLICATION FILED SEPT. 30, 1911.

1,205,298.

Patented Nov. 21, 1916.
48 SHEETS—SHEET 20.

WITNESSES:

INVENTOR
John A. Werner
BY
ATTORNEY

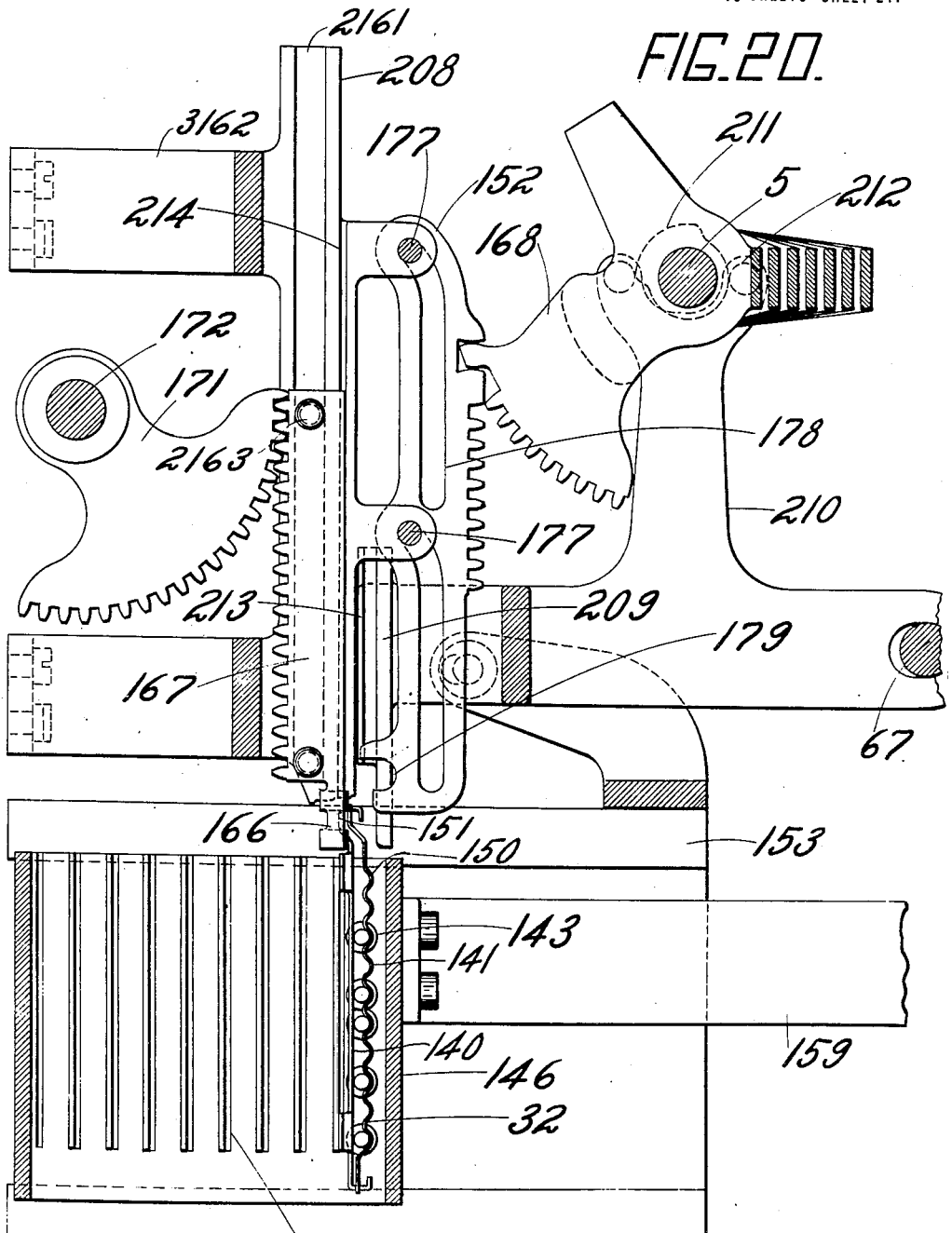

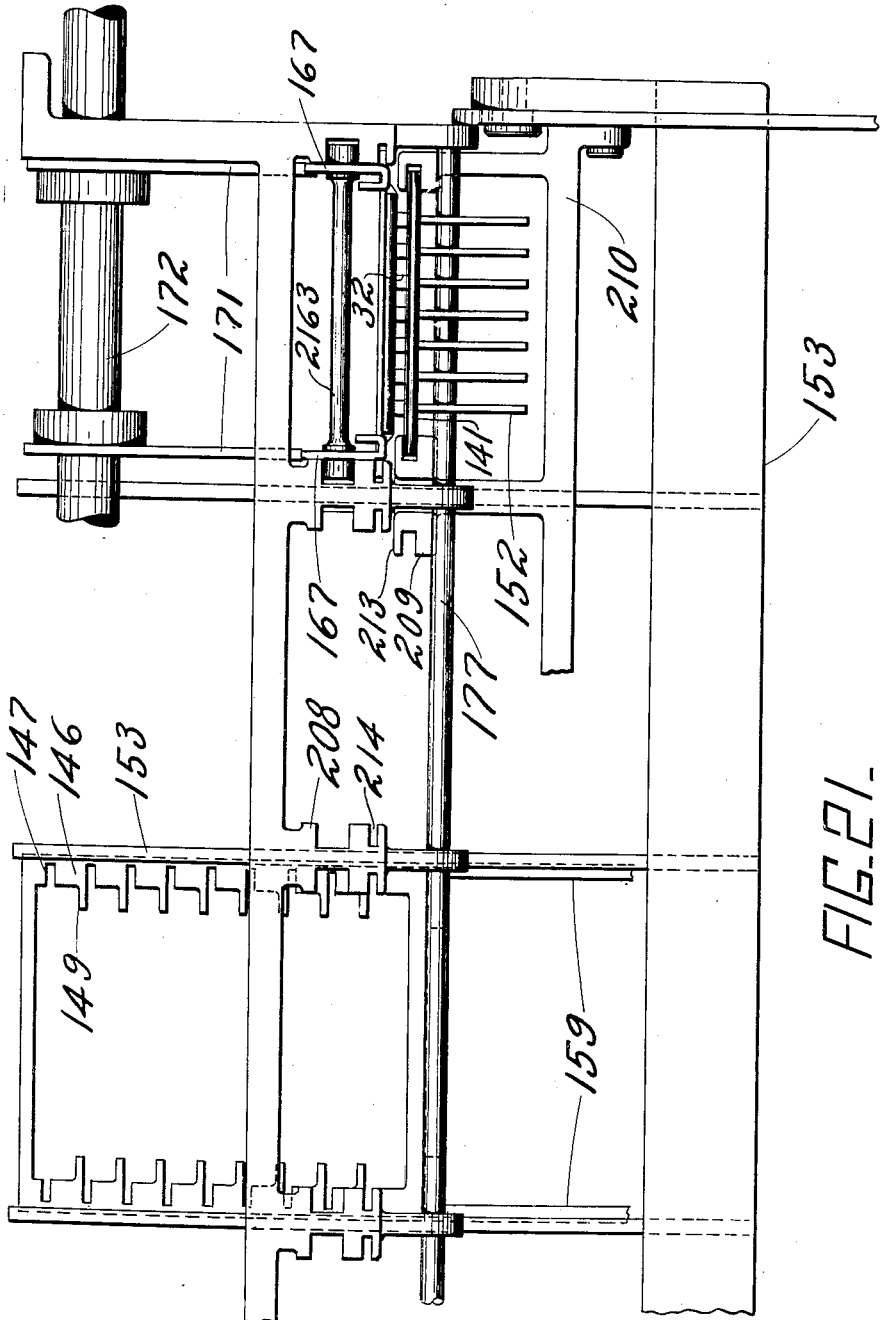

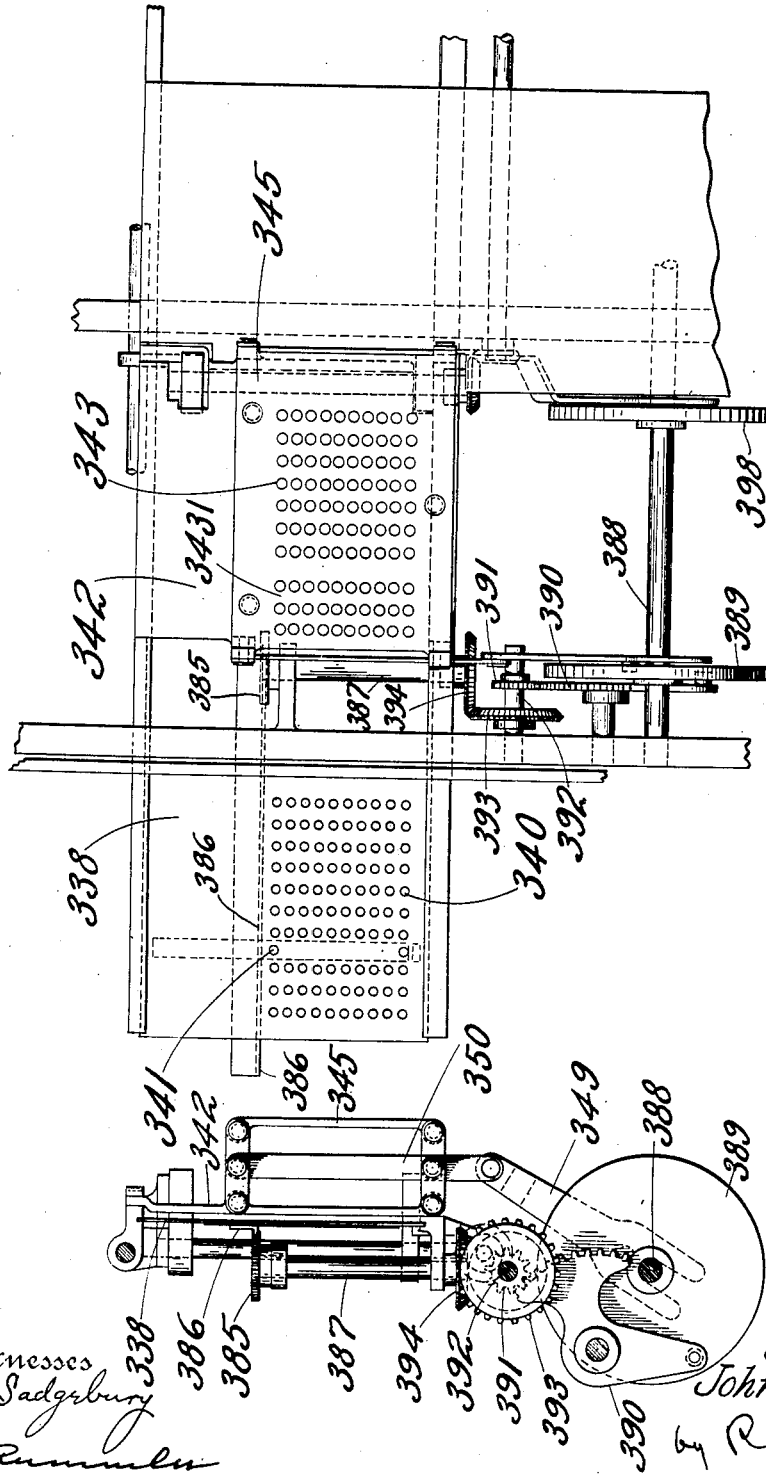

J. A. WERNER.
CASH AND CREDIT ACCOUNTING MACHINE.
APPLICATION FILED SEPT. 30, 1911.
1,205,298.
Patented Nov. 21, 1916.
48 SHEETS—SHEET 24.
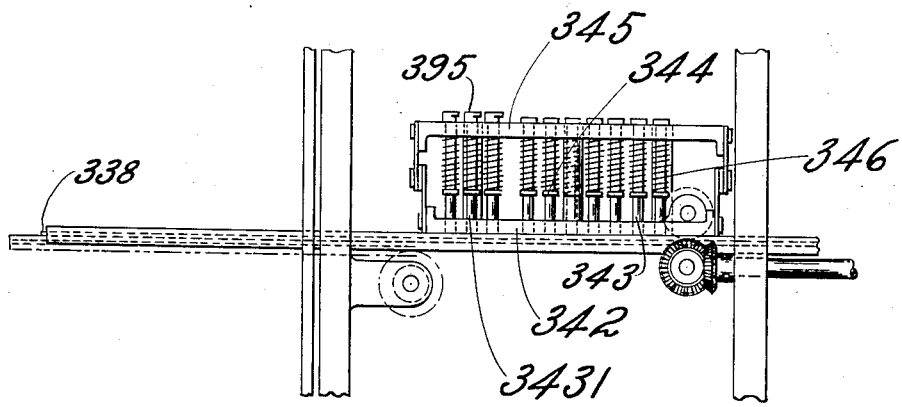
FIG_24_
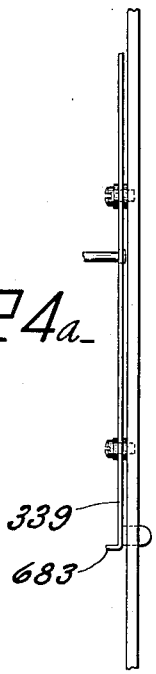
FIG_24a_
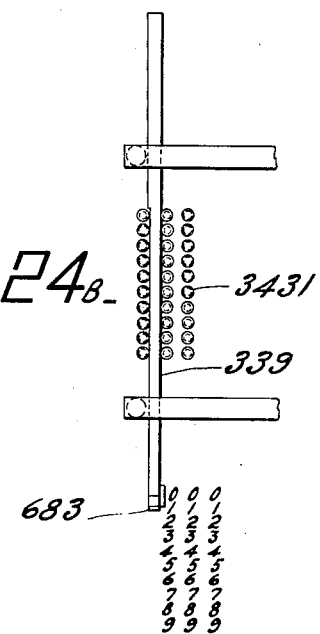
FIG_24b_
Witnesses
N. F. Sadgebury
A. Ammler
Inventor
John A. Werner
by R. C. Glass
Attorney

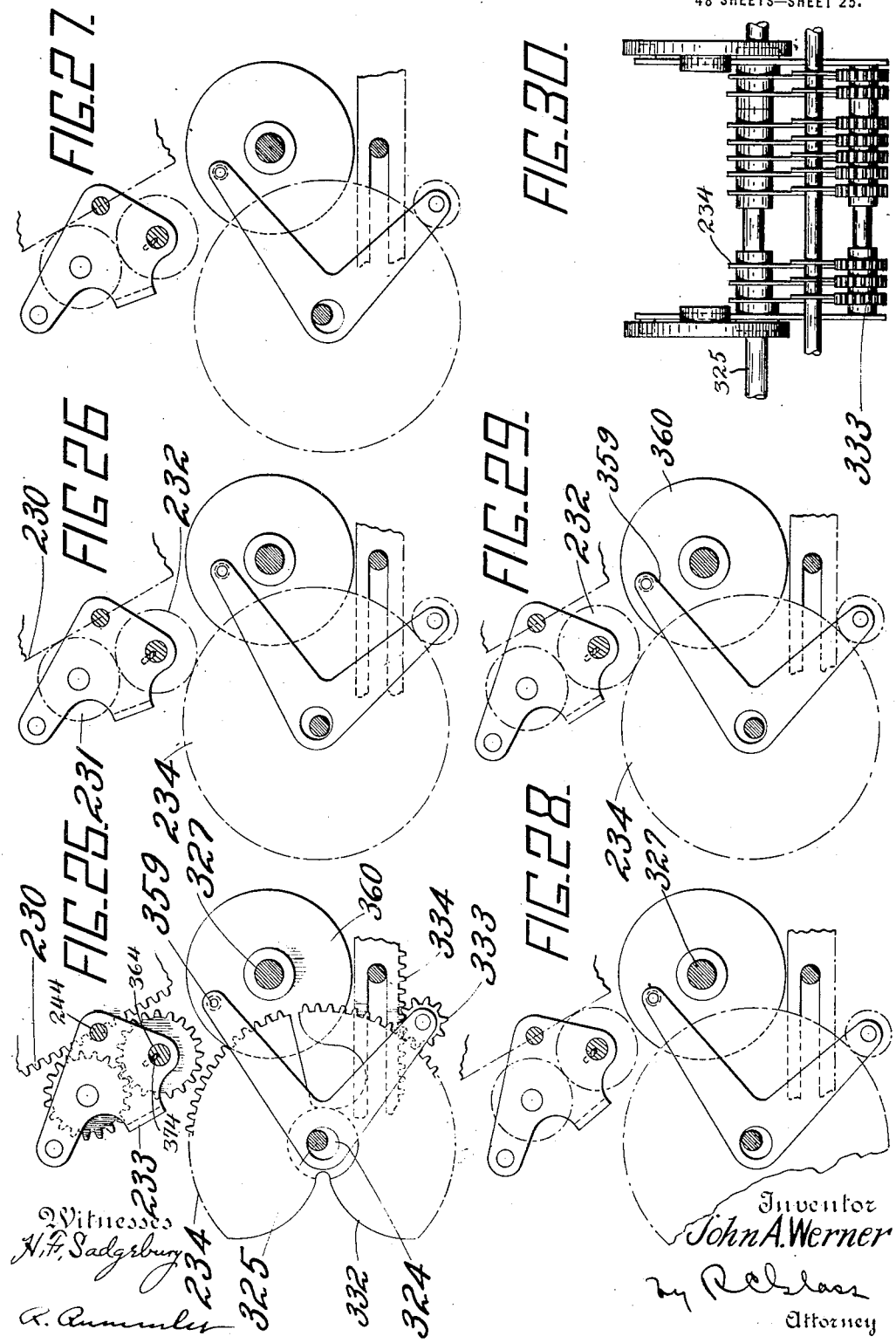

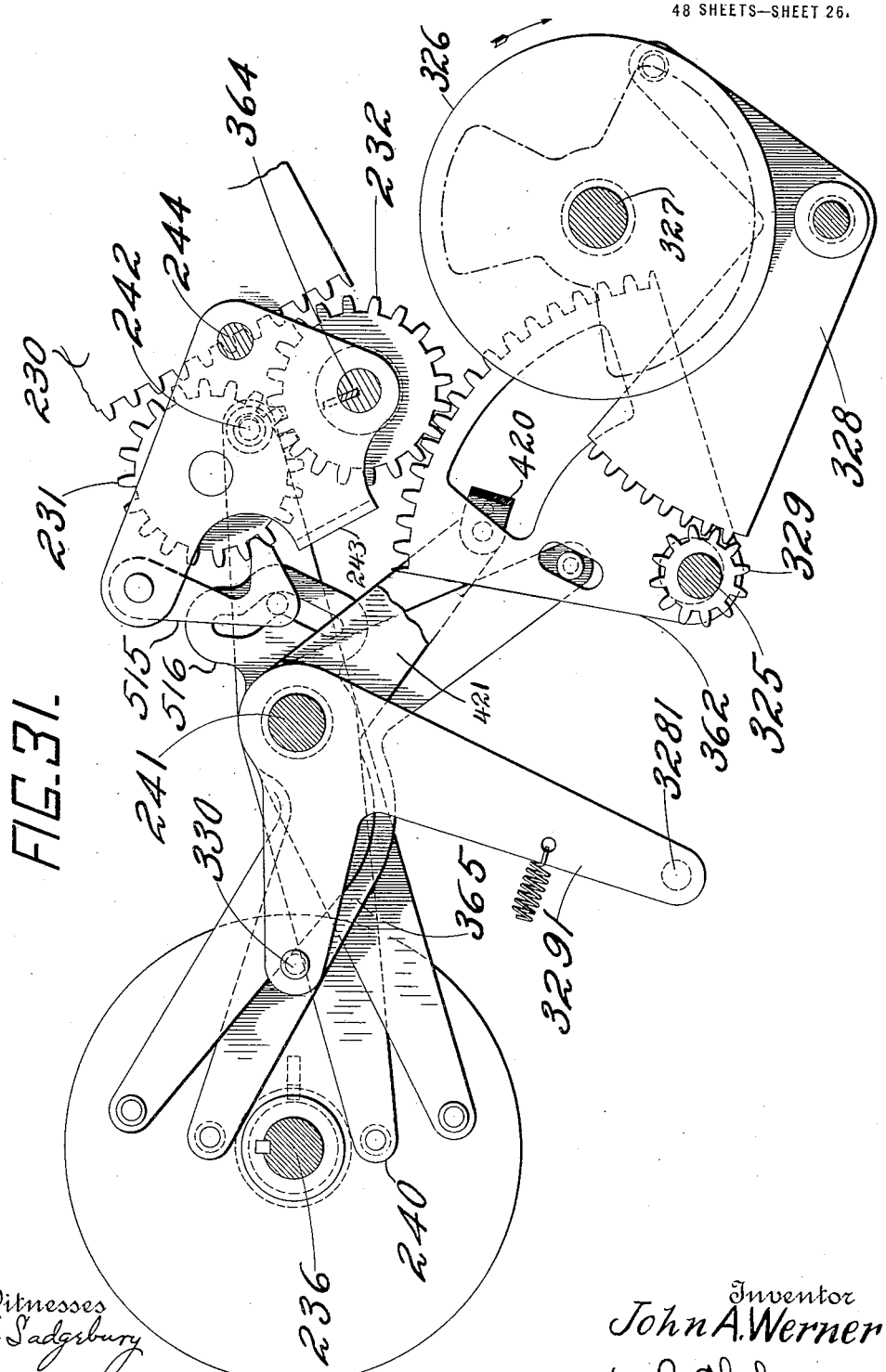

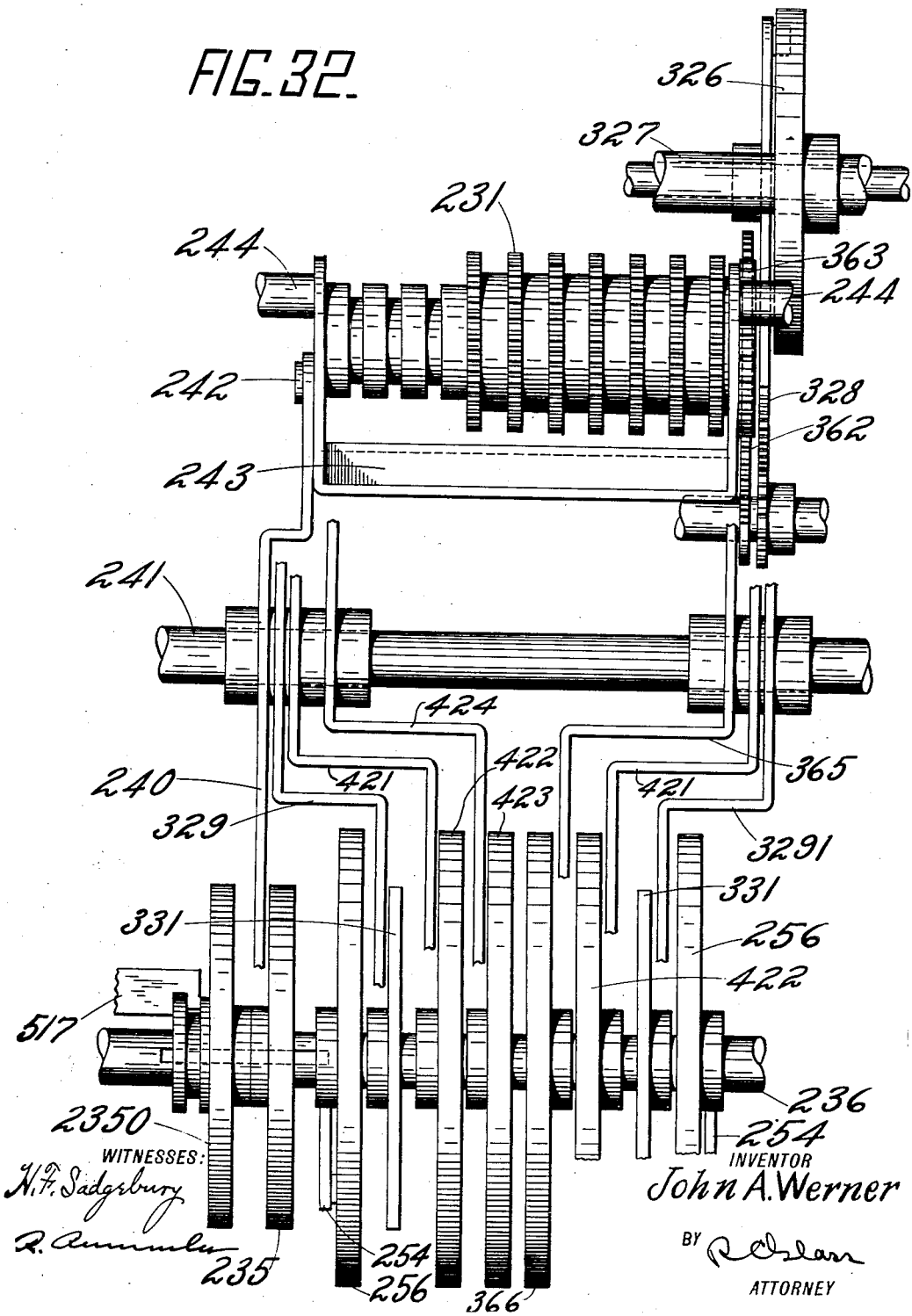

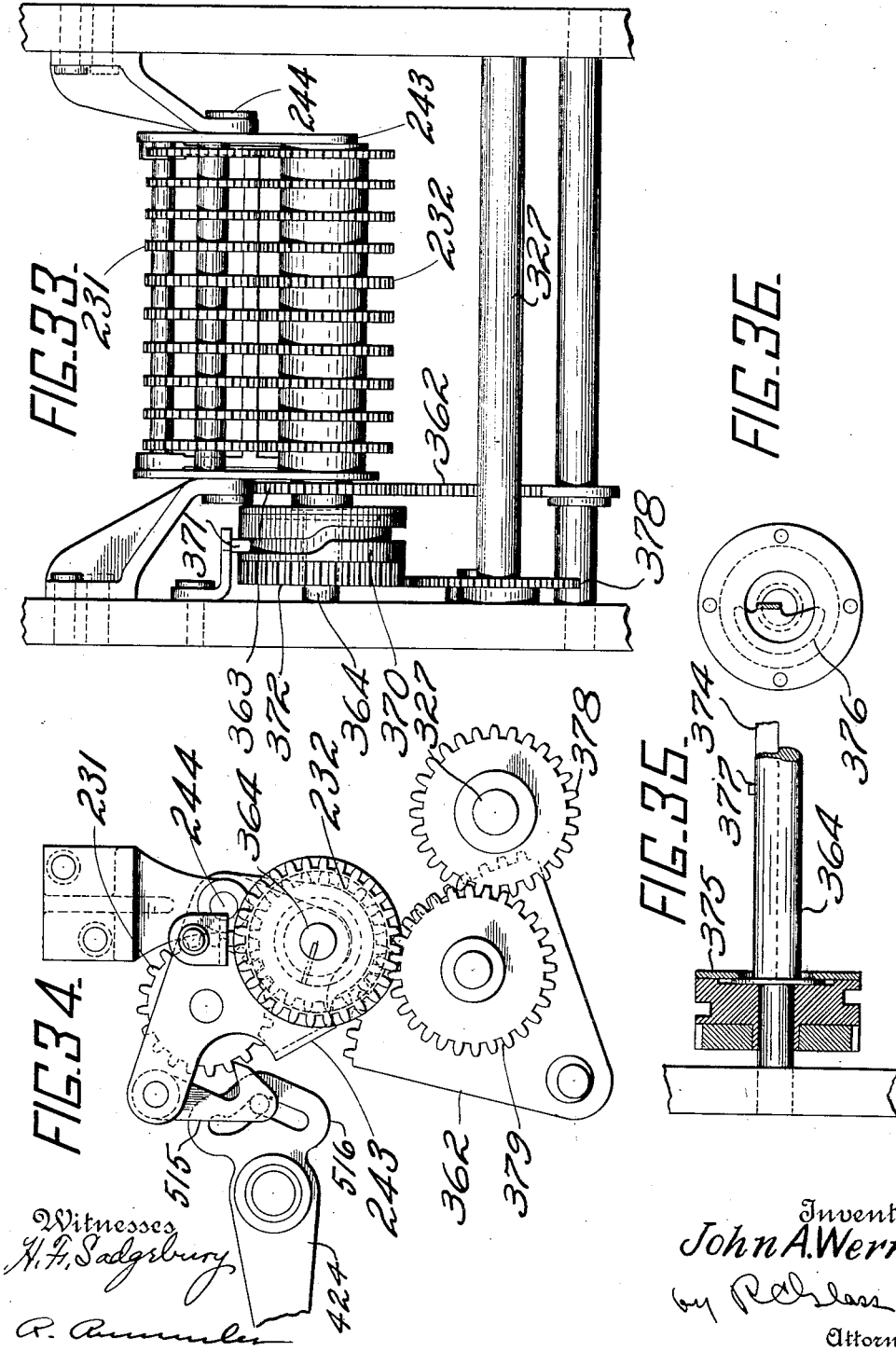

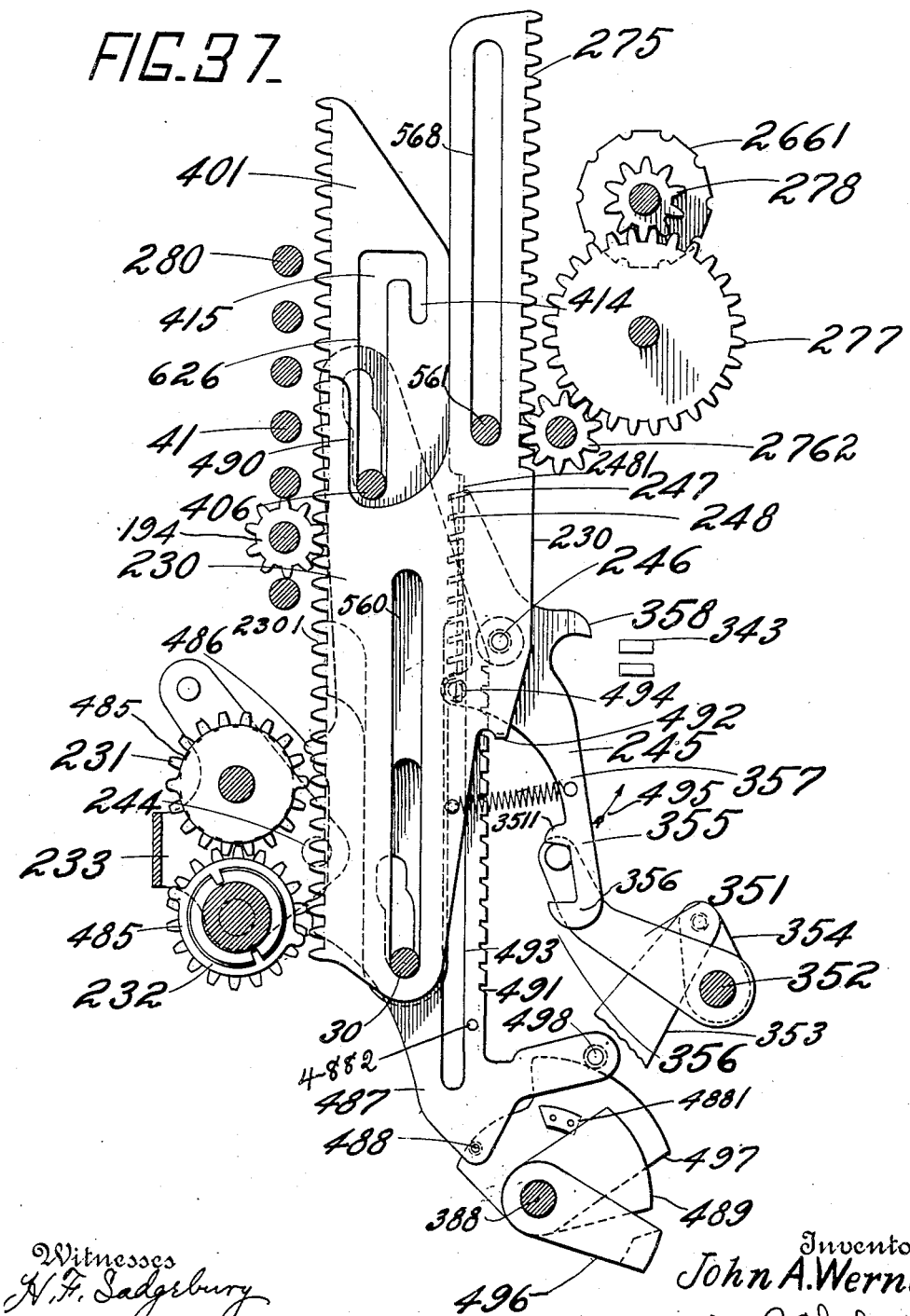

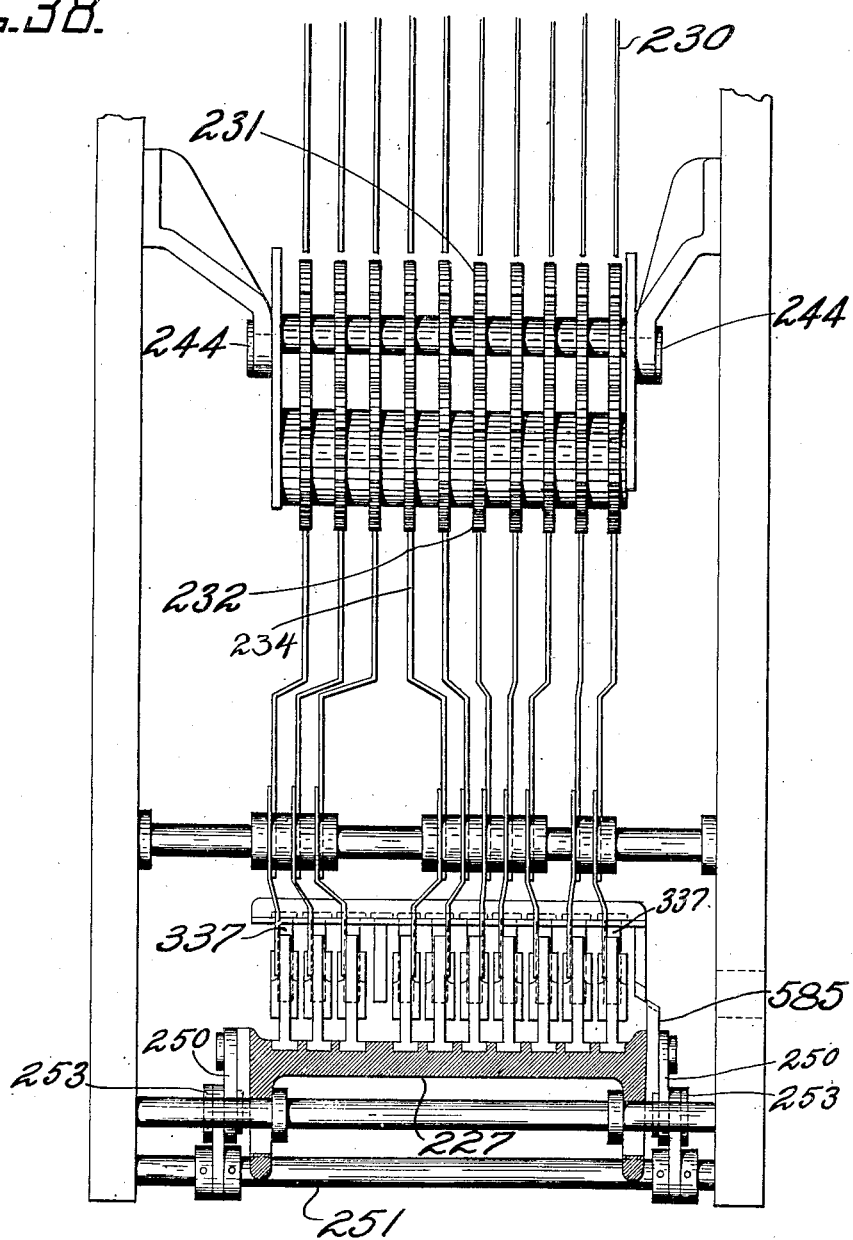

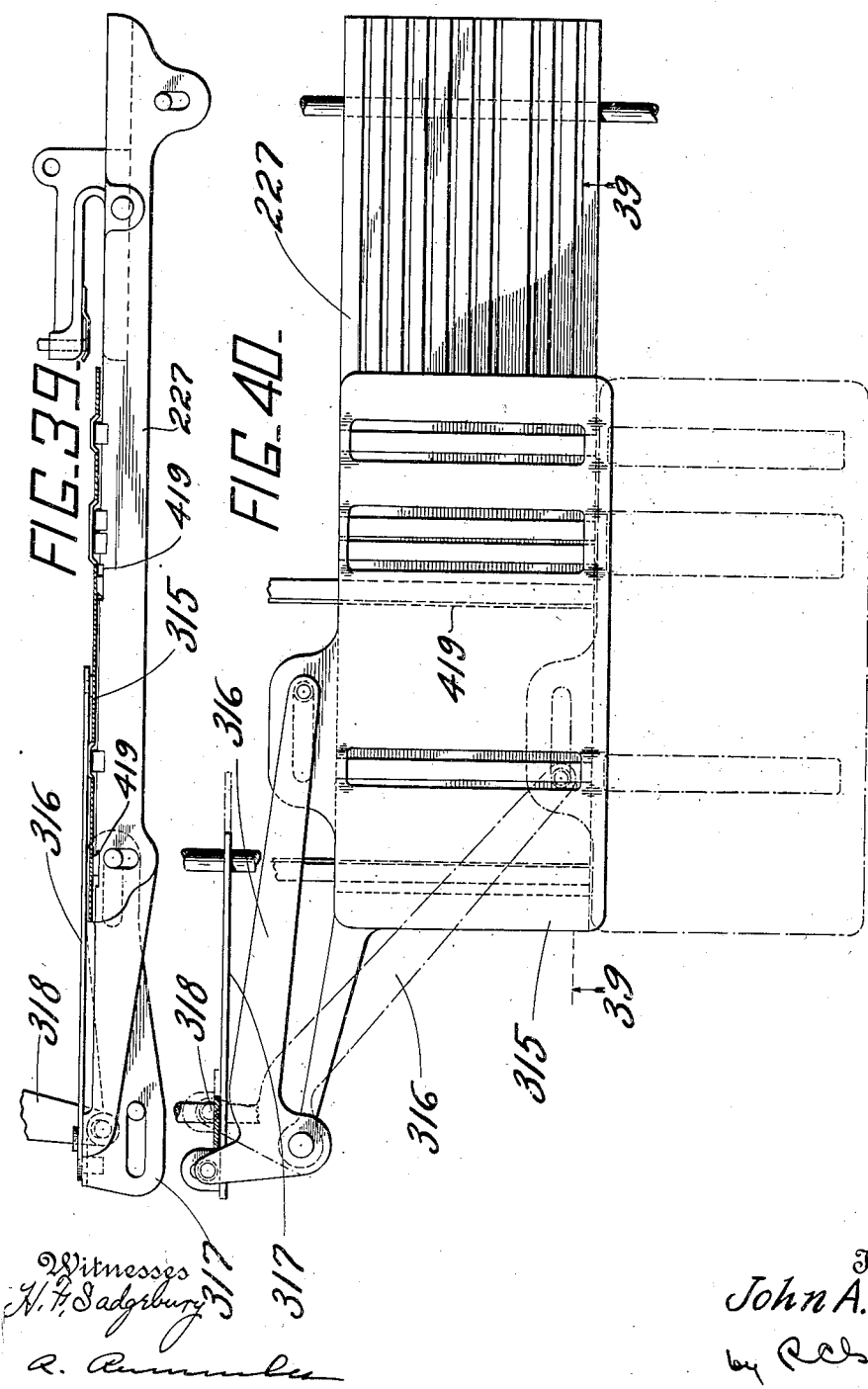

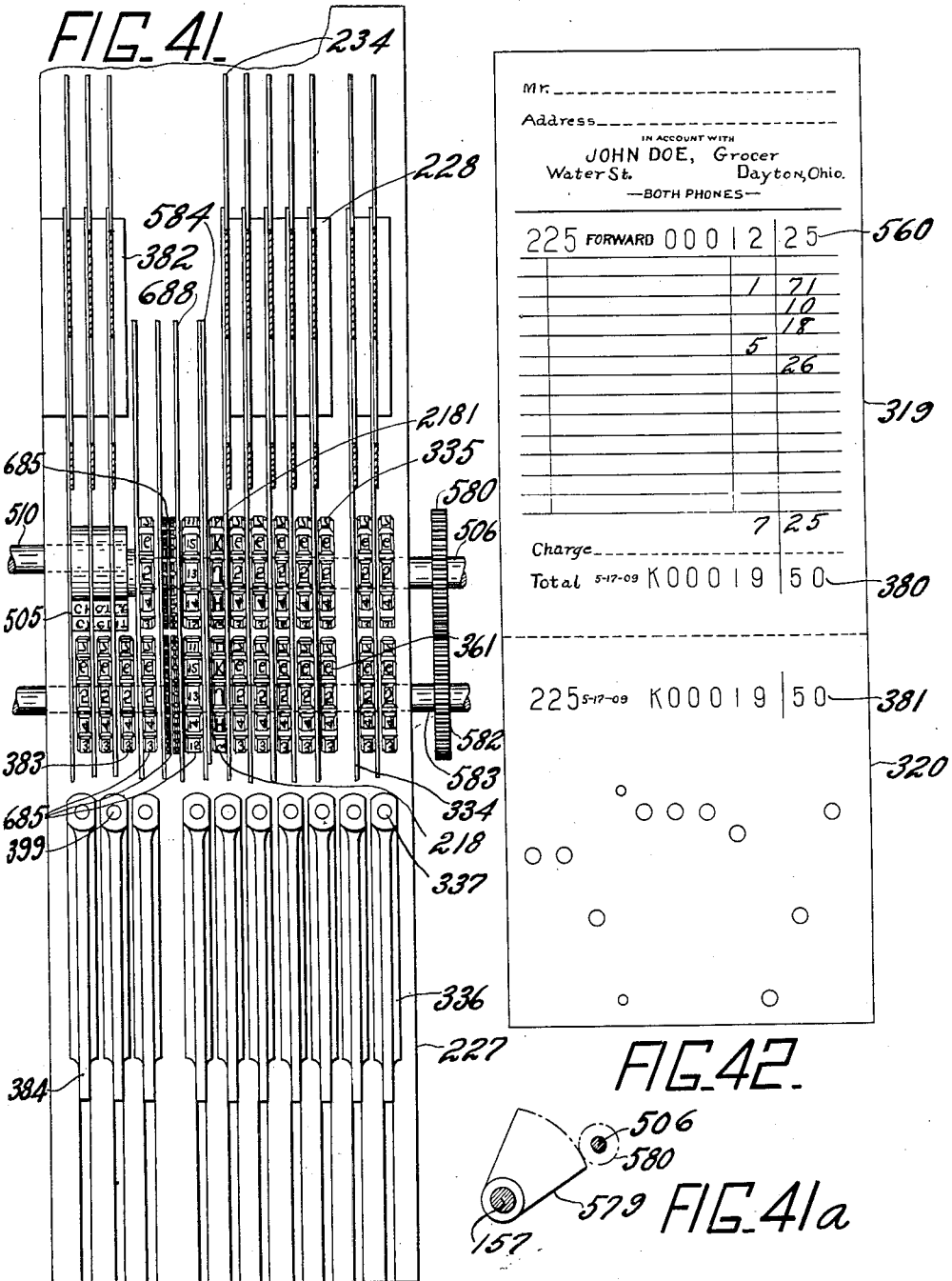

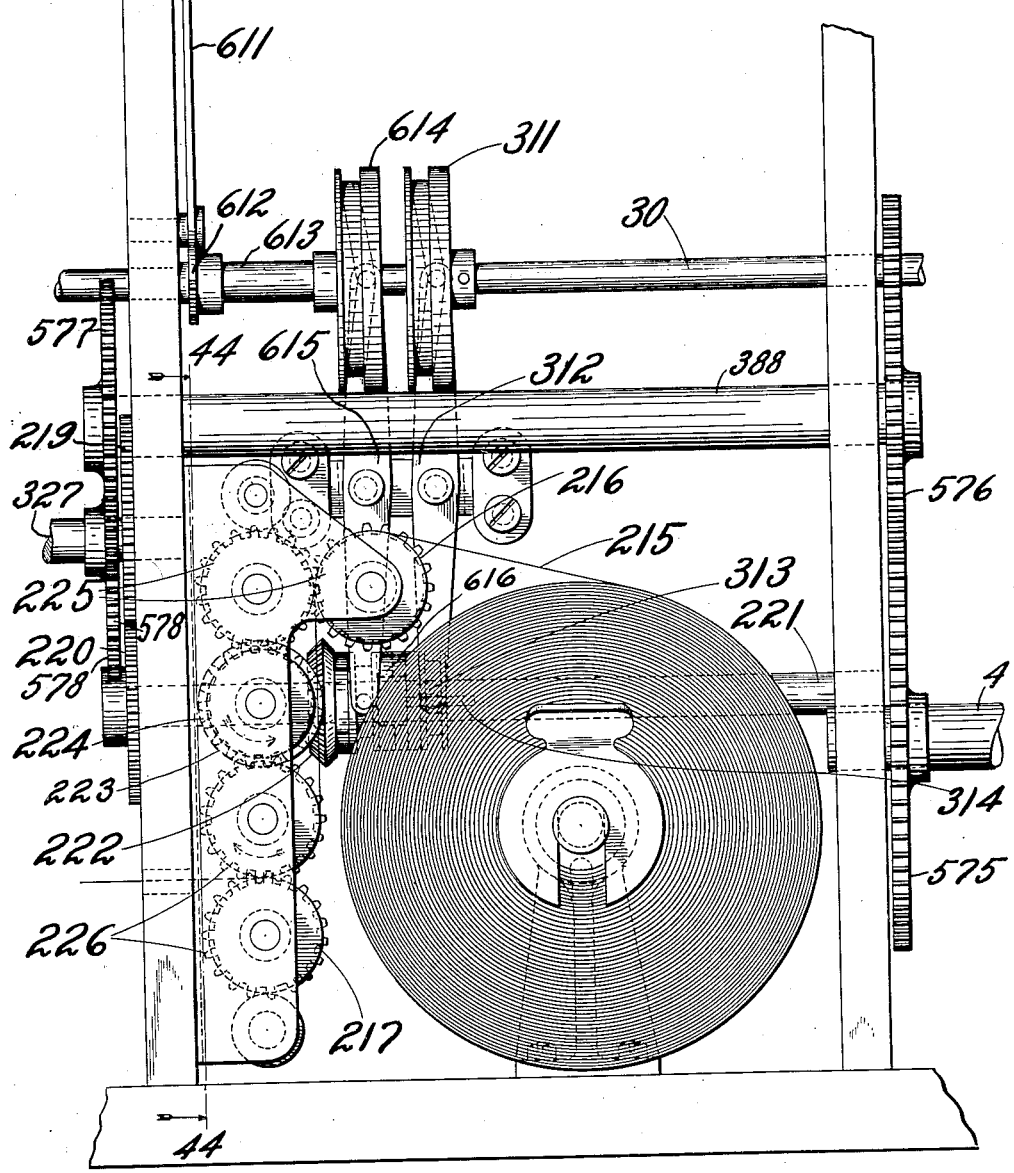

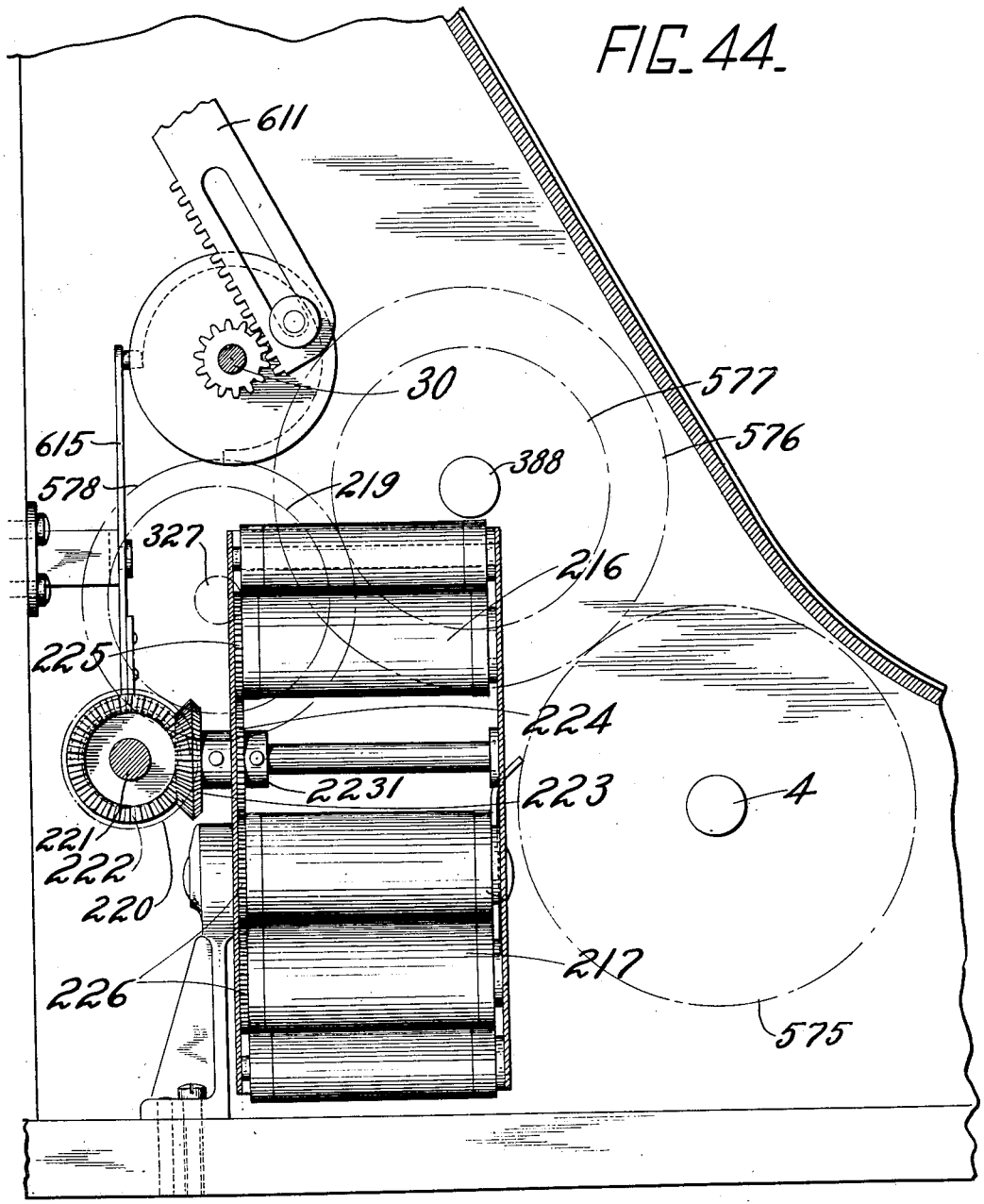

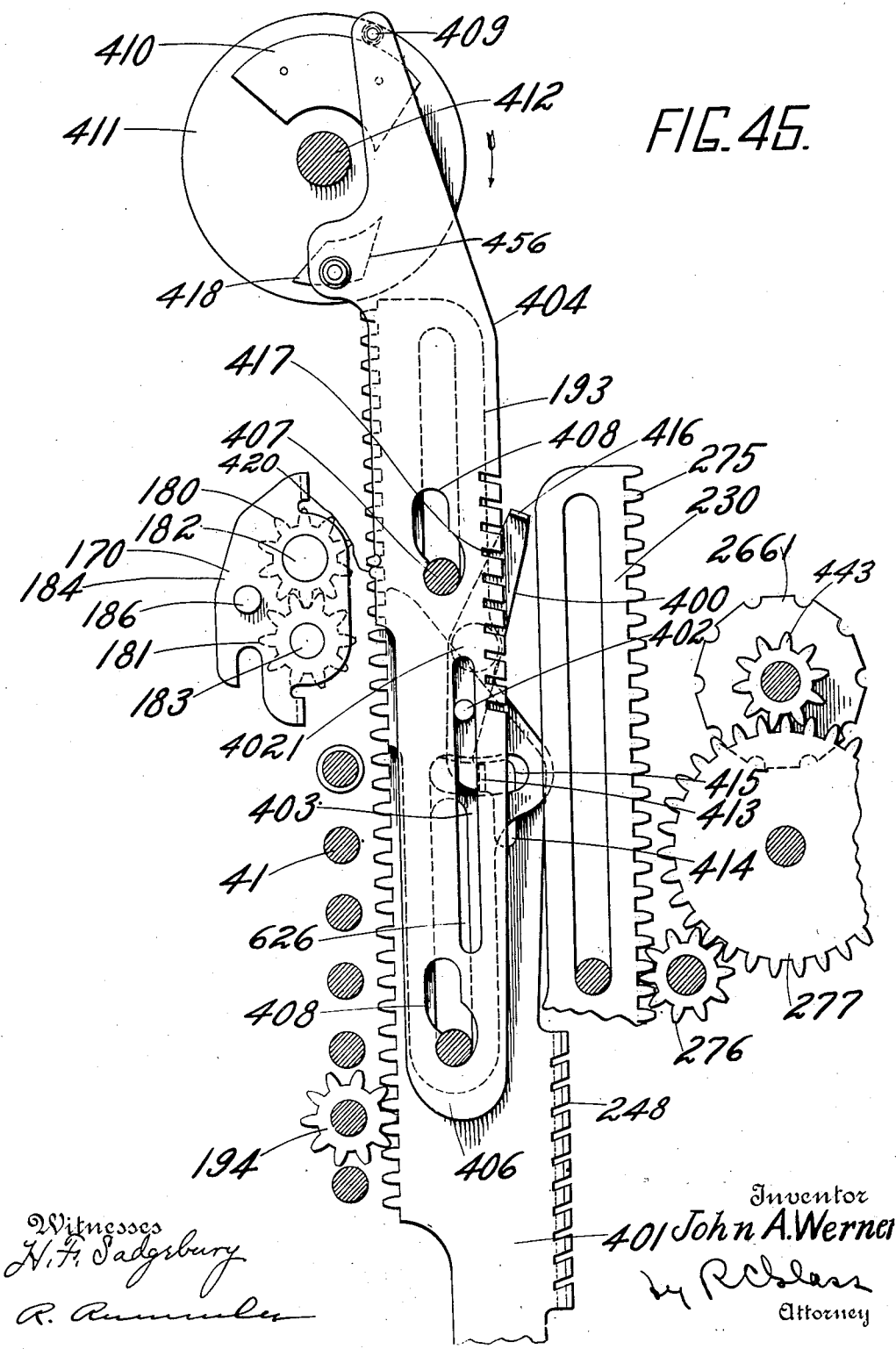

J. A. WERNER.
CASH AND CREDIT ACCOUNTING MACHINE.
APPLICATION FILED SEPT. 30, 1911.
1,205,298.
Patented Nov. 21, 1916.
48 SHEETS—SHEET 37.
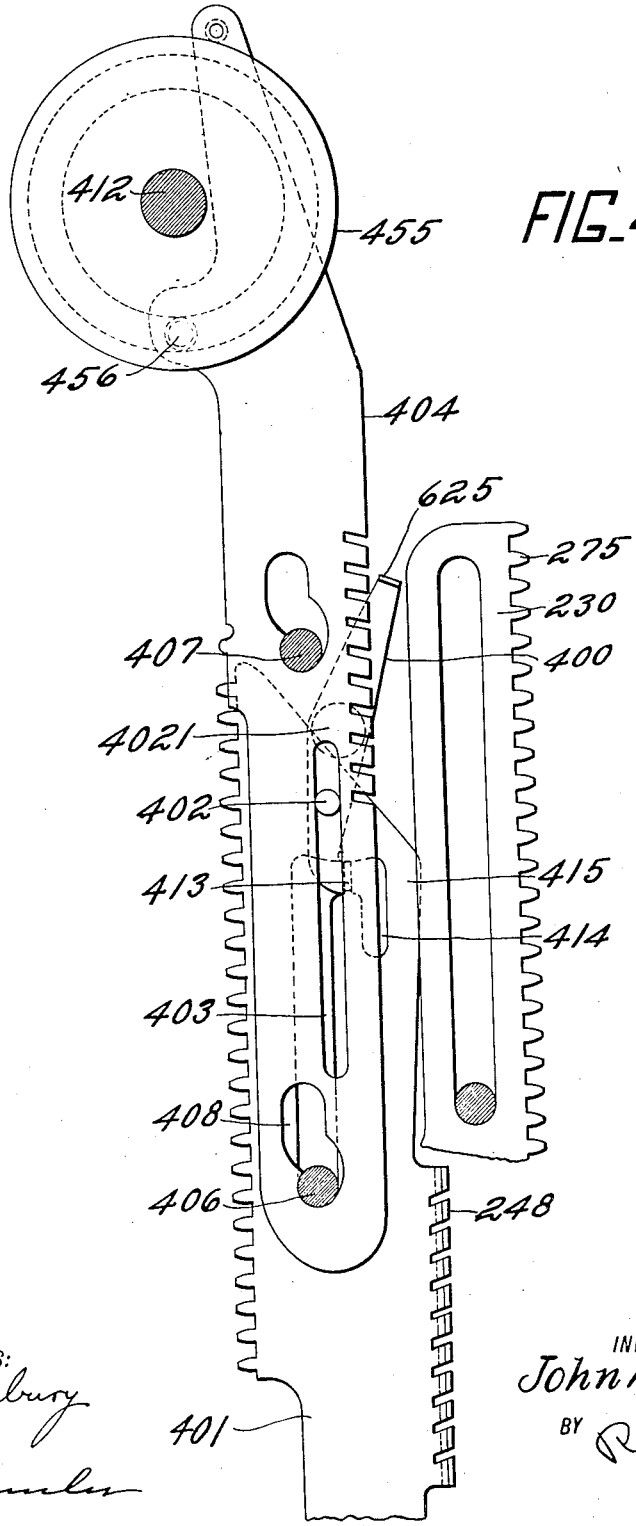
FIG_45a_
WITNESSES:
H. F. Sadgebury
R. Ammuler
INVENTOR
John A. Werner
BY
ATTORNEY

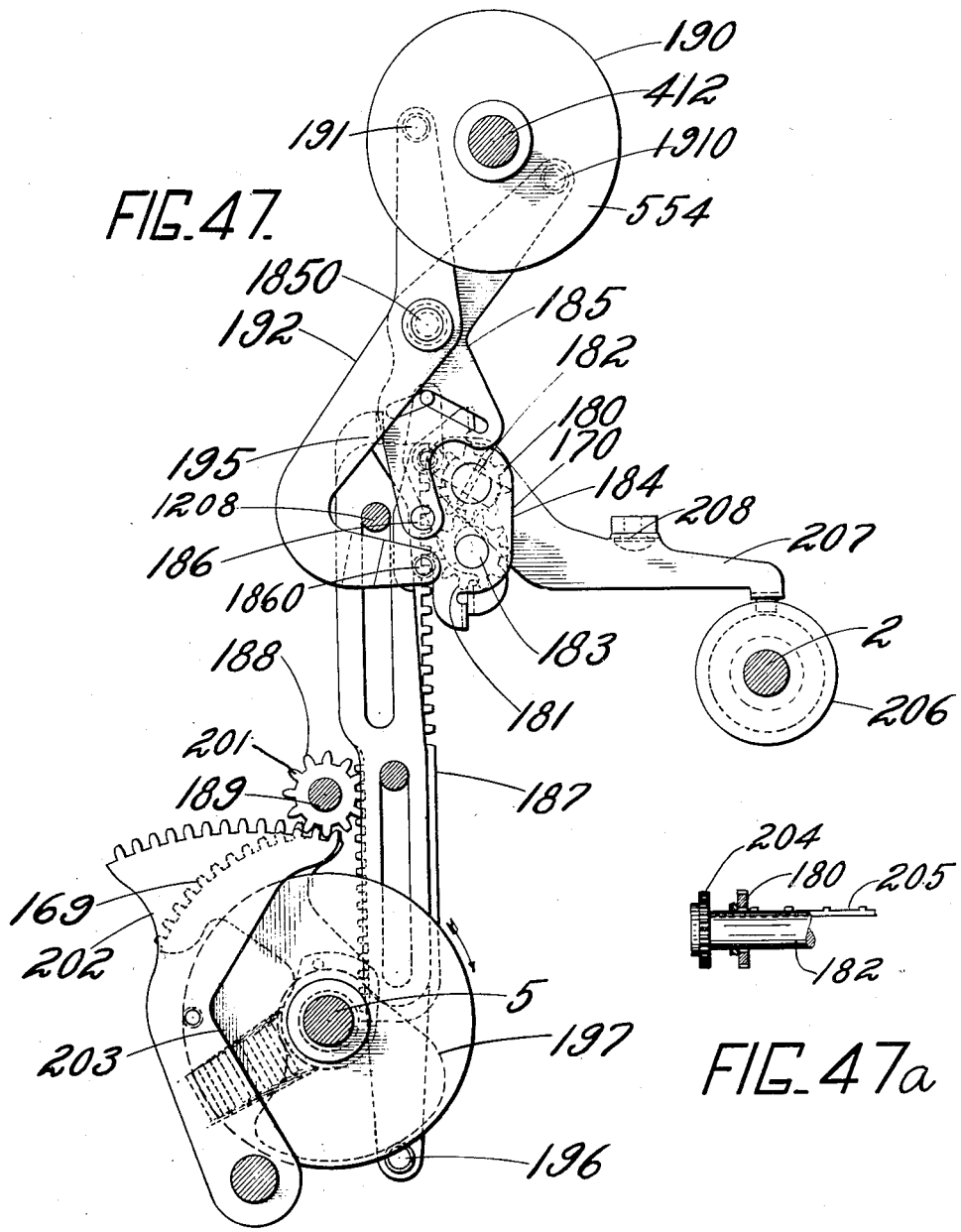

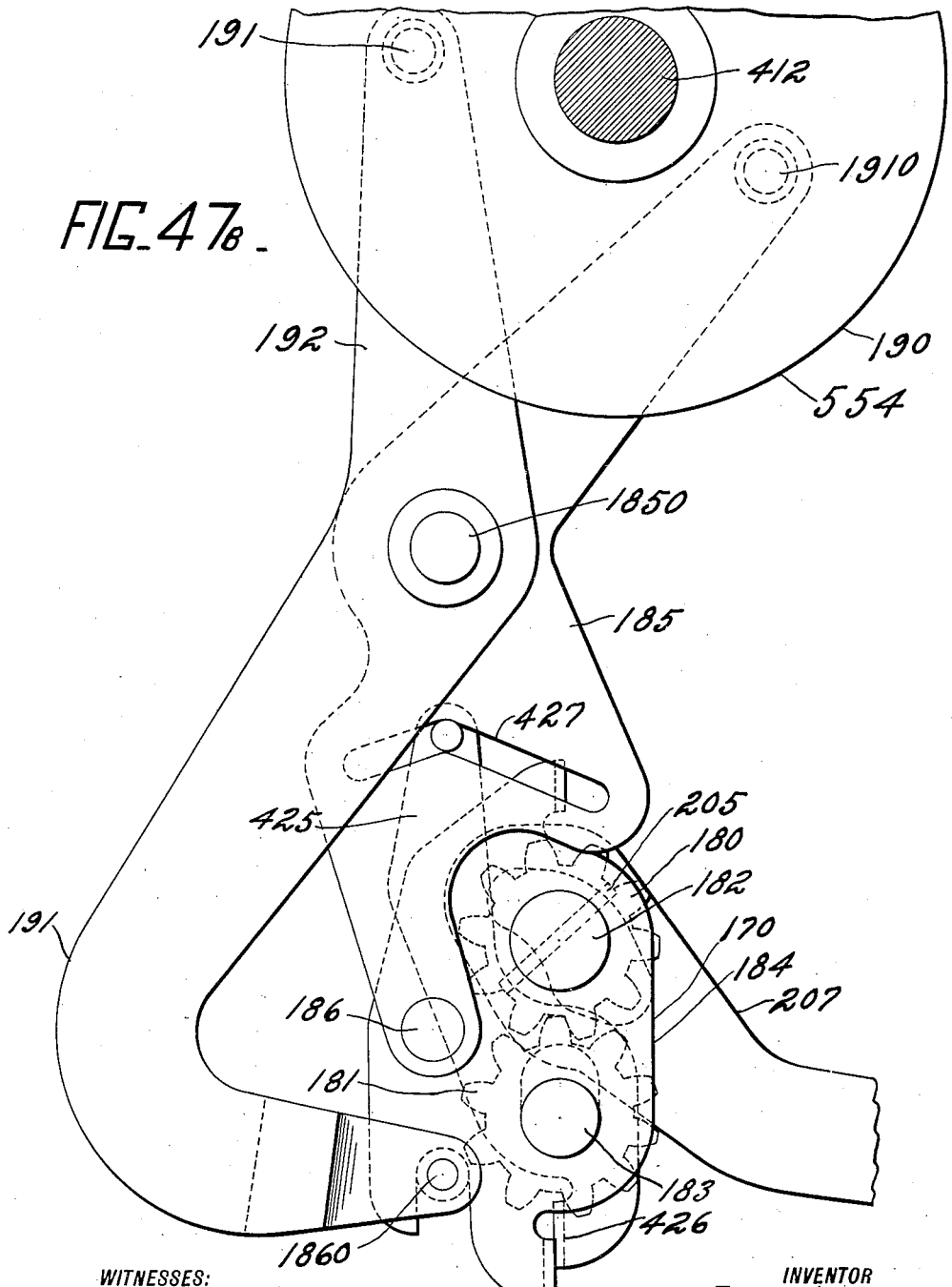

J. A. WERNER.
CASH AND CREDIT ACCOUNTING MACHINE.
APPLICATION FILED SEPT. 30, 1911.
1,205,298.
Patented Nov. 21, 1916.
48 SHEETS—SHEET 41.
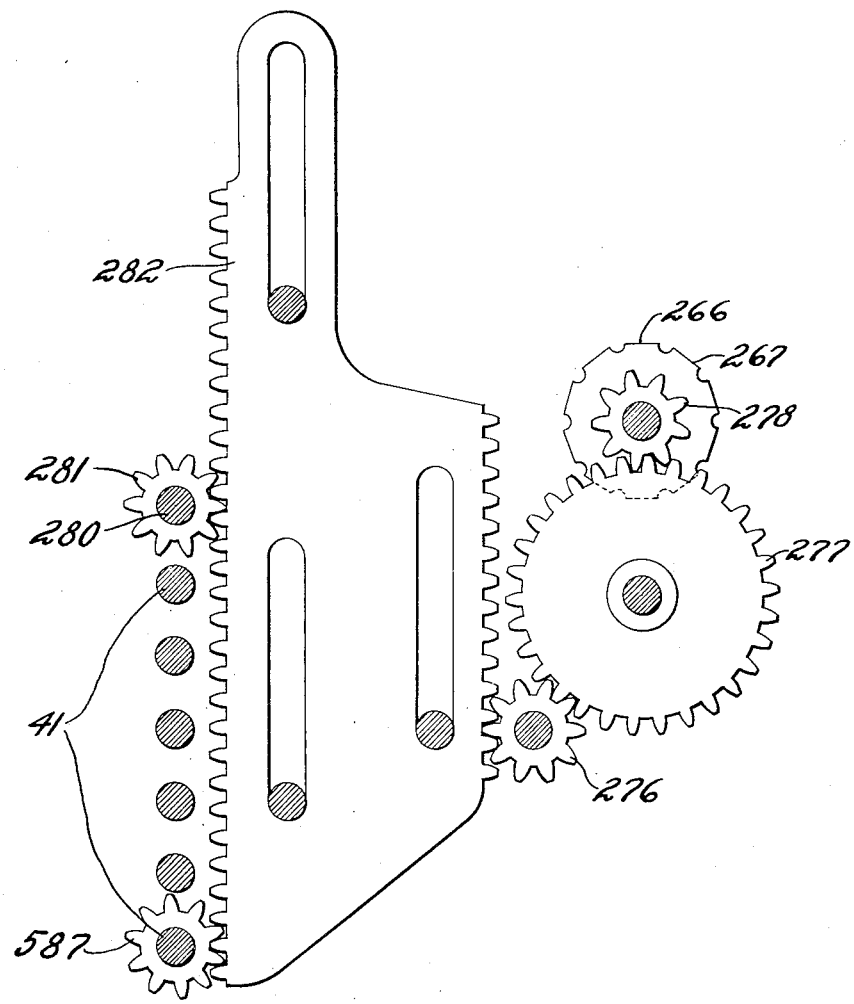
FIG_48.
WITNESSES:
H. F. Sadgebury
R. Rummler
INVENTOR
John A. Werner
BY
ATTORNEY J. A. WERNER.
CASH AND CREDIT ACCOUNTING MACHINE.
APPLICATION FILED SEPT. 30, 1911.
1,205,298.
Patented Nov. 21, 1916.
48 SHEETS—SHEET 42.
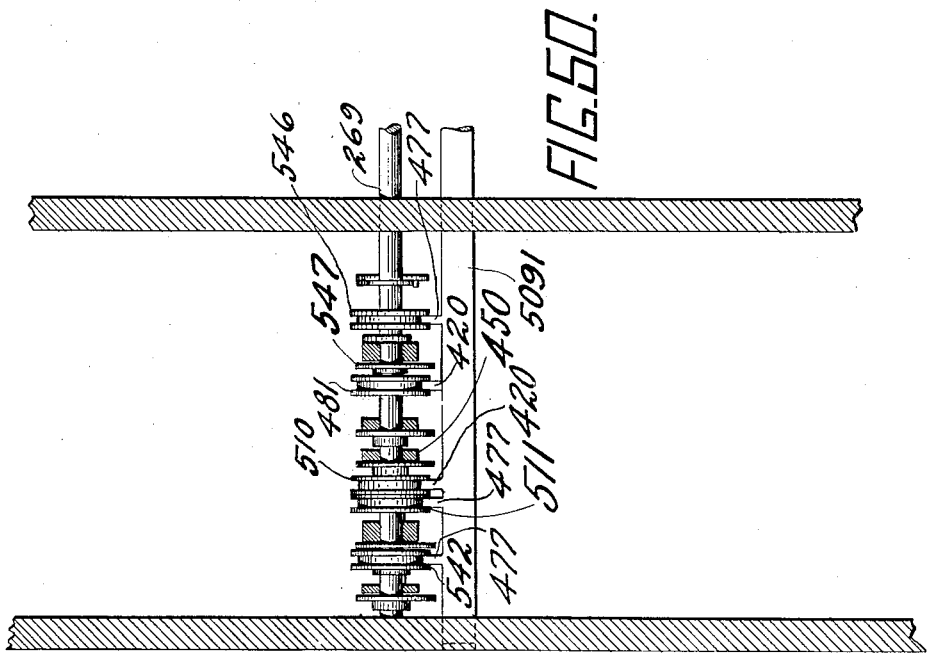
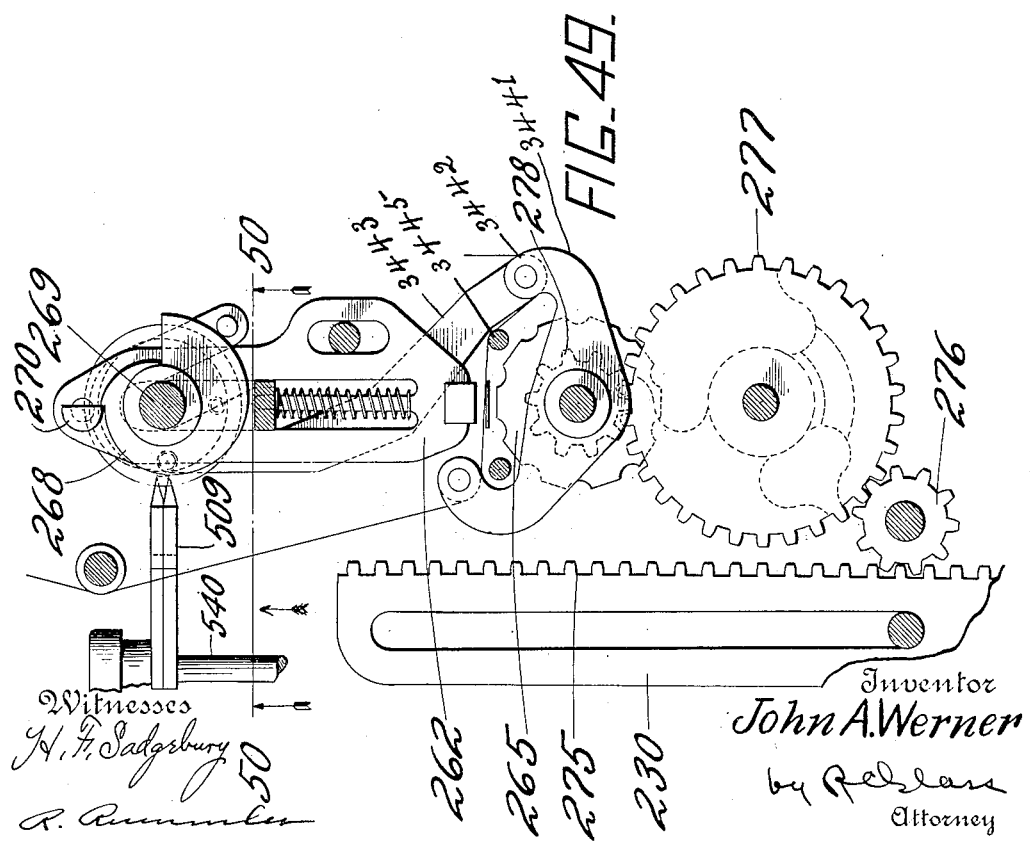
Inventor
John A. Werner
Attorney

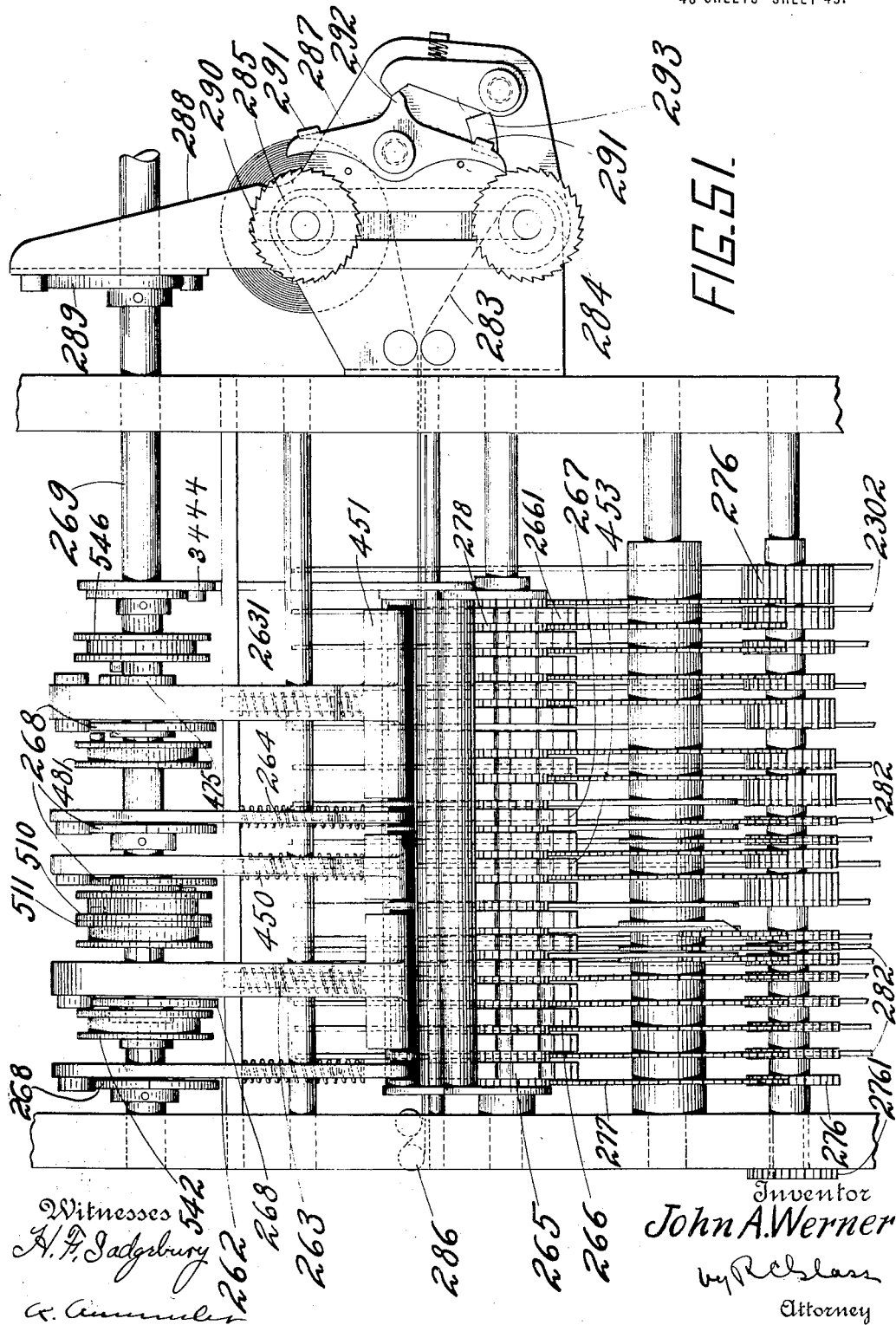

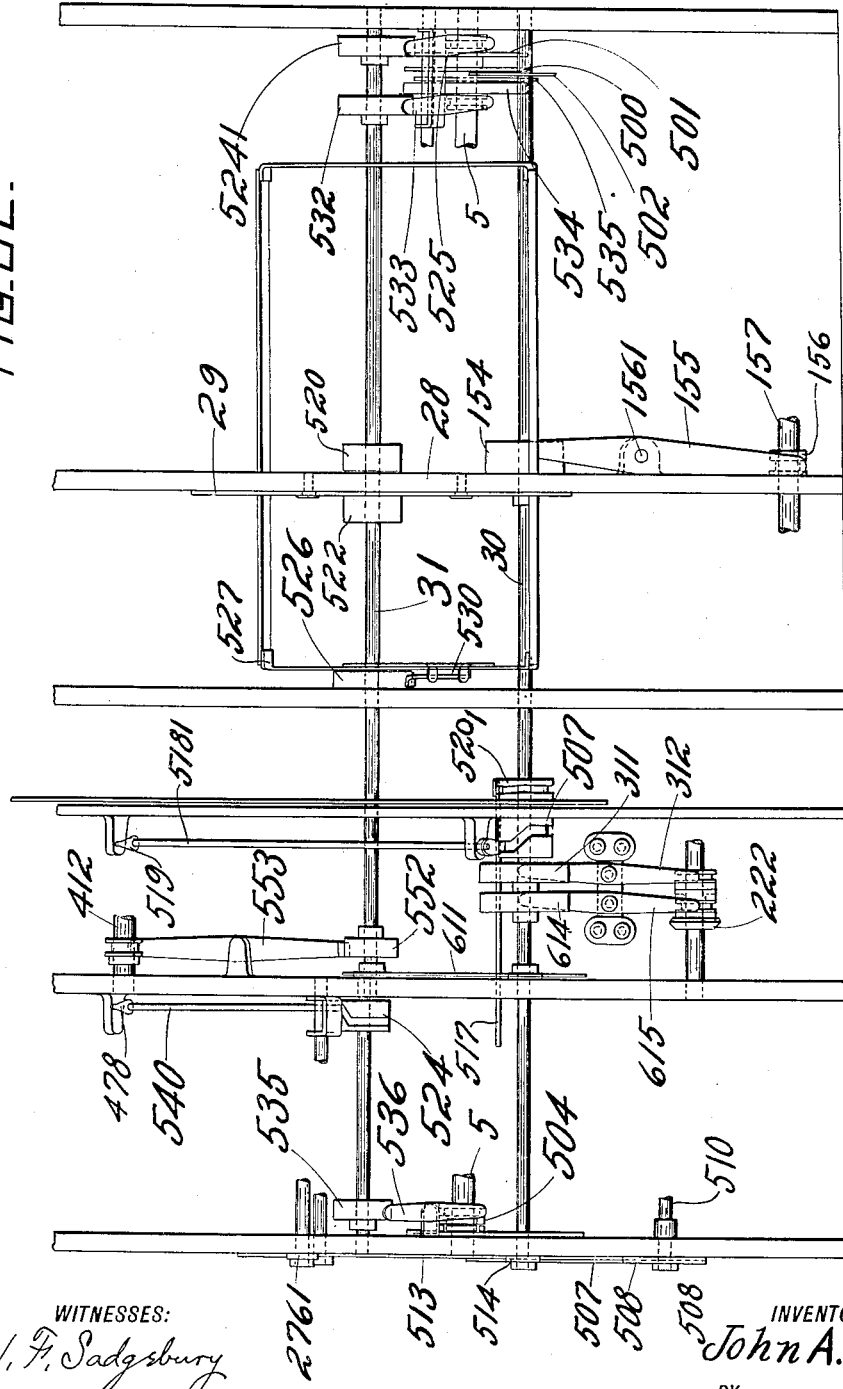

J. A. WERNER.
CASH AND CREDIT ACCOUNTING MACHINE.
APPLICATION FILED SEPT. 30, 1911.
1,205,298.
Patented Nov. 21, 1916.
48 SHEETS—SHEET 45.
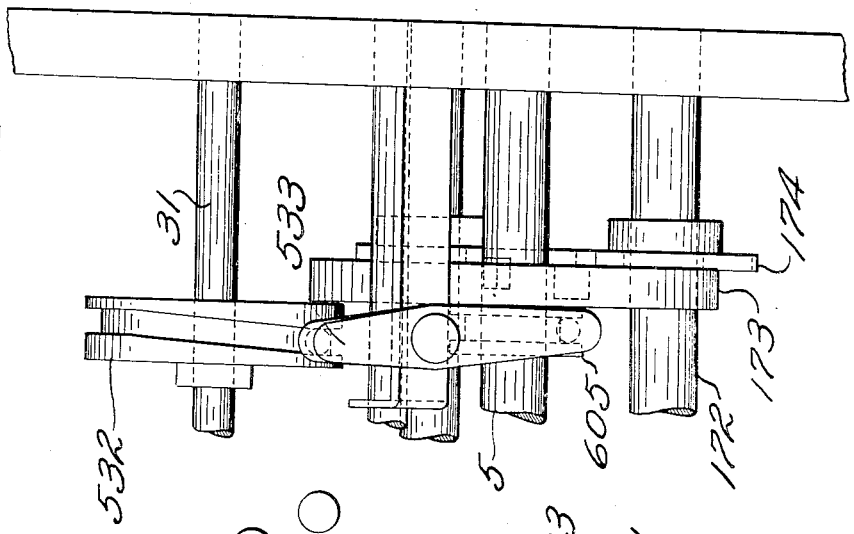
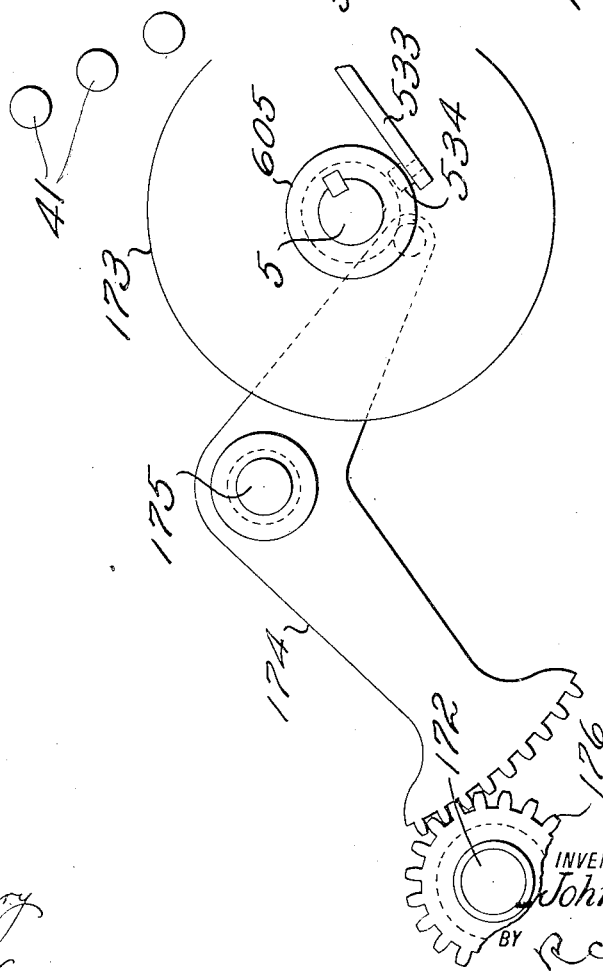
WITNESSES:
H. F. Sadgebury
R. Rummler
INVENTOR
John A. Werner
BY R C Glass
ATTORNEY J. A. WERNER.
CASH AND CREDIT ACCOUNTING MACHINE.
APPLICATION FILED SEPT. 30, 1911.
1,205,298.
Patented Nov. 21, 1916.
48 SHEETS—SHEET 46.
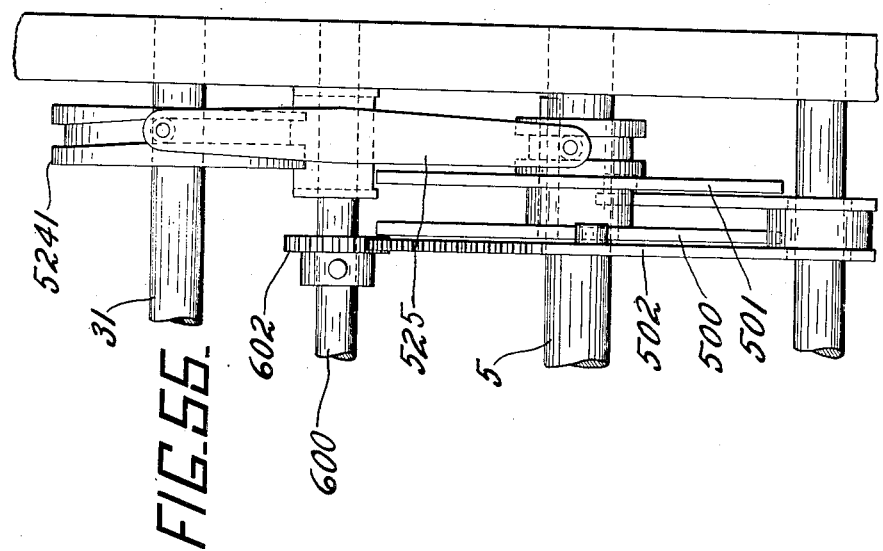
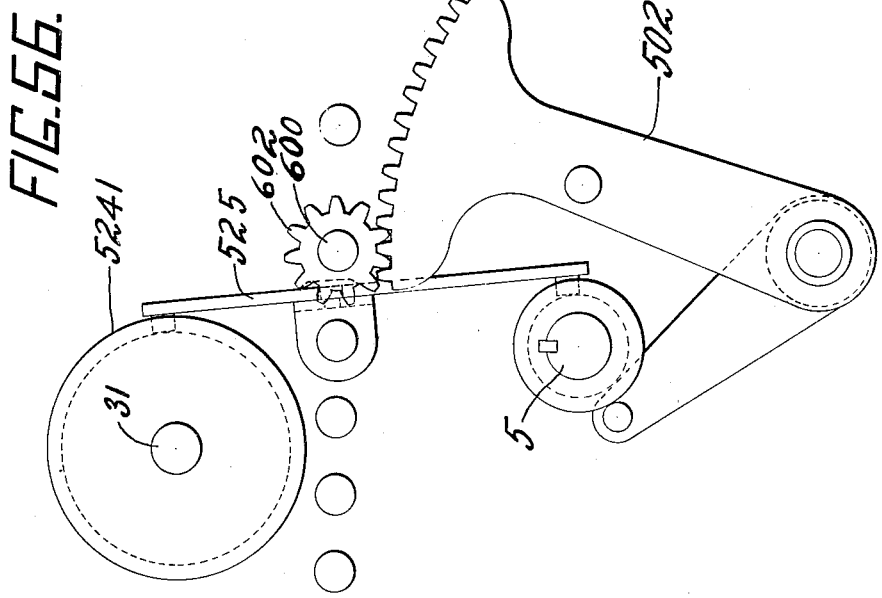
WITNESSES:
H. F. Sadgebury
R. Rummler
INVENTOR
John A. Werner
BY R. C. Glass
ATTORNEY

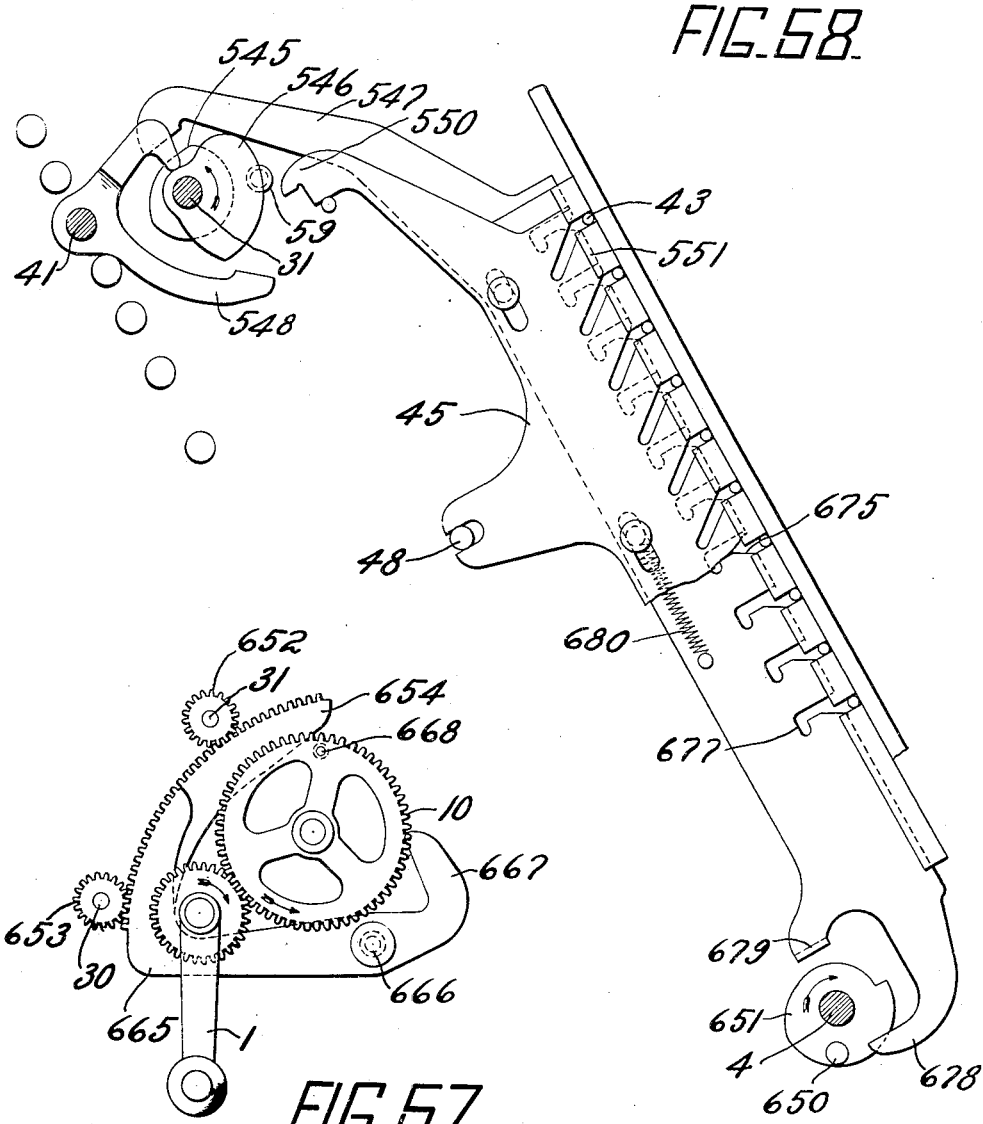

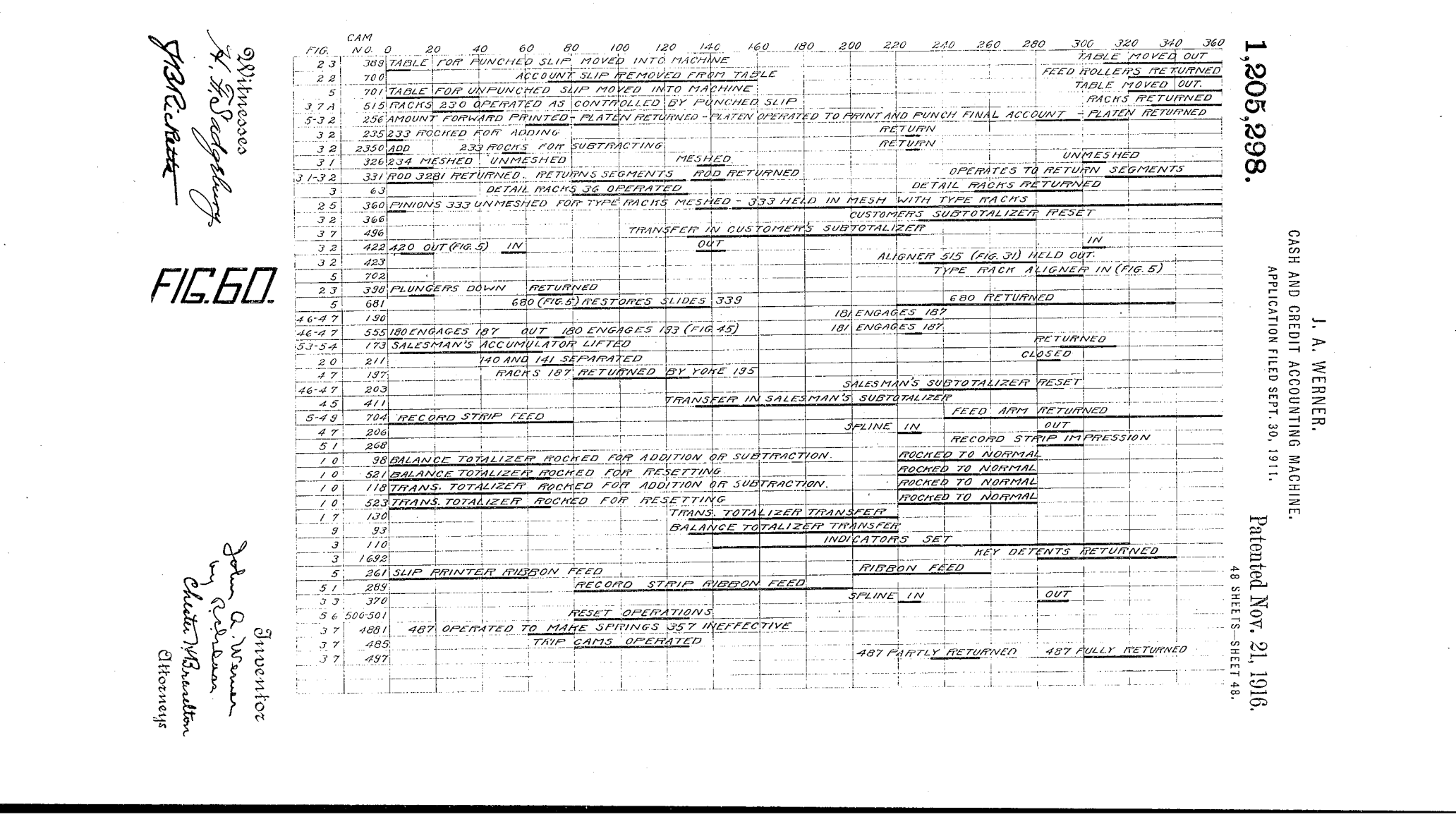

J. A. WERNER.
CASH AND CREDIT ACCOUNTING MACHINE.
APPLICATION FILED SEPT. 30, 1911.

1,205,298.

Patented Nov. 21, 1916.
48 SHEETS—SHEET 48.

FIG. 60.

Witnesses
H. F. Sadgebury
J. B. Ricketts

Inventor
John A. Werner
by Richless
Chester W. Braselton
Attorneys

UNITED STATES PATENT OFFICE.

JOHN A. WERNER, OF DAYTON, OHIO, ASSIGNOR TO THE NATIONAL CASH REGISTER COMPANY, (INCORPORATED IN 1906,) OF DAYTON, OHIO, A CORPORATION OF OHIO.

CASH AND CREDIT ACCOUNTING MACHINE.

1,205,298.

Specification of Letters Patent.

Patented Nov. 21, 1916.

Application filed September 30, 1911. Serial No. 652,089.

*To all whom it may concern:*

Be it known that I, JOHN A. WERNER, a citizen of the United States, residing at Dayton, in the county of Montgomery and State of Ohio, have invented certain new and useful Improvements in Cash and Credit Accounting Machines, of which I declare the following to be a full, clear, and exact description.

This invention relates to cash registers and among its objects is to provide a cash register adapted for keeping accounts by a system of punched cards. The machine is constructed for recording amounts by punching cards or sale slips in such manner that the cards or slips may be used for controlling devices of the machine on subsequent entries. It also accomplishes the usual functions of cash registers in recording transactions by totalizing the same in class of transaction totalizers, in salesmen's totalizers, by indicating, and recording by detail printing mechanism and check printing mechanism.

The invention also provides a novel and compact multiple totalizer construction.

A further object is to provide an improved construction including a series of total retaining devices, having the function of retaining securely the totals of transactions of various classes, and capable of having amounts added to or subtracted therefrom. These total retaining devices, of which a group each for four classes of transactions are shown, may take many forms, but are herein shown as each comprising a pair of plates, substantially parallel and one having corrugations, and rollers, one for each denomination of value within the range of the retaining device, riding in slots in the plates, and adapted to be held in any one of ten positions by the said corrugations.

Another object of the invention is to provide a printing mechanism having a plurality of sets of type wheels and a plurality of printing hammers with means for selecting certain hammers for operation, depending upon the class of transaction recorded or the mode of operating the machine.

Another object of the invention is to provide improved mechanism whereby different registering devices of the machine are selected for operation as required by the class of transaction recorded or the mode of operation.

Another object of the invention is to provide positive or springless carrying devices for totalizer actuating racks which are adapted to actuate one or a plurality of totalizing devices.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 2:
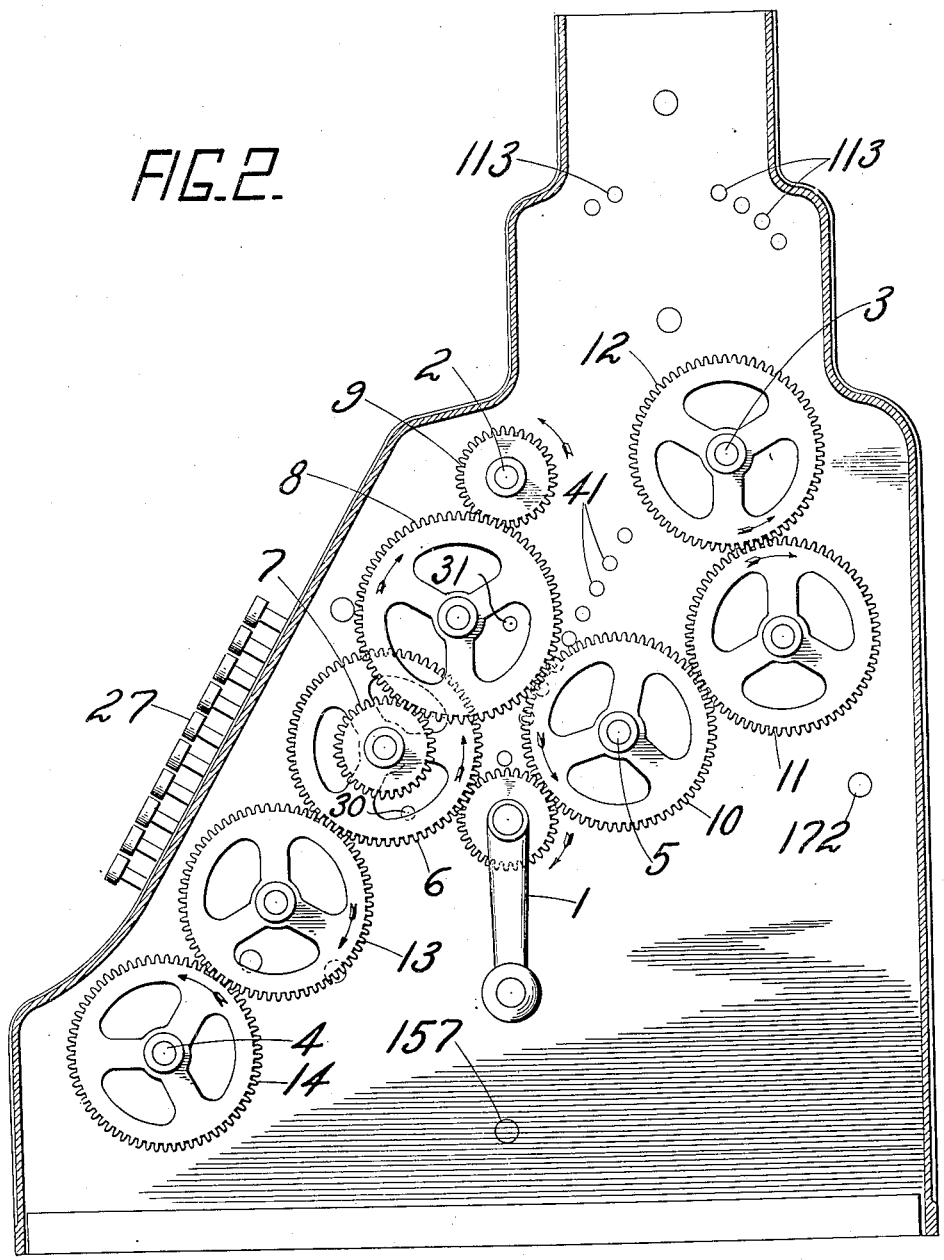
Figure 3:
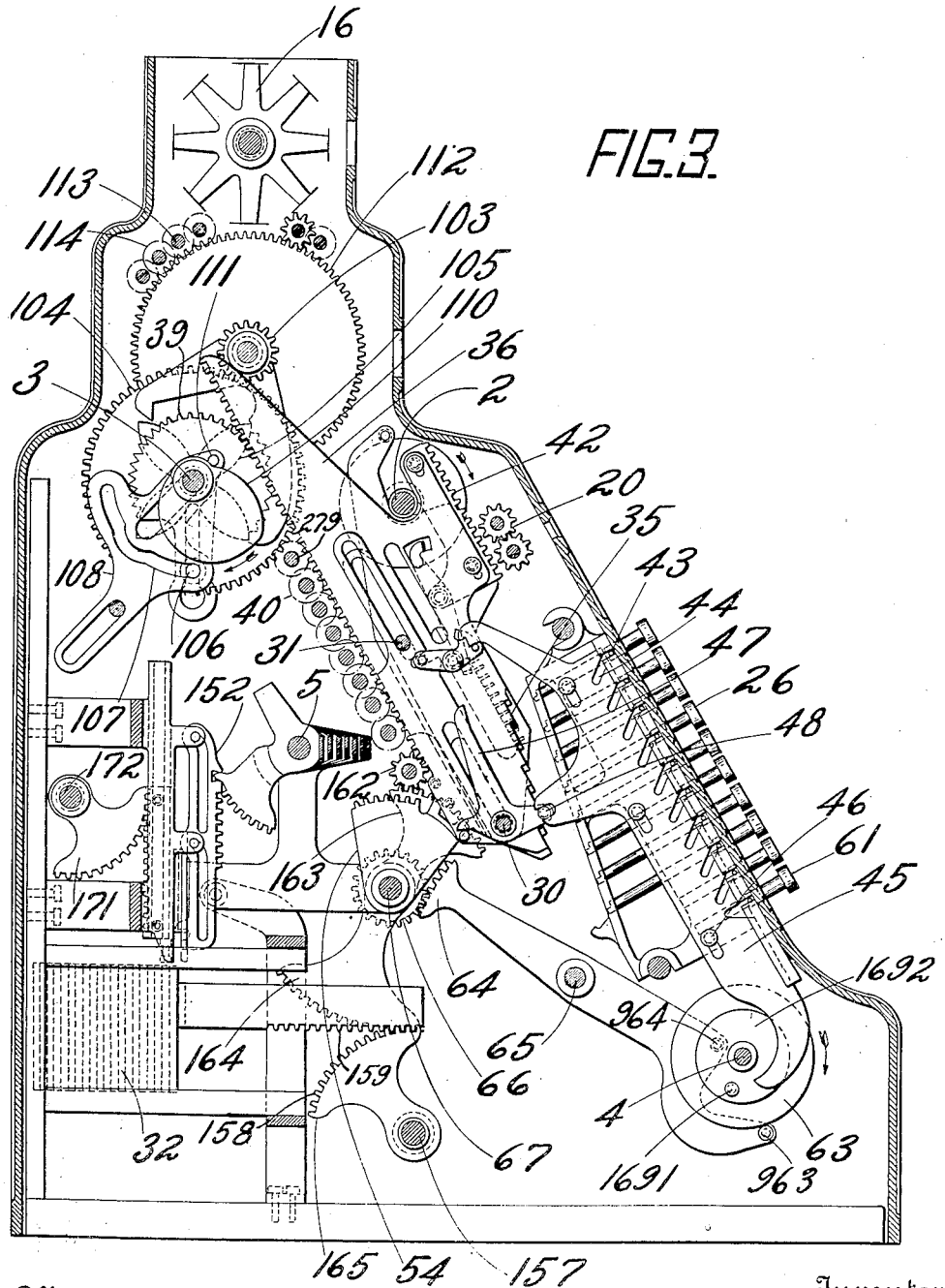
Figure 4:
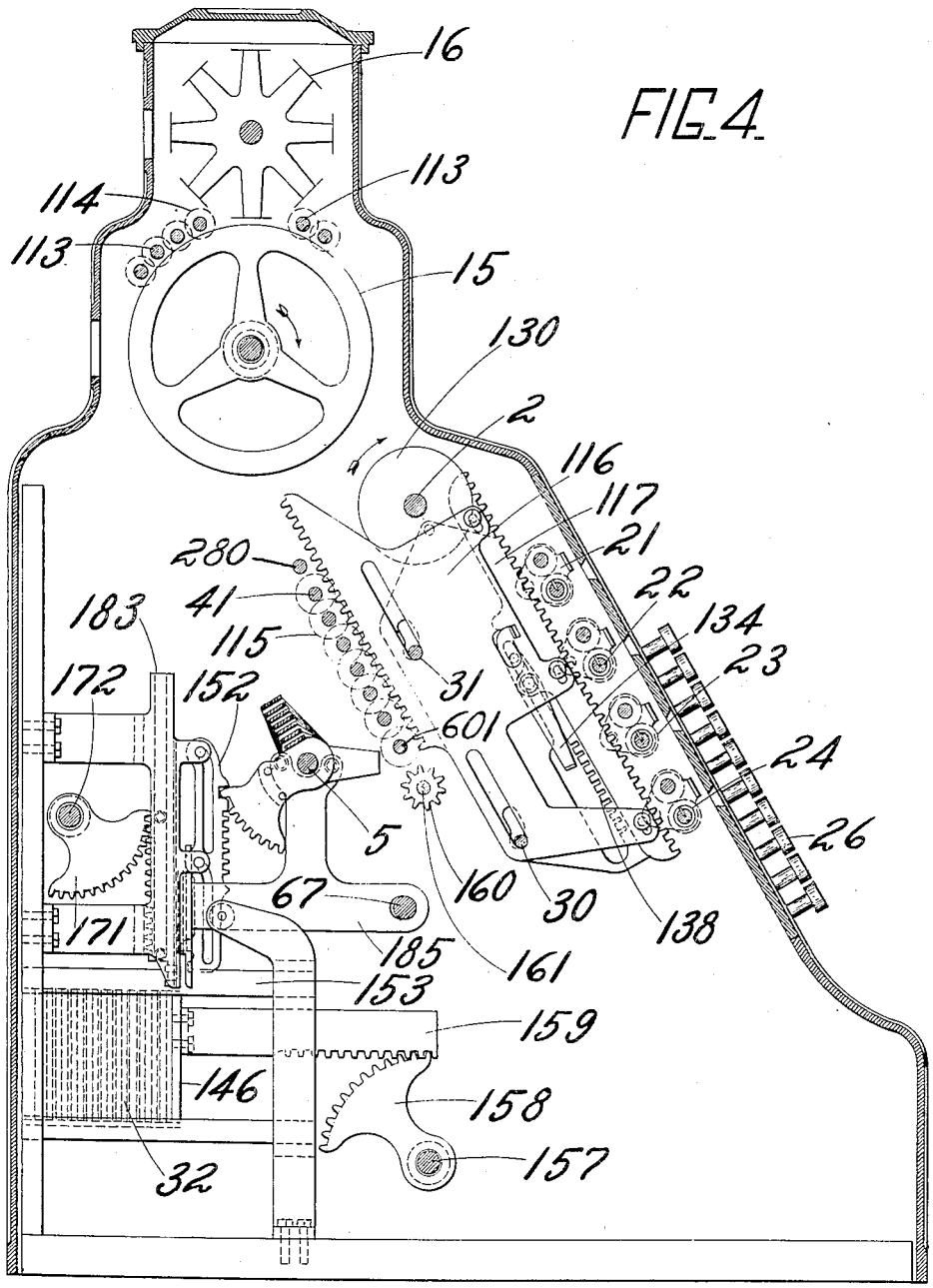
Figure 5:
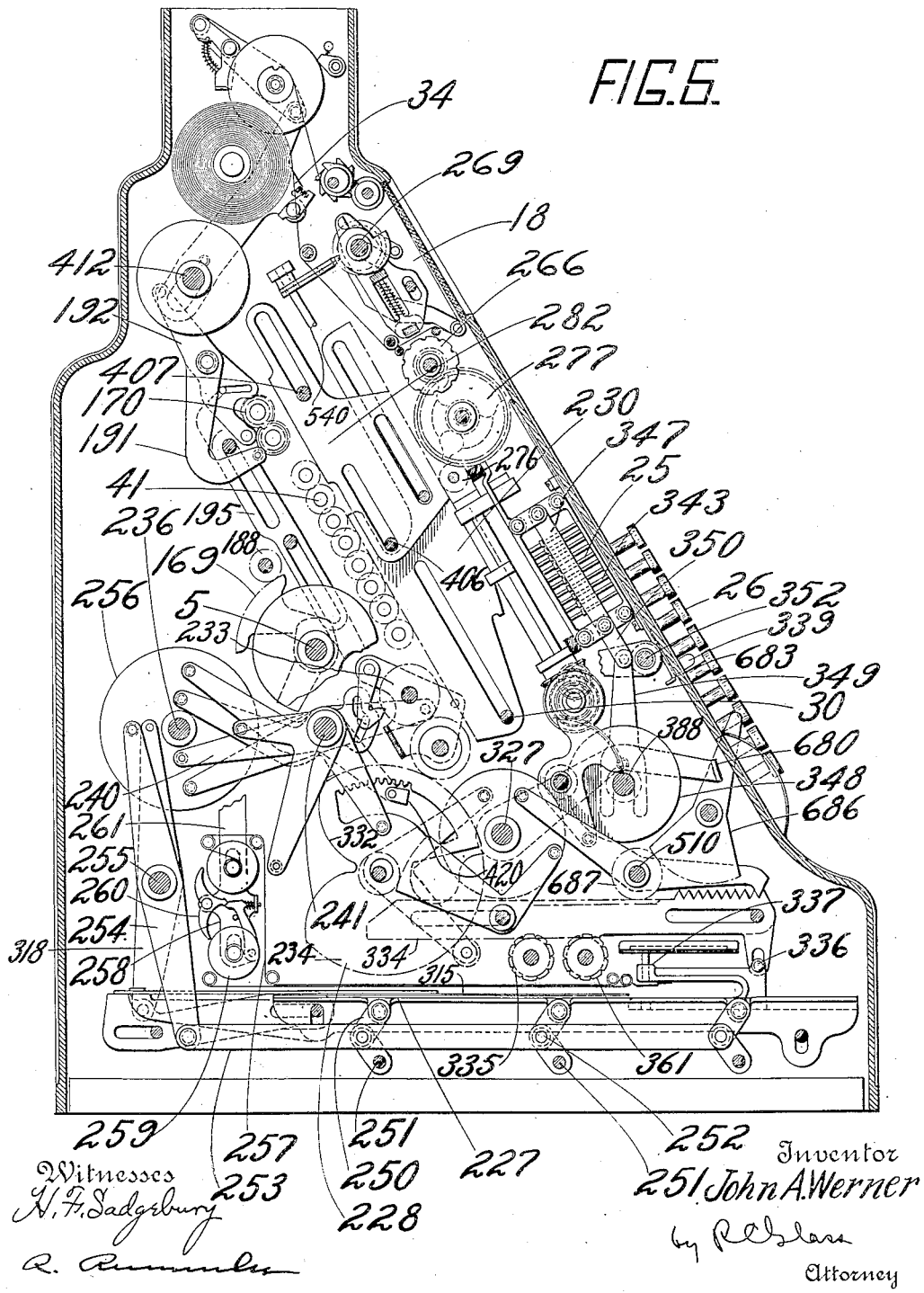
Figure 6:
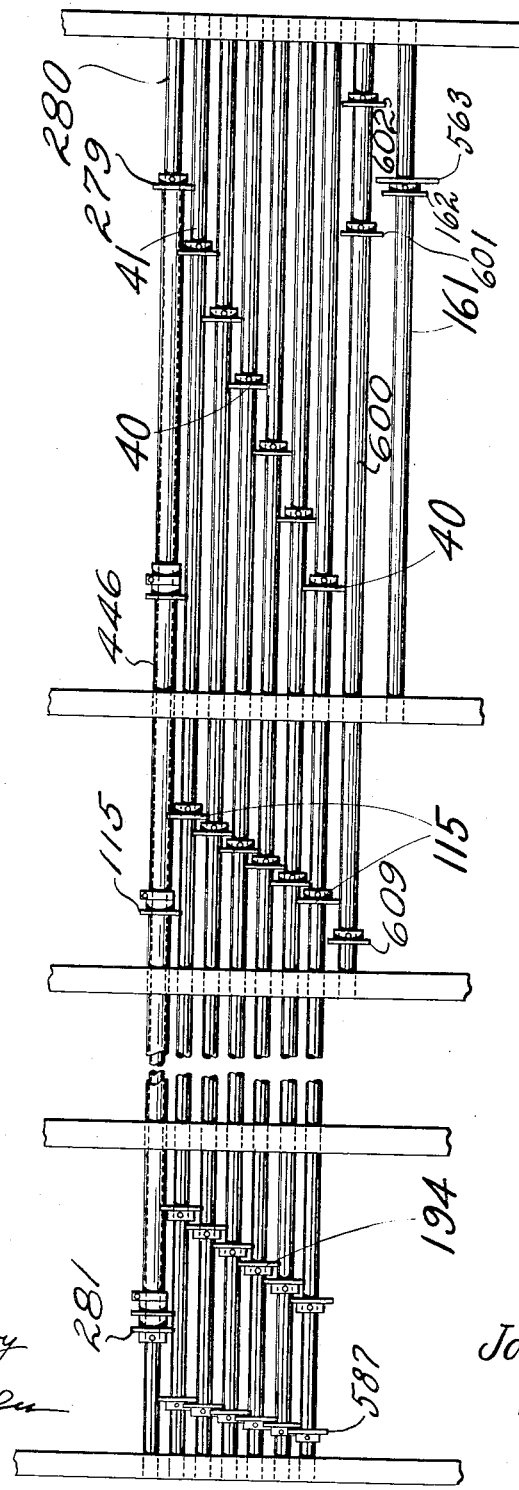
Figure 7:
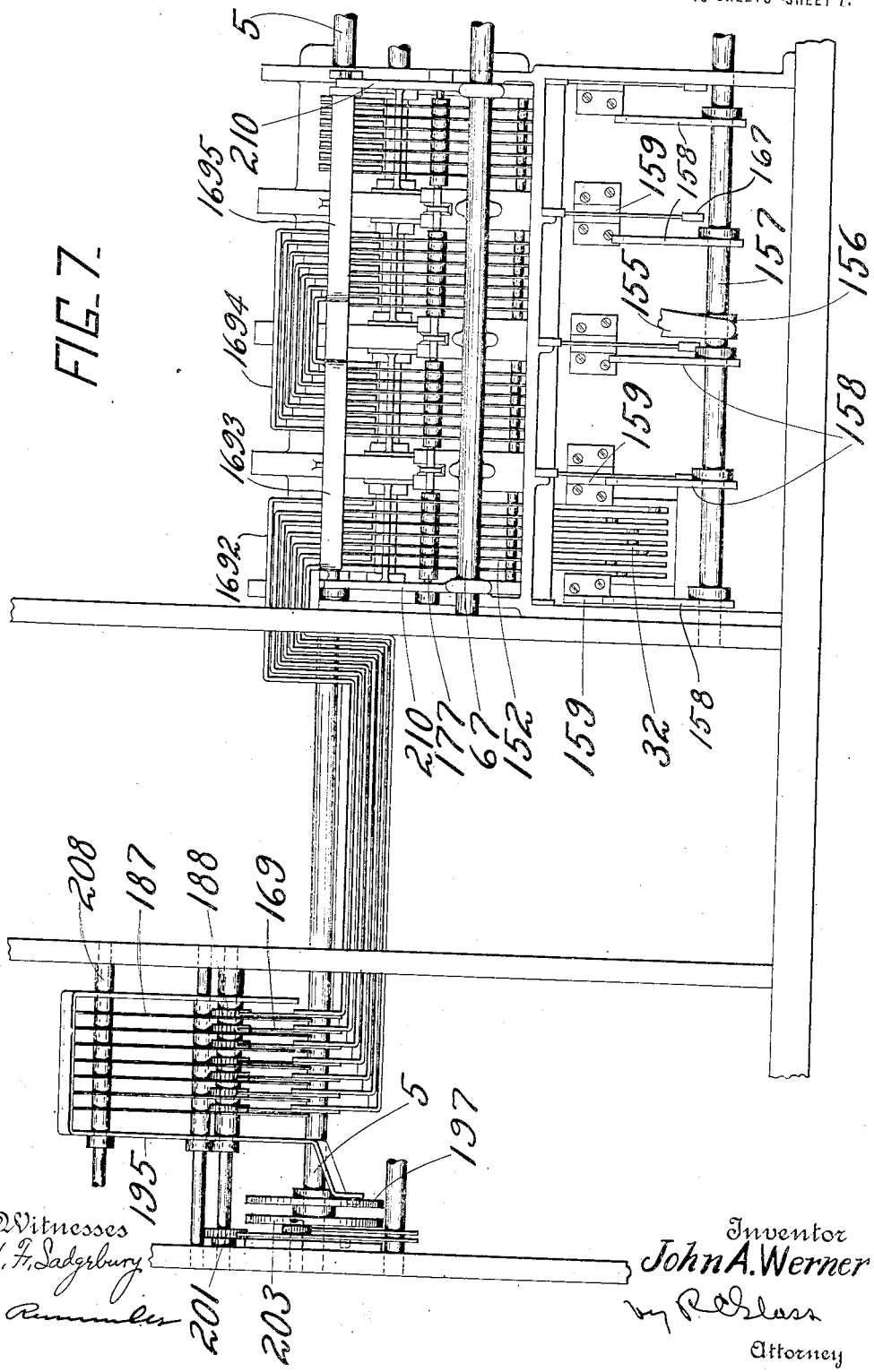
Figure 8:
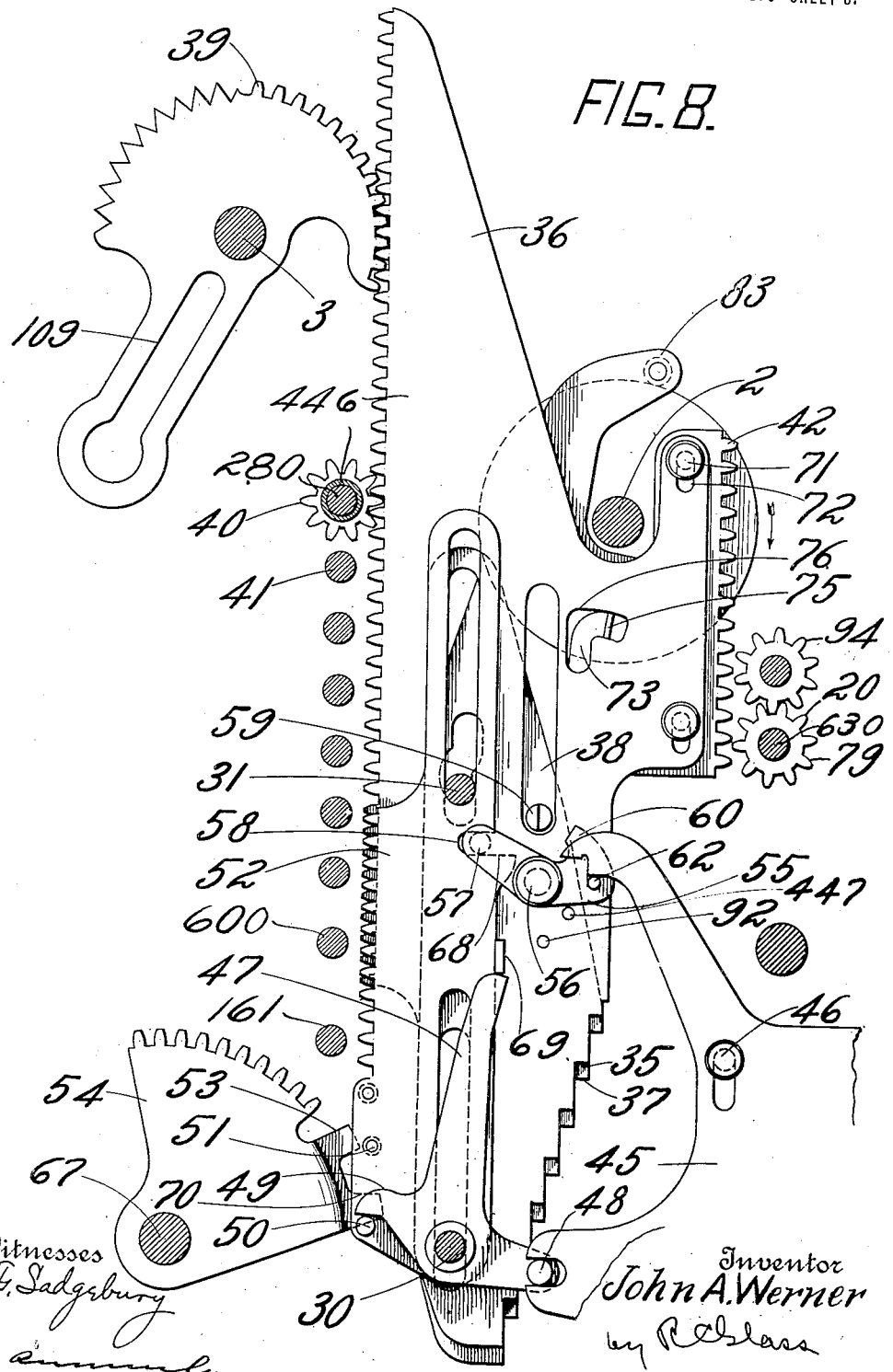
Figure 9:
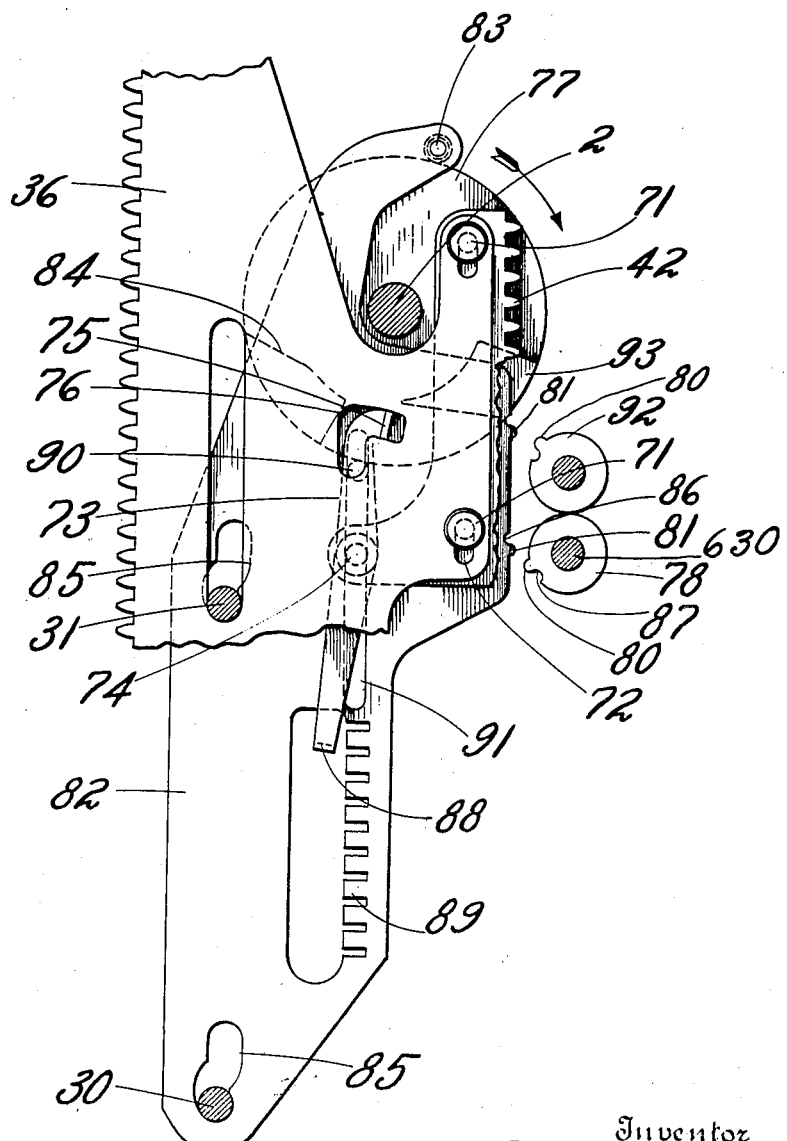
Figure 12C:
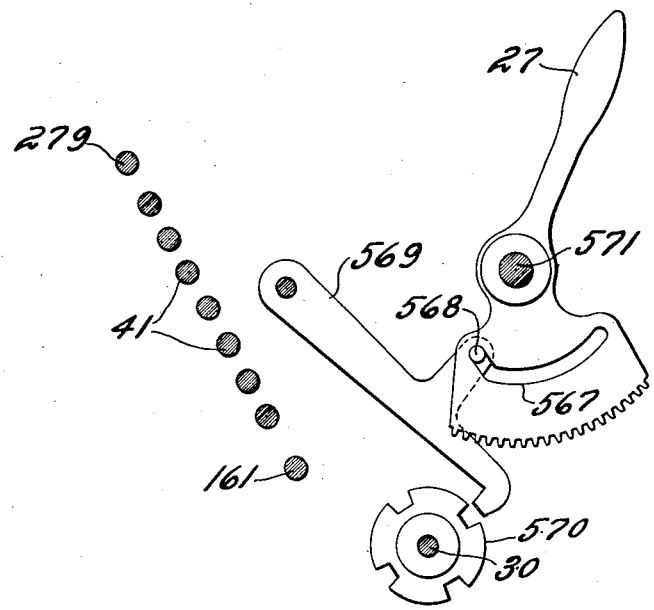
Figures 18, 19:
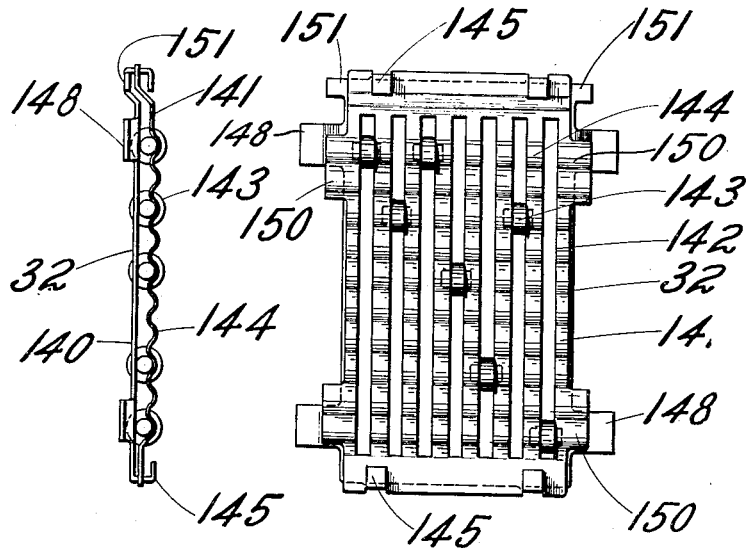
Figure 59:
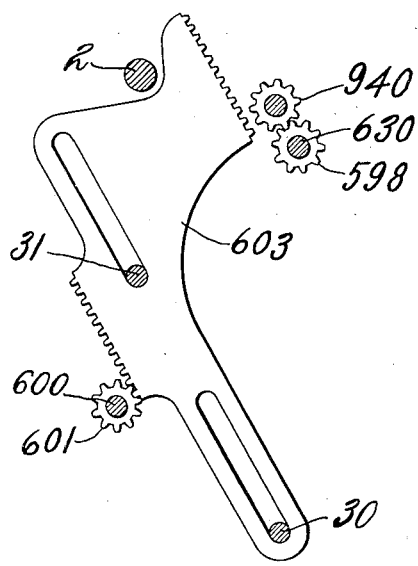
Figure 37A:
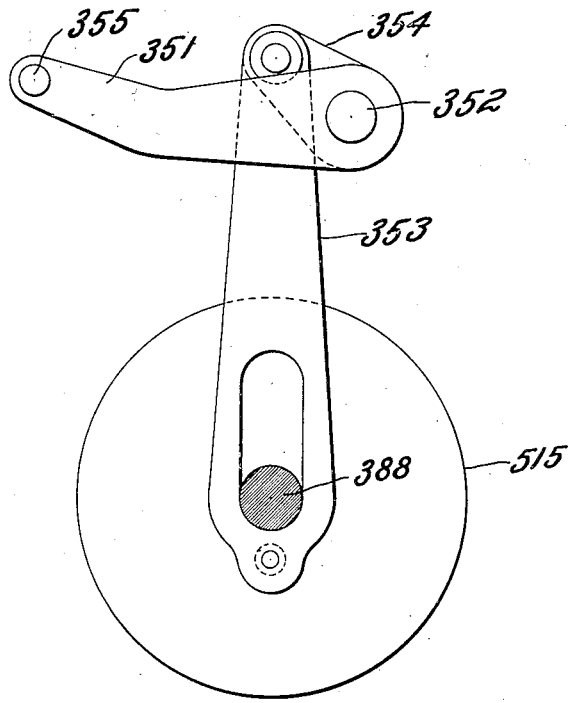
Figure 46:
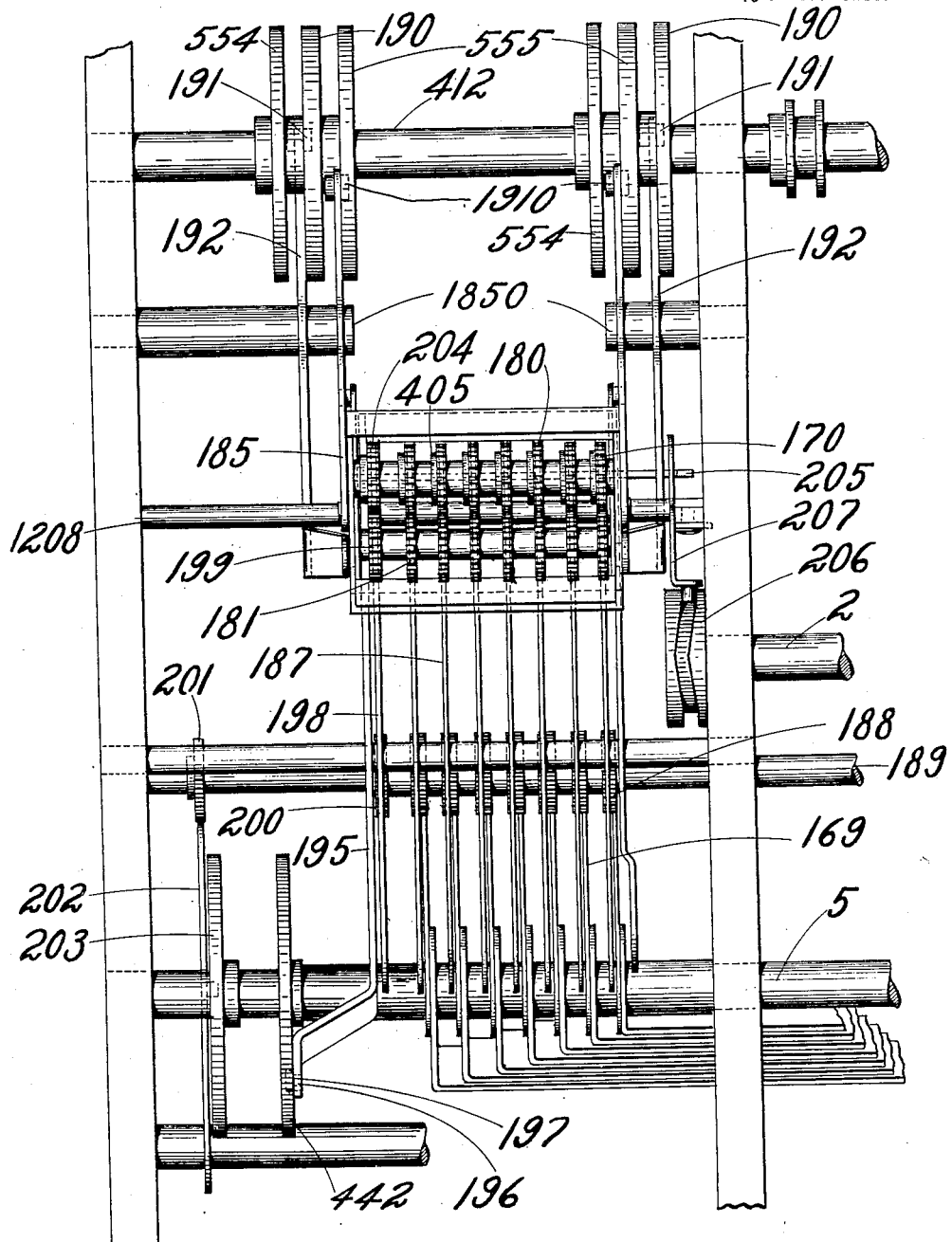

Figure 1 is a fragmentary front elevation, with the cabinet omitted, of a cash register constructed according to the invention. Fig. 2 is a right side elevation with the cabinet in section and showing the train of driving gears whereby power is transmitted to the drive shafts of the machine. Fig. 3 is a transverse vertical section on the line 3—3 of Fig. 1. Fig. 4 is a transverse vertical section on the line 4—4 of Fig. 1. Fig. 5 is a transverse vertical section on the line 5—5 of Fig. 1. Fig. 6 is a front elevation of a plurality of shafts, one of which is employed in resetting operations, and the others of which, arranged in denominational order, serve for transmitting differential movement determined by the keyboard to various registering devices of the machine. Fig. 7 is a front elevation of yoke connections between a salesman's subtotalizer and salesmen's total retaining devices. Fig. 8 is a left side elevation of differential mechanism which is controlled by banks of value keys. Fig. 9 is a left side elevation illustrating the transfer devices of the main or balance totalizer. Fig. 10 is a front elevation of devices for causing the main totalizer and a selected transaction totalizer to be brought to operative position for addition or subtraction, as required by the class of transaction which is entered, or for resetting purposes. Fig. 10ª is a front elevation of the main or balance totalizer. Fig. 10ᵇ is a detail of a main totalizer cam employed for rocking the totalizer when operations of addition are effected therein. Fig. 10ᶜ is a detail of a main totalizer cam employed for rocking the same when subtracting operations are performed therein. Fig. 11 is a left side elevation of controlling levers and related mechanism which serve for selecting desired totalizing devices for operation. Fig. 12 is another left side elevation which also illustrates the controlling levers but in combination with other mechanism which is directly related to these levers. Fig. 12ª is a left side elevation of a salesman's initial lever together with setting devices controlled thereby. Fig. 12ᵇ is a front view of the initial lever and its index plate. Fig. 12ᶜ is a detail in left side elevation of the initial lever, showing how this lever prevents subsequent adjustment of the transaction lever. Fig. 13 is a fragmental detail in transverse vertical section of mechanism which coacts with the controlling levers. Fig. 14 is a left side elevation of the transaction totalizers and their resetting rack. Fig. 15 is a front elevation of the transaction totalizers. Fig. 16 is a right side elevation of the transaction totalizers. Fig. 17 is a transverse vertical section through the transaction totalizers and their differential mechanism and carrying devices. Fig. 18 is a front elevation of one of the clerks' total retaining devices. Fig. 19 is a left side elevation of a retaining device. Fig. 20 is a left side elevation of the clerks' retaining device carriage and controlling devices. Fig. 21 is a top plan of the same. Fig. 22 is a front elevation of slip carriage mechanism for punched slips which may aid in controlling the operation of the machine. Fig. 23 is a left side elevation of the mechanism shown in Fig. 22. Fig. 24 is a bottom plan of the slip carriage mechanism. Fig. 24ª is a side view of customers' file number setting slides. Fig. 24ᵇ is a plan view of the file number setting slides shown in Fig. 24ª. Fig. 25 is a left side elevation of a customer's subtotalizer for controlling the slip punching and printing mechanism. This view shows the subtotalizer in its normal position. Figs. 26 to 29 inclusive are views in the nature of diagrams of the mechanism shown in Fig. 25, Fig. 26 showing the subtotalizer when being added to by the differential mechanism, Fig. 27 showing it after such operation, Fig. 28 showing it when being subtracted from by said mechanism, and Fig. 29 showing it in position to be reset. Fig. 30 is a front elevation of certain devices co-acting with the customer's subtotalizer. Fig. 31 is a left side elevation of the subtotalizer and its controlling mechanism in the position in which it would be in immediately after having been reset and before the drive shafts have come to rest. Fig. 32 is a top plan of the mechanism shown in Fig. 31. Fig. 33 is a front elevation of the subtotalizer. Fig. 34 is a left side elevation of the subtotalizer. Fig. 35 is a vertical section of a resetting cam for the subtotalizer mechanism. Fig. 36 is a front view of the cam shown in Fig. 35. Fig. 37 is a left side elevation of the differential mechanism which actuates the subtotalizer. Fig. 37ª shows a cam for driving parts in Fig. 37. Fig. 38 is a front elevation of the slip printing mechanism. Fig. 39 is a right side elevation of the slip carriage and platen. Fig. 40 is a top plan of the slip carriage. Fig. 41 is a top plan of the slip printing and punching mechanism. Fig. 41ª is a detail of connections for setting initial type carriers of the slip printing mechanism. Fig. 42 shows one of the printed slips and punched cards which are issued by the machine. Fig. 43 is a front view of the check feeding mechanism and clutching devices of the same. Fig. 44 is a left side elevation of the check feeding mechanism. Fig. 45 is a left side elevation of the salesmen's subtotalizer and part of its differential mechanism, and the record strip printing mechanism. Fig. 45ª is a detail illustrating the manner in which the transfer slides for the salesmen's subtotalizer are supported when a salesman's total retaining device is reset. Fig. 46 is a front elevation of the salesmen's subtotalizer and controlling mechanism. Fig. 47 is a left side elevation of mechanism shown in Fig. 46. Fig. 47ª is a detail of a resetting spline in the salesmen's subtotalizer. Fig. 47ᵇ is an enlarged detail in side elevation of the salesmen's subtotalizer. Fig. 48 is a left side elevation of the setting mechanism for the initial type carrier of the record strip printing mechanism. Fig. 49 is a left side elevation of the record strip printing mechanism illustrating the hammer mechanism. Fig. 50 is a bottom sectional view of certain hammer selecting mechanism taken on line 50—50 of Fig. 49. Fig. 51 is a front elevation of the record strip printing mechanism. Fig. 52 is a fragmentary front elevation showing various clutching and selecting devices. Fig. 53 is an enlarged detail of mechanism shown in Fig. 52 and showing how the salesmen's retaining devices are made inoperative during resetting of other totalizing devices. Fig. 54 is a left side elevation of parts shown in Fig. 53. Fig. 55 is an enlarged detail of mechanism shown in Fig. 52 and showing a resetting shaft and operating devices therefor. Fig. 56 is a left side elevation of parts shown in Fig. 55. Fig. 57 is a detail of the restoring means for certain transaction and resetting selecting shafts. Fig. 58 is a detail in right side elevation of a key detent and certain connections controlled thereby. Fig. 59 (Sheet 19) is a right side elevation of a rack which serves to transmit power from the driving mechanism of the machine to the main or balance totalizer on resetting operations of this totalizer. Fig. 60 is a diagram or chart showing the comparative times of action of cams which are operated by rotating drive shafts.

The present invention relates to a machine for keeping commercial accounts by printing and punching sale slips and entering different classes of transactions in class of transaction totalizers, salesmen's total retaining devices, on a record strip and on a check strip. The machine is also provided with the usual indicators for indicating amounts of transactions, classes of transactions, and salesmen's initials.

The indicator mechanism, keyboard, and part of the differential mechanism controlled thereby is part of the subject matter of a copending United States patent application, Serial No. 375,664, filed by John A. Werner, on May 25, 1907.

A cash transaction is entered by setting the amount of the transaction by value keys and setting a salesmen's initial lever. A driving crank handle is then twice rotated, causing the amount determined by depressed keys to be added to the main totalizer, to the cash totalizer of a group of transaction totalizers and also of one of the cash group of salesmen's total retaining devices. The selection of this last mentioned device is determined by a salesmen's inital lever. Drum indicators are set to indicate the amount of the transaction, the initial of the salesman, and also the class of transaction. A detailed printed record is made upon a record strip which the machine contains and a detailed printed check is issued by the machine.

A paid out transaction is entered by depressing the desired value keys, setting the initial lever, and shifting a sales lever or transaction determining lever one space from its cash or normal position to its paid out position. The shifting of this lever causes controlling mechanism in the machine to be so positioned that the main totalizer is subtracted from instead of added to, the purpose of this being that the main totalizer may always represent the actual amount of cash in the drawer, and it also selects the paid out totalizer of the group of special totalizers instead of the cash totalizer which would normally be selected if the transaction lever were not shifted. The particular one of the paid out group of salesmen's retaining devices has also added thereto amounts depending upon the particular value keys depressed. This device is selected by moving the sales lever to the paid out position and also by shifting the initial lever. The sales lever serves to bring the group of paid out retaining devices to operative relation and the initial lever serves to shift this group so that a particular one of these devices will be actuated. A detailed record is printed as in a cash entry but a character is printed at the side of the record which indicates that it relates to a paid out transaction. At paid out entries the check printing mechanism is used to print records on inserted slips which are placed on a suitable table before operating the driving crank. Upon the operation of the machine the table is drawn into the machine so that a slip is brought beneath the type carriers to receive an impression and then at the completion of the operation of the machine the table is again moved to its outer position. The object of printing upon an inserted slip instead of a check at paid out operations, is to have the paid out records which are retained by the operator distinguished from the checks which are usually presented customers at cash transactions. The indication shows the class of transaction, amount, and the initial of the salesman.

A charge transaction is entered by placing a blank sales slip on the receiving table for such slips, the sales lever is shifted to the charge position, the desired value keys are depressed, the salesman's initial lever is set, and the driving crank is operated as usual. This class of transaction is recorded by adding its amount to the charge totalizer of the the transaction totalizers, is indicated, and is also recorded in the detail record strip printing mechanism, but the main totalizer is left in an inoperative position. The slip of check printing mechanism is positioned so that it not only prints a complete record on the inserted slip but also punches holes in the slip at different points so that these holes are also a complete record of the transaction, and the amount represented by the punched holes may be transferred to subtotalizing and printing devices by operating the machine in such manner that the punched slip is employed to control differential mechanism for actuating the subtotalizing and printing devices. When a succeeding charge transaction with the same customer is entered, the punched slip issued at the previous charge entry is placed on another slip receiving table in the machine and a blank slip is placed on the receiving table previously mentioned. The value keys and initial lever are adjusted and the operating handle is operated as usual, causing the correct indication and the selection and operation of certain of the totalizers, and a record to be made by the printing mechanism. The slip carrying tables are drawn into the machine, the previously punched slip controlling certain differential mechanism so that the record which is finally printed and punched upon the blank slip will correspond to the amount of the previous transaction, plus the amount of the present transaction. The slips are then issued from the machine and the newly printed and punched slip is filed in place of the old one which was used to control the differential mechanism. If the next transaction with the same customer is a credit transaction, the previously printed slip is employed to control the differential mechanism of the machine; but by shifting the sales lever to credit position, the amount to be determined by the keyboard, is so transferred to a subtotalizing device that the final setting of the subtotalizing device will be at the difference between its forward positioning by the punched sales slip and the amount of movement of the differential mechanism while controlled by the value keys. Thus the sales slip which is issued by the machine at this entry has a printed record and a punched record representing the standing of the customer's account after the transaction. During this entry the main totalizer and the credit totalizer, of the group of transaction totalizers, are added to. The indicators are set as usual and a detailed record is printed on the record strip. A selected one of the salesmen's retaining devices is also added to.

The machine is so constructed that by shifting a resetting lever and the transaction lever to different positions, and operating the driving crank handle any desired totalizing device or any total retaining device may be reset and its total printed on the record strip.

In the foregoing outline of operations the various mechanisms of the machine were mentioned. In the following detailed description, after pointing out the relative locations of the principal elements of the machine, its various mechanisms will be described in the order here given, namely: driving mechanism, keyboard and differential mechanism, indicators, main or balance totalizer, class of transaction totalizers, salesmen's total retaining devices, punched slip or card carriage mechanism, sale slip printing and punching and check printing mechanism, record strip printing mechanism, and resetting devices. This will be followed by a description of the various modes in which the machine may be operated for recording transactions of different classes, and for resetting and printing the totals of any desired totalizing device of the machine.

Referring to Fig. 1, the relative arrangement of the main elements of the machine, with the exception of the salesmen's retaining devices and certain subtotalizers or computing devices, may be seen. These elements are two sets of value indicators 15, transaction indicator 16, two salesmen's initial indicators 17, record strip printing mechanism 18, sales slip printing and punching and check printing mechanism 19, main or balance totalizer 20, class of transaction totalizers, viz., cash totalizer 21, paid out totalizer 22, credit totalizer 23, charge totalizer 24, card controlled mechanism 25, including customer number setting slides 339, five banks of value keys 26, a salesman's initial lever 27, transaction lever 28, and resetting lever 29.

The transaction lever 28 is manually operated and by rocking it to different positions differential rotation of a shaft 30 is accomplished and through this shaft the selection of various registering devices is attained. Resetting lever 29 is also manually operated and is employed to select totalizing devices for the purpose of resetting through the medium of a shaft 31.

The salesmen's total retaining devices 32 are shown in Fig. 3. These are grouped according to classes of transactions, with one device in each group for each position of the salesmen's lever. The machine is adapted to make records of four different classes of transactions and therefore four carrying frames for the salesmen's retaining devices are provided. These carrying frames 146 are shown in Fig. 1 below the transaction totalizers and the keyboard.

A salesmen's subtotalizer 170 and a customer's subtotalizer 233 are shown in Fig. 5. The purpose of these devices in the case of the customer's subtotalizer is, as before mentioned, to compute the differences between customers' accounts before and after transactions, while in the case of the salesmen's subtotalizer it is to receive the setting of a salesman's retaining device before a particular transaction is entered, and then in addition, to receive the amount of such transaction and finally to transmit its setting to the salesman's retaining device, thereby eliminating carrying operations in said devices, as by performing additions in the subtotalizing device, all carrying for the retaining devices may be accomplished by a single set of carrying devices with which the subtotalizer is provided.

*Driving mechanism.*—The machine is provided with four main drive shafts 2, 3, 4, and 5, (Fig. 2), which are caused to make one rotation in the directions indicated by the arrows at each operation of the machine, by twice rotating a crank 1. This crank is secured to a pinion which meshes with gears 6 and 10, and the drive shaft 2 is rotated through a train of gears 6, 7, 8, and 9; the shaft 3 is rotated through a train of gears 10, 11, and 12; the shaft 4 is rotated through a train of gears 6, 13, and 14; and the shaft 5 through gear 10 meshing with the pinion.

*Keyboard and differential mechanism.*—Transactions are entered in the machine by adding the amounts to various registering devices, and by printing the amounts on a strip of detail record paper, by printing a check or printing and punching a sales slip, and also setting indicators according to the manipulation of the keyboard. To do this it is necessary differentially to actuate to similar extents elements of corresponding denominational value for the totalizing devices, the indicators, and the printing and the punching mechanism. The differential mechanism employed is shown in Figs. 3 and 8. The keyboard controls this mechanism, and to this end the keys are arranged in banks of different denominational orders, and as shown in Fig. 1, the value of the keys is successively greater from top to bottom. The keys are depressible for the purpose of carrying their shanks into the paths of graduated shoulders 35 of racks 36 of the differential mechanism and shoulders 37 of trip slides 38, which are moved with the racks. The differential racks 36 mesh with indicator setting segments 39, and with pinions 40 on shafts 41 and a sleeve 446, by which the differential movement of the racks is transmitted to totalizing and printing devices, and also carry racks 42 for the purpose of differentially rotating the main totalizer 20.

The function of the trip slides is that of disconnecting the differential racks 36 from the driving mechanism when the shoulders of the racks engage depressed keys. The driving mechanism includes a set of reciprocative intermediate racks 52 for driving the differential racks, and the intermediate racks reciprocate invariable extents, therefore in order to convert their invariable movements into differential movements of racks 36, it is necessary to provide means under the control of the keyboard for connecting and disconnecting the racks 36 and their driving racks, the disconnecting occurring when racks 36 have been driven the desired extents. The intermediate racks are driven by oscillatory segments 54 and the racks and segments should normally be disconnected so that the racks will not be moved if keys in their respective banks are not depressed. Each rack 36 is normally connected by a pawl to one of the intermediate racks and the depression of a key will cause the intermediate rack in its respective bank to be connected to one of the segments of the driving mechanism.

It will be understood that there is one rack 36 and connecting devices, such as shown in Figs. 3 and 8, for each bank of value keys. When a key is depressed a pin 43 on the key enters an inclined slot 44 in a plate 45 causing the plate to move upwardly along its guiding pins 46. A pawl 47 is pivotally connected to the plate 45 by a pin 48 on the pawl extending through a notch in the plate, and pawl 47, which is loosely pivoted on a shaft 30, and normally supports rack 52 by engagement with its lug 69, has a rearward extending shoulder 49, which, when the pawl is rocked rearwardly upon the rise of the plate, engages a pin 50 on the intermediate rack 52, thereby causing the rack to be slightly lowered so that a pin 51 on the rack enters the arc of movement of a shoulder 53 on an oscillatory segment gear 54. The intermediate rack 52 is normally connected to the differential rack 36 by a pawl 55 pivoted by a pin 56 to the rack 36 and carrying a pin 57 extending into a notch 58 in rack 52. The pawl cannot rock out of engagement with rack 52 when rack 52 moves down as it is limited in its rocking movement by a pin 59 which is carried by trip slide 38 and coacts with a shoulder 60 of the pawl. Accordingly pin 59 must be moved clear of the pawl in order to disconnect rack 36 from rack 52 when rack 36 is lowered to the desired extent. This is accomplished by causing a relative movement between rack 36 and slide 38 when coming into contact with a depressed key as later explained.

If a key is depressed by mistake it may be released and the corresponding rack 52 restored to its original position before the operation of the machine by the depression of the release key 61, (Figs. 1 and 3), in such bank. A pin which is carried by the release key coacts with an inclined edge of a slot in the plate 45 which extends at such an angle as to cause the return of the plate to its original position by depression of the release key. The plate extends over a pin 62 (Fig. 8), on pawl 55 and when the plate is lowered to its original position, rocks the pawl back to its original position, thereby returning the rack 52.

To continue the description of the differential mechanism, and assuming that the desired ones of the racks 52 have moved their initial extents by depression of keys, the differential mechanism is now in condition for actuation by the segments 54 driven from shaft 4 upon the rotation of crank 1. The drive shaft 4 carries a cam 63, (Fig. 3), for oscillating a toothed member 64, which is pivoted on a shaft 65, and meshes with a pinion 66, fast on a shaft 67, to which are rigidly secured the segment gears 54. The racks 52 are carried downward a sufficient distance to cause the racks 36 to move their entire nine units of movement, if necessary. If a key of less value than nine is depressed, its respective rack 36 will be stopped after having traveled a number of units equal to the value key, by one of its shoulders 35 engaging the shank of the key. A little in advance of the engagement of shoulder 35 with the key, the corresponding shoulder 37 of trip slide 38 will engage the key, stopping the trip slide before the rack 36 is stopped, thereby permitting a slight relative movement between the trip slide and its corresponding rack. This relative movement between the trip slide and its rack disengages pin 59 from pawl 55 and continued movement of rack 52 rocks pawl 55 around its pivot, permitting pin 57 to be carried out of notch 58, disconnecting the rack 52 from rack 36, and permitting rack 52 to complete its stroke. The pawl 55 is limited in rocking when disconnected from rack 52 by a pin 92 on rack 36 for the purpose of preventing it from accidentally rocking to an inoperative position.

The desired differential rotation of shafts 41 is thus attained, but in order to allow time for transferring the setting of a salesman's retaining device to a certain subtotalizing device and for bringing various registering devices into coöperative relation with the differential mechanism, as explained farther on, the differential rotation of the shafts 41 on the down stroke of the racks 36 does not occur until the main drive shafts have rotated about eighty degrees. The racks 52 are restored during the last fifty degrees of rotation of the main drive shafts by the mechanism which lowers the racks, namely, the cam 63, toothed member 64, pinion 66, shaft 67, and segment gears 54. During the rise of racks 52 shoulders 68 on the racks engage the pins 57 on pawls 55 swinging the pawls back to their normal position and then through the pawls engaging the pins 447, lifting the racks 36 to their home positions.

The plates 45 are returned to normal position, during the restoring of the differential mechanism and after the keys are released, by being engaged at their lower ends, (Fig. 3) by pins 1691 carried by disks 1692 rigidly mounted on the drive shaft 4.

The depressed keys are retained in their depressed positions the desired length of time by detents 547, (Fig. 58). When keys are depressed their pins 43 engage inclined surfaces 675 of the detents causing the detents to lower against tension springs 680, and when the pins of the keys reach the inner ends of slots 677, the detents spring upwardly under the action of their springs engaging the pins at the offset parts of the slots and retaining the keys in their depressed position. At the proper time near the completion of the operation of the machine, pins 650 on disks 651 carried by drive shaft 4 engage extensions 678 of the key detents forcing the detents downward and releasing the keys. The disks 651 also coact with flanges 679 of the key detents for the purpose of preventing movement of the key detents during operation of the differential mechanism and consequently preventing manipulation of the keys at such time.

The racks 52, (Fig. 8), are normally held in their zero positions by the pawls 47, which, to this end, as stated, coact with lugs 69 on the racks 52, and the pawls 47 are returned to normal position after the return of the racks by return movement of plates 45. In order to cause the lugs 69 to be carried above the pawls 47 and to provide for the initial movement of racks 52, a slight overthrow of segments 54 is effected and the segments returned to normal position as shown in Fig. 8 at the completion of the operation by suitably forming the cams 63, (Fig. 3). During the overthrow of the segments the final upward movement of racks 52 occurs by engagement of lugs 70 on the driving segments with pins 51.

The keyboard and differential mechanism just described are similar to that disclosed in the patent application previously mentioned.

The initial lever 27 is set before the setting of the transaction lever 28 and before the operation of the crank handle 1. The lever 27 (Fig. 12$^a$) is pivoted on a stud 571 and is provided with rack teeth 560 meshing with a segment gear 561 loose on the transaction shaft 30 but rigid with a smaller gear 564. The segment gear 561 meshes with the gear 563 fast to the initial shaft 161. This shaft carries a gear 162 meshing with a rack 562 and with a segment 164. Consequently the rack 562 and the segment 164 are differentially set according to the setting of the initial lever 27. The rack 562 serves to set the initial indicators in the same manner as the racks 36 serve to set the value indicators described farther on. It also meshes with a pinion 279 on the shaft 280 and by means of this shaft effects the setting of an initial type carrier in the record strip printing mechanism.

Differential movement of the segment 164 serves to draw forwardly the selected bank of salesmen's retaining devices so that a particular one thereof will come into operative relation with certain actuating mechanism. For this purpose segment 164 meshes with a segment gear 165 fast on shaft 157. This shaft carries segments for meshing with racks 159 fast to carrying frames for the retaining devices, as will appear farther on.

For the purpose of restoring the initial lever 27, a restoring segment 565 meshes with gear 564 and carries a roller coacting with a cam 566 on drive shaft 4. This cam is so located on the drive shaft 4 as to restore the initial lever near the completion of the operation of the machine but before the restoring of the transaction lever 28, as explained farther on. The restoring of the transaction lever shifts the retaining device carrying frames sidewise to normal position while the restoring mechanism for the initial lever shifts them backwardly into the machine, consequently the initial lever must be restored first as the sidewise movement of the retaining device carrying frames unmeshes certain segment gears carried by the shaft 157 from the racks 159.

In Fig. 12$^b$ is shown an index plate provided with initial letters for the purpose of guiding the operator in setting the lever 27 which carries a pointer 572 indicating the setting thereof.

Fig. 12ᶜ shows an arrangement controlled by the initial lever 27 for locking the transaction shaft 30 against rotation when the initial lever is set. This is for the purpose of compelling the selection of the proper bank of salesmen's total retaining devices before a particular one of a bank is selected by the operation of lever 27 and is simply for insuring that the desired bank will be drawn forwardly upon the operation of lever 27. The lever is provided with a cam groove 567 coacting with a pin 568 on a locking pawl 569 pivoted to the frame of the machine. The locking pawl coacts with notches cut in a disk 570 fast to the shaft 30. There are four notches in the disk 570 as the transaction shaft may have four different settings, as will be more fully described.

*Indicating mechanism.*—The indicating mechanism is also part of the subject matter of the patent application before referred to and is here but briefly described. The value indicators 15 are set by the racks 36 meshing with the segments 39, (Fig. 8), which are part of the indicator setting mechanism. Each of the right hand set of indicators 15, (Fig. 1), is rigid with a pinion 103, (Fig. 3), meshing with a gear 104 which is secured to a four-armed star wheel 105. There is a four to one ratio between the pinions 103 and the gears 104 and accordingly a part rotation of a star wheel causes four times as much rotation of its corresponding indicator and as it is not necessary to rotate the indicators more than one-half of their circumferences, it is never necessary for a star wheel to make as much as a one-fourth rotation. Each star wheel is differentially actuated by a roller 106 which extends through a slot 107 substantially concentric with the star, in a reciprocating member 108. Each roller 106 also extends through a radial slot 109, (Fig. 8), in one of the segments 39. Movement of each segment 39, as controlled by its rack 36, causes its respective roller 106 to be positioned in the slot 107 accordingly, and the member 108 is then reciprocated radially with respect to shaft 3 by a cam 110 which is carried by shaft 3 and coacts with a pin 111 on the member 108. The reciprocation of member 108 causes its respective roller 106 to move along the slot 109 into engagement with the star wheel 105, thereby rotating the star wheel an extent determined by its previous setting, and the angular position of the slot 109 as determined by the differential movement of rack 36. By this means the indicators are rotated directly from their previous setting to a setting indicating the new registration. The differential rotation of the right hand set of indicators is communicated to the left hand set through gears 112 which are rigid with the indicators, connecting shafts 113, and pinions 114.

The transaction indicator 16 is set by movement of sales lever 28, (Figs. 11, 12, and 13). Lever 28 is pivoted to a frame of the machine by a pin 2801, and is provided with rack teeth 294, for meshing with a pinion 295 fast on shaft 30. Shaft 30 carries another pinion 2951, meshing with a rack 518 slidably mounted on fixed pins 2953. The rack 518 meshes with a pinion 5180, (Fig. 13), which is rigid with the transaction indicator 16. If the transaction lever 28 is in its normal or upper position, the words "Cash" will be exhibited at the sight openings in the machine cabinet. If the lever is moved downwardly to its next position, the words "Paid out" will be exhibited and if moved to its third position, the words "Credit" will be exhibited and if to its fourth position, the words "Charge."

*Main or balance totalizer.*—The main totalizer 20 (Fig. 11), accumulates amounts of cash transactions but is subtracted from, when "paid out" entries are made. In other classes of transactions, it is left in its normal or inoperative position. It is pivoted to the machine frame by pins 96 and comprises two sets of intermeshing pinions 79 and 94 and one set of numbered drums 97, (Fig. 10), which are rigid with the pinions 79. During an operation of addition to the main totalizer, such as in a cash entry, the pinions 94 perform no function and are therefore merely idly rotated upon rotation of their companion pinions 79. At cash entries it is necessary to rock the totalizer from its normal position, as shown in the drawings, so that its pinions 79 mesh with the racks 42 (Fig. 8) before the racks start to move downwardly, to hold the pinions 79 in mesh during the down stroke of the racks and then to rock the totalizer back to its normal position so that it will be free from the racks during their return stroke. This is accomplished by a cam 98, (Figs. 10, 10ᵇ and 10ᶜ) which is carried by the drive shaft 2, and when the transaction lever 28 is in its normal or cash position, this cam is in position to engage a roller 99 on the slide 100 which carries a pawl 101, (Fig. 11) normally in engagement with a pin 102 on the totalizer frame, therefore the totalizer is rocked into and out of mesh according to the reciprocation of slide 100 as controlled by cam 98.

If the transaction lever is shifted away from its normal position, shaft 30 will be rotated accordingly and this shaft carries a pinion 296 meshing with a rack 297 provided with a shoulder 298 which normally engages the pawl 101 carried by slide 100 holding the same in engagement with a pin 102 on the main totalizer frame 95, but when the rack is moved upwardly one step, when lever 28 is shifted to the paid out position, shoulder 298 on the rack is carried away from pawl 101 permitting this pawl to rock out of engagement with pin 102 as urged by a spring mounted on its pivot. The same movement of rack 297 causes shoulder 299 of the same to engage a pawl 300 rocking the pawl into engagement with a pin 301 on the totalizer frame. Therefore when cam 98 shifts slide 100, the totalizer will be rocked so that its upper set or subtracting gears are meshed with the racks 42. If lever 28 is moved still farther to the "credit" position, the rack 297 will be carried upwardly far enough to bring its shoulder 299 clear of pawl 300 and its shoulder 323 into engagement with pawl 101. Then at such an entry, the main totalizer will be rocked to adding position upon movement of slide 100. If lever 28 is moved to the "charge" position, rack 297 will be moved upwardly far enough to carry all of its shoulders above pawls 300 and 101. Consequently when slide 100 is actuated by the cam 98 it will not rock the totalizer away from normal position and therefore neither addition nor subtraction will take place. A retaining pawl 589 is permitted at this time to rock into engagement with pin 102 thereby preventing the totalizer from accidentally rocking. At other times it is held out of engagement by engagement of shoulder 590 with its pin 591. The driving racks 42, (Fig. 9) are carried on racks 36 by pins 71 on racks 42 which extend through short slots 72 in the differential racks 36. The slot and pin connection between racks 42 and 36 is to permit an extra unit of movement of racks 42 in carrying or transferring. Such extra unit of movement is normally prevented by pawls 73 which are pivoted on racks 42 by pins 74 and are provided with flanges 75, extending through horizontal parts of slots 76 in the racks 36. In order to permit a transfer, a pawl 73 must be rocked so that its flange 75 comes into the vertical part of the slot 76 of the respective rack 36. The rack 42 is then moved the extra unit by one of a series of cams 77 which are carried by drive shaft 2 and co-act with pins 83 on transfer slides 82.

Shafts 30 and 31 support the transfer slides by passing through slots 85 therein and these slots are so shaped that when a transfer slide is engaged by one of the trip cams the slide will be moved downwardly and forwardly a slight distance thereby causing the teeth 80 and 81 to enter coacting notches 86 and 87 which are opposite the teeth 80 and 81 at the time of transferring. By compelling the transfer slides 82 to move forwardly upon transferring operations it is impossible to effect a transfer at other than the correct times as the slides would then engage the periphery of cams 78 and thus be prevented from lowering. The transfer slides are first lowered slightly by trip cams 78 or 92 rigid with the totalizer pinions when one of the totalizer pinions passes from nine to zero at an adding operation, or from zero to nine at a subtracting operation. A tooth 80 of the cam engages a tooth 81 of the corresponding slide 82 causing the slide to be lowered a slight distance thus bringing roller 83 on the slide into the path of a shoulder 84 on one of the cams 77. The cam then further lowers the slide and this second movement of the slide is employed in driving rack 42 the desired extra unit of movement.

By the continued downward movement of the slides under the action of cams 77 after racks 36 come to rest, the slides are caused to move rearwardly farther than their normal positions because of the shapes of slots 85, and this rearward movement is employed to rock the pawls 73 so that their flanges 75 come into the vertical parts of slots 76 and also to cause flanges 88 of the pawls to enter notches 89 in the transfer slides so that continued downward movement of the slides will, through pawls 73, move racks 42 the desired extra units. To this end the pawls are provided with pins 90 which extend through slots 91 in transfer slides 82. Therefore when the slides are moved rearwardly, the pawls are caused to rock around their pivots thus bringing their flanges 75 into the vertical parts of slots 76 and the flanges 88 in the notches 89.

The transfer slides 82 may be shifted as is necessary to operative relation with the cams 77 at any time during the down stroke of racks 36, but are not acted upon by the cams 77 until the racks 36 are at rest in their lower positions. After the transferring is completed, and while the racks 36 are still in their lower positions, the main or balance totalizer is rocked out of mesh with the racks 42 by cam 98 restoring slide 100 to its home position, after which the transfer slides are restored to initial positions by shoulders 93 of cams 77 engaging rollers 83, and the racks 36 are returned to home position.

It may here be noted that the transfer mechanism above described is springless and not liable to error through the failure of a spring to work.

*Class of transaction totalizers.*—The class of transaction totalizers are actuated similarly to the main or balance totalizer and are like the same in construction, as may be seen in Fig. 17. A desired transaction totalizer is selected for operation by shifting the transaction lever 28, except in the case of the cash totalizer which is normally rocked into mesh with the transaction totalizer driving racks if lever 28 is left in its normal or cash position. The totalizer pinions are rotated by driving racks 117 carried by differential racks 116 which receive differential movement from shafts 41 by meshing with pinions 115 fast to the same.

The transaction totalizers are mounted in frames 123 pivoted to a supporting frame 124 by pins 125. Each totalizer frame has a pin 122 (Fig. 16) for coacting with one of a set of pawls 589 and one of a set of pawls 121, 307, 308, or 309, pivotally mounted on a slide 119. The slide 119 is reciprocated by a cam 118, (Fig. 10) and through the medium of one of the pawls 121, 307, 308, or 309 serves to rock the selected totalizer into engagement with racks 117. The arrangement is such that pawl 121 normally engages pin 122 of the cash totalizer, while the pins 122 on the remaining totalizers are normally engaged by pawls 589. The pawls 589 are pivoted to frame 124, and serve to retain the totalizers in inoperative position. If transaction lever 28 is not shifted from normal position the reciprocation of slide 119 serves to rock the cash totalizer 21 through pawl 121, so that its pinions 367 are meshed with racks 117. Then upon the downward movement of racks 117, the totalizer is added to according to the depressed value keys. If the transaction lever is moved to its second or "paid out" position, a rack 302 which has teeth meshing with a pinion on the shaft 30, will be lifted accordingly. This rack has four shoulders 303, 304, 305, and 306 for respectively coacting with pawls 121, 307, 308, and 309. By movement of lever 28 to its second position, shoulder 303 is carried out of engagement with pawl 121, permitting the coacting pawl 589 to rock into engagement with pin 122 of the cash totalizer and at the same time rock pawl 121 away from the pin. Simultaneously, shoulder 304 engages pawl 307 rocking it into engagement with the pin 122 of the paid out totalizer 22, which movement of the pawl forces the pawl 589 for such totalizer out of engagement with the pin. The remaining totalizers are selected in the same manner. In each case as the respective shoulder of rack 302 engages the totalizer rocking pawl the remaining shoulders of the rack are either moved upwardly past their respective pawls or not far enough upwardly to engage their respective pawls.

The transferring mechanism for the transaction totalizers is similar in principle of operation to that which operates the main or balance totalizer. Both sets of pinions are not, however, provided with trip cams as these totalizers are never subtracted from and therefore in fact only one set of pinions is necessary in the special totalizers upon ordinary operations of the machine. The companion set of pinions in each totalizer is employed in resetting operations, so that by meshing the companion pinions with racks 117 a reverse rotation of the totalizer pinions to their zero positions will effect a forward movement of racks 117, which movement in resetting operations is employed to transmit the setting of any desired transaction totalizer to type carriers of the record strip printing mechanism.

At the side of each rack 117 is a transfer slide plate 126 which, when engaged by a trip cam 127 as a totalizer pinion passes from nine to zero, is moved downward a slight distance bringing its roller 128 into the path of a lug 129 which is bent outward from a disk 130 fast on drive shaft 2. The lug 129 then forces the slide 126 downward its full movement, effecting a transfer. It may be seen in Fig. 17 that the transfer slide 126 has teeth for coacting with the trip cams 127 similarly to the trip slides for the main or balance totalizer, and the form of guide slots 131 in the transfer slides 126 is such that a slide is caused to move forwardly into mesh with the trip cam which engages it during the initial downward movement of the slide under the action of the trip cam. When the cam lug 129 moves the slide still farther downwardly these slots 131 cause the slide to move rearwardly, thereby through a slot 132 in the slide surrounding a pin 133 on a pawl 134, rocking the pawl so that its flange 135 comes into the vertical part of a slot 136 in the operating rack 116 and its flange 137 enters one of a series of cuts 138 in the slide 126. The pawl is pivoted by a pin 139 to the rack 117 and normally serves to prevent relative movement between rack 117 and rack 116 but by rocking the pawl so that its flange 135 comes into the vertical part of slot 136, relative movement of the racks is no longer prevented and as at this time flange 137 enters one of the cuts 138 the continued downward movement of transfer plate 126, through the pawl compels the extra unit of downward movement of rack 117. The pin 139 on which the pawl is pivoted passes through a short slot in rack 116 and therefore does not prevent relative movement between the racks. At the completion of the carrying operation the selected totalizer is rocked to its normal position by return movement of slide 119, and then the transfer mechanism is restored to normal position by a reverse operation of slide 126 under the action of a lug 271 on disk 130. The racks 116 are then returned to their zero positions when shafts 41 are backwardly rotated to home positions by the return of the main differential racks 36.

*Salesmen's total retaining devices.*—The salesmen's retaining devices are arranged in groups according to the classes of transactions, namely, "cash", "paid out", "credit", and "charge" and one of these devices is added to according to the differential rotation of shafts 41, whenever any such entry is made in the machine. These devices are herein termed total retaining devices, and they have the function of at all times retaining securely the totals of transactions of the particular classes to which the devices are allotted. For simplicity no transferring mechanism is applied directly to the devices, but at each operation of a retaining device, it is adapted temporarily to return the amount therein to a subtotalizer in the machine which is provided with transfer mechanism. The new amount is then added to the subtotalizer and after such transfers as may be necessary are effected on the subtotalizer elements, the new total is placed on the elements of the total retaining device. Thus a simple and compact construction of these retaining devices may be employed, and a great many of them be employed at little expense of space in the machine. As shown, there are four groups of nine retaining devices each employed, but this number might be largely increased by providing more settings than four for the transaction lever, and it will be readily seen that the groups may be divided in other modes of classification than by transactions.

Figs. 18 and 19 are detail views of a salesman's retaining device. These devices comprise pairs of plates 140 and 141 having a plurality of slots 142 in which are slidably mounted rollers 143 and each plate 141 has corrugations 144, extending transversely to the direction of the slots, so that the rollers may be set to any of the different positions along the slots and retained in their set positions. The rollers and slots represent denominational orders and amounts may be recorded by moving the rollers upwardly, more or less, in the slots, the zero position of the rollers being in the lowest corrugation. The plate 141 may be moved away from the plate 140 a slight distance to permit adjustment of the rollers, and this relative movement is limited by bent lugs of the plate 140 and is normally prevented by carrying frames for the salesmen's devices. These carrying frames 146, (Fig. 21) are provided with a plurality of vertical grooves 147 in which the salesmen's retaining devices are slidably mounted. The plates 140 of the devices are for this purpose provided with extensions 148 which are adapted to fit in the grooves 147 and the carrying frames have inwardly extending flanges 149 which by engagement with the plates 140 and extensions 150 of the plates 141, normally serve to prevent the plates 141 from being moved away from the plates 140 and thereby retain the rollers 143 in their set positions. The plates 140 are provided with extensions 151 by which they may be lifted out of their carrying frames into operative relation with the differential mechanism.

For the sake of compactness the salesmen's retaining devices are not provided with carrying devices and on account of this when an amount is to be added to one of them the previous setting thereof is first transferred to a salesman's subtotalizer 170 (Figs. 46 and 47) which is provided with carrying mechanism. After the subtotalizer receives an amount from a selected retaining device the new amount is added to the subtotalizer and it is then reset, at which time its final setting is transferred to the salesman's retaining device, which is then returned to its carrying frame and the carrying frame is restored to normal position.

As stated the total retaining devices are arranged in four groups according to classes of transactions and there are nine devices in each group corresponding to the possible positions of the initial lever 27. Four sets of actuators 152 (Fig. 20) for the retaining devices are provided and each carrying frame 146 is slidable in ways 153 in a forward direction so that any desired retaining device may be brought in line with one of the sets of actuators.

As the retaining devices are arranged in groups according to classes of transactions, the selection of any one group is determined by the class of transaction lever 28. The shaft 30 rotated by this lever carries a cam 154 (Figs. 1 and 52), which is provided with a helical groove into which extends a roller carried by a lever 155 (Figs. 7, 12, and 13). This lever is pivoted to an ear 1561 on the frame of the machine and at its lower end is provided with a roller extending into a groove in a collar 156 which is secured to a shaft 157. Accordingly the shaft 157 is shifted in a longitudinal direction, more or less, according to the rocking of lever 28. The shaft carries five segment gears 158 which are adapted to mesh with racks 159 (Fig. 3) extending forwardly from the carrying frames 146. When the lever 28 is in its normal position the two segment gears 158 at the left (Figs. 1 and 7) mesh with the racks 159 of the "cash" group of retaining devices. If the shaft 157 is moved one step to the right, as caused by a downward movement of lever 28, the second and third segment gears 158 will mesh with the racks 159 of the "paid out" group of retaining devices. Similarly if shaft 157 is moved two steps to the right, the third and fourth segments will mesh with the racks of the "credit" group, and if the shaft is moved three steps to the right, the fourth and fifth segments will mesh with the racks of the "charge" group of retaining devices.

The shaft 157 may be differentially rotated and is controlled in its rotation by the salesmen's initial lever 27. If the lever is moved to the "A" position, the consequent slight rotation of shaft 157 will cause the selected group of retaining devices to be moved forwardly one step thus bringing the foremost device of such group in line with the actuators 152. The retaining devices are, therefore, ranged from front to rear in the same order as the initial lever positions from top to bottom. Mechanism by which the differential rack controlled by the salesmen's or initial lever may cause the differential rocking of shaft 157 is shown in Figs. 3 and 12ª. This rack 562 meshes with a pinion 162 which also meshes with a segment gear 163, journaled upon shaft 67 and integral with a segment gear 164 meshing with a segment gear 165 fast on shaft 157. This shaft is, therefore, rotated more or less according to the downward movement of the differential rack 562 as operated by the salesmen's lever. The segment gear 165 is broad as shown in Fig. 1 so as not to become unmeshed during longitudinal movement of shaft 157.

The desired retaining device by the above means is brought in line with a set of intermediate actuators 152, and comes to rest with the extensions 151 (Figs. 18, and 20) between shoulders 166 on a pair of racks 167. By these racks the selected device is lifted out of its carrying frame and during its upward movement the rollers 143 engage the set of actuators 152 at slots 179, causing these actuators to be moved upwardly more or less according to the setting of the rollers 143 away from their zero positions. If in their zero positions, the setting of the actuators 152 will not be affected as the upward movement of the retaining devices is of such extent that rollers in zero position will come to rest in slots 179 with the actuators at normal position. Each set of actuators 152 meshes with a set of segments 168 all four sets of which are yoked to a set of segments 169 (Fig. 7) operatively to connect the salesmen's subtotalizer 170 (Figs. 46 and 47) with the actuators 152.

The racks 167 are actuated by segment gears 171 fixed to a shaft 172 which is oscillated to cause the racks 167 to move upwardly at the correct time, that is after the main drive shafts have rotated about twenty degrees and downwardly after the rollers 143 have been set to represent the new total. Shaft 172 is oscillated by a cam 173 (Figs. 53 and 54) splined to drive shaft 5, which causes oscillation of a segment 174 pivoted on a rod or pin 175 and meshing with a pinion 176 fast on shaft 172.

The actuating racks 152 are guided in their vertical movement by rods 177 extending through slots 178 in the racks, so formed that at the initial movement from the "zero" to the "one" position of the actuators when engaged by rollers 143, the actuators 152 will be moved rearwardly a slight distance so that slots 179 therein will encircle the rollers 143 and thus connect the rollers to the actuators.

One form of the salesman's subtotalizer 170 is shown in Figs. 45, 46, and 47. It consists of two sets of intermeshing gears 180 and 181 carried respectively by rods 182 and 183 of a frame 184 which is pivoted to two pairs of carrying arms 185 and 192 by pins 186 and 1860. The subtotalizer is normally out of mesh with its actuating racks 187 but before the rise of the selected salesman's retaining device 32 the subtotalizer is rocked on its pivots 1860 to carry the adding wheels 180 into mesh with these racks. The racks are constantly in mesh with pinions 188 which are journaled on a shaft 189 and the pinions 188 are also constantly in mesh with segment gears 169 which, as previously stated, are differentially rocked by actuators 152 by the rise of the selected retaining device, therefore the adding gears 180 are rotated to correspond to the setting of the rollers 143 of the selected device.

The rocking of the salesmen's subtotalizer around its pivot 1860 is accomplished by cams 555 normally in operative relation with rollers 1910 on rocking arms 185 and fast on a shaft 412 which is rotated by drive shaft 3, (Fig. 13) by gears 580, 581, and 583. After the adding wheels 180 are rotated by the racks 187, the cams 555 cause the subtotalizer to be rocked to the right (Fig. 47), on its pivot 1860, so that adding gears 180 mesh with racks 193 (Fig. 45), while gears 181 remain free of racks 187 and 193. Racks 193 carry connecting pawls 400 having flanges 413 extending into slots 415 of racks 401 and by this connection are driven by racks 401 which mesh with pinions 194 on the shafts 41 and are driven by these pinions when the shafts 41 are differentially rotated by the main racks 36 (Fig. 3). When the shafts 41 are rotated, thus adding the amount of the transaction to the subtotalizer, the plates 140 and 141 (Fig. 19) of the selected salesmen's total retaining devices are separated and this relative movement between the plates is accomplished by mechanism shown in Fig. 20. It was previously stated that relative movement of the plates 141 with respect to plates 140 ordinarily is prevented by flanges 149 of the carrying frames, that is, when the retaining devices are in position in the carrying frames, but when a device is moved out of its carrying frame, guide frames 208 and flanges 209 of a frame 210 serve to prevent separation of plates 140 and 141 while the rollers 143 are positioning racks 152. When a retaining device rises, the extensions 150 (Figs. 19 and 20) enter between flanges 209 and flanges 213 of the frame 210 and accordingly the plate 141 is compelled to move away from the plate 140 by the forward movement of the frame 210, which, when the racks 152 are at rest in their set positions and the salesman's subtotalizer is rocked out of mesh with racks 187, is moved forwardly by cams 211 on shaft 5 engaging rollers 212 on the frame, and thus separates the plates 140 and 141. Guide frame 208 is provided with grooves 214 which register with grooves 147 (Fig. 21) in which the selected retaining device is slidable, when such device is brought below the actuators 152, and upon the rise of the retaining device the extensions 148 of plate 140 enter the grooves 214 and thus these grooves serve to guide the device when moved upwardly and when returned to its carrying frame. At the time shafts 41 are rotating and adding the detail amount to the subtotalizer and the plates 140 and 141 of the selected salesman's retaining device are separated, a yoke 195 (Figs. 7, 46, and 47), extending across the upper edges of racks 187, is drawn downwardly by a cam 197 on drive shaft 5 acting on a roller 196 of the yoke, thus restoring racks 187, pinions 188, segment gears 169 and 168 (Fig. 20), actuating racks 152, and rollers 143 to normal position, but the salesman's subtotalizer is then out of mesh with racks 187 and therefore is not affected by the restoration thereof to normal zero position. At the rise of racks 187, yoke 195 is lifted by the racks, bringing its roller 196 more or less into the path of cam 197 and at the proper time is engaged by the cam in order to force rollers 143 and coacting mechanism to zero position. The subtotalizer (Fig. 47) is now rocked by both carrying arms 185 and 192 without changing its angular setting, the cams 555 and 190 being suitably formed for this purpose, so that its gears 180 are unmeshed from racks 193 and its gears 181 are meshed with racks 187. Its pinions are then reset to zero position by a rack 198 (Fig. 46) which meshes with a pinion 199, loose on rod 183, and is driven by a pinion 200 secured to shaft 189, together with a pinion 201 meshing with a segment gear 202, which segment gear is oscillated at the required time for resetting the subtotalizer by a cam 203 on drive shaft 5. The pinion 199 meshes with a companion pinion 204 fast on shaft 182 which is provided with a longitudinal groove in which is slidably mounted a spline 205 having a plurality of projections for coacting with projections of the pinions 180, as illustrated in Fig. 47ª. These coacting projections are normally not in the same planes and therefore the normal rotations of pinions 180 is not interferred with, but at the time of resetting the spline is shifted so that rotation thereof will cause resetting. The shifting of the spline 205 is accomplished by a cam 206 fast on drive shaft 2 (Figs. 56 and 47), and connected to the spline 205 by a lever 207, which is pivotally mounted on a pin 208.

By resetting the pinions 180 the pinions 181 are also reset and through these pinions the racks 187 are lifted accordingly and thereby through movement communicated by segments 169 and 168 to intermediate actuators 152 (Fig. 20), the rollers 143 of the selected salesman's retaining device are caused to move upwardly to positions which represent the total amount accumulated by the subtotalizer. This total, of course, represents the previous amount which had been accumulated by the selected retaining device plus the amount of the transaction which is recorded. The plate 141 of the total retaining device is then returned to clamping position by frame 210, thus preventing further movement of rollers 143 and the salesman's subtotalizer is rocked to normal position by cams 555 and 190. The selected retaining device is then returned to its respective bank by return of racks 167, thereby causing the racks 152, segments 168 and 169, and racks 187 to be restored to their normal zero positions. Finally the bank of salesmen's retaining devices 32 is returned to its home position by segments 158 (Fig. 3), when the initial lever 27 is restored and shaft 157 is also shifted longitudinally to its original position by the return of sales lever 28 as hereinafter described.

Carrying operations in the subtotalizer are necessary only when it is being actuated by racks 193 (Fig. 45), and not when it is actuated by racks 187. Accordingly the carrying devices are arranged to coact with racks 193 so that they may cause these racks to move the desired extra units. These carrying devices are similar in principle of operation to the carrying devices for the main totalizer and the carrying devices for the transaction totalizers. The pawls 400 which normally connect racks 193 with the racks 401 are pivoted to racks 193 by pins 402¹ and each is provided with a pin 402 extending through a slot 403 in a transfer slide 404. Each slide has a tooth 420 adapted to be engaged by a tooth of a transfer cam 405 (Fig. 46) on one of the pinions 180 and is slidably mounted on rods 406 and 407 which extend through slots 408 in the transfer slide. When a transfer slide is engaged by one of the cams 405 it is lowered far enough to bring a roller 409 carried thereby into the path of a lug 418 on a cam 411 carried by the shaft 412. Then after racks 401 come to rest in their lower positions the lug 418 engages roller 409 thus causing the slide 404 to move downwardly and forwardly as guided by slots 408. The forward movement of the transfer slide rocks pawl 400 through the pin connection 402 so that flange 413 on the pawl is moved into the vertical part 414 of a slot 415 in rack 401 thus permitting a certain extent of relative movement between the rack 193 and the rack 401. This rocking of the pawl also causes its flange 416 to enter one of a series of notches 417 in the transfer slide. The rack 193 is thus connected to the slide and the continued downward movement thereof carries rack 193 downwardly the desired additional unit of movement and thereby rotates the pinion 180, with which rack 193 meshes, the desired extra unit. After the subtotalizer is rocked out of mesh with racks 193 a lug 410 on cam 411 engages roller 409 lifting the transfer slide to its original position and by this reverse movement restoring pawl 400 to its normal position.

Fig. 47$^b$, an enlarged view of the salesmen's subtotalizer, illustrates an alining device for preventing accidental rotation of the subtotalizer pinions when the subtotalizer is entirely out of engagement. The alining device consists of a slide 425 provided with a bar 426 extending beneath all of the pinions 181. The slide carries a pin extending through an angular slot 427 in the rocking arm 185. Consequently when the totalizer is rocked into mesh with one or the other of the sets of racks with which it coacts, the slot 427 causes the alining devices to lower out of engagement with the subtotalizer pinions permitting rotation of the same.

*Card carriage mechanism.*—Figs. 22 to 24, inclusive, illustrate the card carriage mechanism. If, previous to the operation of the machine a punched card is placed on table 338, before shafts 41 are differentially rotated by the main differential mechanism, racks 230 (Fig. 37) will be lowered extents corresponding to the location of punchings in the card on table 338. When an account is first opened, a punched card is not placed on carriage 338, as there is no balance to bring forward but for the purpose of controlling the operation of three banks of file number plungers 3431 (Figs. 22 and 24) which control certain of the racks 230 for setting customer file number punches 399 (Fig. 41), before making a first charge entry, certain slides 339 (Figs. 5, 24$^a$, and 24$^b$) are manually shifted to a position to represent the customer's file number. The slides 339 are each slidably mounted on the machine at the right of a bank of file number plungers 3431 each of which has a flange 395, and by moving the slides downwardly, the upper wider parts of the slides come beneath the flanges of more or less of the plungers according to the extents of downward movements of the slides. The plungers 3431, together with a set of amount determining plungers 343, are slidably mounted in a fixed frame 342, and each of the plungers is provided with an annular flange 344 (Fig. 24) between which and a movable plate 345, are coiled springs 346 surrounding the plungers. Plate 345 is forced downwardly early in the operation of the machine compressing the springs surrounding plungers 3431 and 343 thereby causing the springs to force the plungers 343 and such of the plungers 3431 as are not retained in their upper positions by slides 339 downwardly into the path of movement of projections 358 (Fig. 37) of pawls 245 which are pivotally mounted by pins 246 on racks 230. When a succeeding charge or a credit transaction is entered a previously punched slip is placed on carriage 338 before the crank handle is operated. When such succeeding entries are made the file number slides 339 are left in their zero positions and the operation of the file number plungers 3431 and the amount plungers 343 is determined by the punchings of the inserted slip.

The table 338 (Fig. 22) is provided with a plurality of holes 340 which correspond to all possible positions of the punches 337 (Fig. 5), and thus when a punched slip is placed on carriage 338 there will be a hole below each punching in the slip. The carriage 338 is also provided with index pins 341 which enter corresponding holes in punched slips when they are placed on the carriage and therefore serve to cause the punchings in the slip to register with certain holes in the carriage and when carriage 338 arrives at its inner position it comes to rest under the fixed frame 342 carrying the slidably mounted plungers 343 and 3431, corresponding in number and location to the holes in table 338.

The account slip carrying table 338 is moved into and out of the machine (Figs. 22 and 23) by a pinion 385 meshing with a rack 386 on the carriage and fast to a shaft 387 which is driven from a shaft 388 by a cam 389 which oscillates a segment gear 390 meshing with a pinion 391 which is secured to a shaft 392, together with a bevel gear 393 meshing with a bevel gear 394 fast on shaft 387. Shaft 388 is driven from drive shaft 4 (Fig. 44) through gears 575 and 576 shown by pitch lines in this figure.

Soon after the table is drawn into the machine, plate 345 is drawn downwardly by cams 389 and 398 (Figs. 22 and 23) which actuate toggle mechanism 350 by pitmen 349, the toggles connecting plate 345 with the fixed plate 342, and by moving plate 345 serving to compress springs 346. Each bank of plungers controls the differential movement of one of the racks 230 (Fig. 37) by coacting with a pawl 245 carried by the rack and when the compression plate 345 is moved downwardly all of the plungers 343 and 3431, which are opposite punched holes in the amount slip (or which are not prevented from moving downwardly by slides 339, as previously explained), move downwardly into the path of pawls 245. At the lowering of plate 345 if the plungers are prevented by the slips or the slides from moving, their respective springs will merely be compressed, whereas if the plungers are permitted to move, the plate, through the springs, will carry them downwardly and if an account slip is on the carriage 338 only such of the plungers will move downwardly as are permitted by the holes in the slip. If no account slip is on the table 338 all of the plungers 343 will be carried downwardly and also such of plungers 3431 as are not held in their retracted position by slides 339.

In Fig. 37 the customer's subtotalizing device 233 is shown. This device, through intermediate racks 230, is adapted to receive settings from the punched cards on table 338 (Figs. 1 and 22) at the beginning of operations of the machine when "credit" or "charge" entries are made. The customer's subtotalizer 233 is added to or subtracted from by racks 230 which, after being controlled in their movement by a punched card, are further moved by the differential rotation of shafts 41 under the control of the value keys. When such transactions as "cash" or "paid out" are entered in the machine, racks 230 are not at any time controlled in their movement by a punched card. However they do serve in setting up the amounts of such entries in the customer's subtotalizer 233. In all cases the customer's subtotalizer is finally reset for the purpose of transferring its setting to sales slip printing and punching and check printing mechanism so that either a printed and punched sales slip or a printed check having a record of an entry may be issued at the completion of the operation of the machine. When "cash" and "paid out" entries are made, printed checks are issued but when "charge" or "credit" entries are made printed and punched sales slips are issued.

After the operation of the compression plate, racks 230 are carried downwardly by rollers 355 carried by arms 351 fast to a shaft 352 which is oscillated by a cam 515 fixed to shaft 388 (Fig. 37ª) and acting on a pitman 353 pivoted at its upper end to an arm 354 fast on shaft 352. The rollers 355 extend between shoulders 356 and 3511 of pawls 245 and when in normal position, by engagement with the inner edges of the pawls serve to hold the pawls, against the action of their springs 357, in such position that flanges 247 of the pawls are in cuts 248 in racks 401. The racks 401 mesh with pinions on the shafts 41 which are normally prevented from rotating, as previously described, and therefore serve in holding racks 230 in their normal position. When rollers 355 are carried downward, pawls 245 rock out of engagement with racks 401 as urged by their springs 357 provided no zero plungers 343 or 3431 are in their inner positions beneath shoulders 358 of the pawls. If slides 339 are left in their unmoved positions and no account card is placed on carriage 338, as is the case when "cash" or "paid out" entries are made, all the racks 230 will be held in their zero positions when arms 351 are rocked downward by the zero plungers.

If "charge" or "credit" entries are made, the slides 339 are either adjusted away from their zero positions or an account card is placed on carriage 338 and therefore certain or all of the racks 230 will be permitted to move downwardly more or less until shoulders 358 of their respective pawls 245 engage depressed plungers. The engagement of shoulders 358 with plungers causes pawls 245 to be returned into engagement with some one of the cuts 248 in racks 401 and thereby latch racks 230 in their set positions to racks 401. Such rocking of the pawls carries their shoulders 356 out of the path of movement of rollers 355 thus permitting continued downward movement of arms 351 to the end of their normal stroke. The customer's subtotalizing device 233, during the downward movement of racks 230 is held in such position that its adding gears 231 are in engagement with a set of rack teeth 2301 of racks 230. By this means the record of an account is transferred to the subtotalizer or if no account card is in the carriage, the customer's file number only will be set in the subtotalizer according to the setting of slides 339. If the slides 339 are left in their zero positions or if no account card is in the carriage, pinions 231 will remain in their zero positions.

The customer's subtotalizer consists of a frame 243 pivoted by pins 244 to brackets fastened to the frame of the machine (Figs. 33 and 34), and a pair of rods on which the adding pinions 231 and a second set of subtracting pinions 233 are journaled. Either cam 235 or 2350 (Fig. 32), by engagement with a roller carried at the outer end of a lever 240, loosely pivoted on shaft 241 and at its forward end pivoted to the subtotalizer frame by a pin 242, serves to rock the customer's subtotalizer around its pivot 244 to mesh adding pinions 231 with racks 230 before the downward movement of arms 351, and to hold these pinions in mesh during the downward movement and the desired length of time after the arms 351 come to rest. The cams 235 and 2350 are fastened to a collar splined to shaft 236 and provided with an annular groove into which extends a tongue of a frame 517 as shown in Fig. 32. The frame or slide 517 is connected to the rear end of a lever 800 (Figs. 13 and 52) which is pivoted intermediate its ends to the frame of the machine and at its forward end carries a roller extending into a groove in a cam 520 (Fig. 52) fast to transaction shaft 30. Cam 235 normally controls the rocking of the subtotalizer but if transaction lever 28 is shifted to the "credit" position, the consequent rotation of shaft 30 causes cam 520 to shift frame 517 so that cam 235 is moved out of engagement with the subtotalizer rocking arm and the cam 2350 is moved into engagement with the subtotalizer rocking arm. Cams 235 and 2350 both operate the same up to the point where the first downward movement of racks 230 under control of plungers 343 and 3431 is completed, but from this point on the control differs. If cam 235 remains in engagement the subtotalizer will be held so that its adding pinions 231 remain in mesh during continued downward movement of racks 230 when connected to racks 401 under the control of the main differential mechanism. If cam 2350 is in engagement the subtotalizer will be rocked to carry its subtracting pinions 232 into mesh with racks 230 so that the second downward movement of the racks will cause subtraction from the amount set in the subtotalizer. Means are thus provided for adding to or subtracting from the amount which has been set up on pinions 231, by a continued downward movement of racks 230, under the control of the value keys.

The value keys by controlling differential rotation of shafts 41 cause racks 401 to be differentially lowered, but this occurs after racks 230 have come to rest at the downward movement of arms 351. During the downward movement of racks 401, pawls 245 are retained in engagement with racks 401, and accordingly racks 230 will be carried downward with racks 401. Before the new detail amount is added to or subtracted from the subtotalizer, it is necessary to withdraw depressed plungers 343 so that these will not, by engaging with the pawls 245, prevent additional movement of racks 230. To this end compression plate 345 is returned to its outer position by a return of pitman 349 (Figs. 22 and 23). Such movement of the compression plate permits depressed plungers to spring back to normal position and accordingly pawls 245 will tend to rock out of engagement with racks 401 by the action of their springs 357, but as it is necessary to retain connection between racks 230 and 401, transfer slides 487 which are provided with slots 493 through which pins 494 of the pawls extend, are given a regular initial movement, in a downward and forward direction thereby causing the rear edges of slots 493 to engage the pins 494 and thus hold the pawls in connecting position and prevent them from rocking under the action of their springs. Cams 4881 by engagement with pins 488 of the slides effect this initial downward movement while the shapes of slots 490 determine its forward direction.

It is while the racks 401 are moving downwardly that carrying operations in the subtotalizer may become necessary. To provide for carrying operations each subtotalizer pinion is rigid with a transfer trip cam 485 and when a pinion passes from nine to zero in an adding operation or from zero to nine in a subtracting operation, one of these cams engages one of a pair of teeth 486 of transfer slide 487, lowering the slide so that a roller 4882 moves into the path of a transfer cam 496. The teeth 486 are normally not in the paths of movement of cams 485 but are carried downward into the paths of the cams by the first movement of the transfer slides 487 under the action of cams 4881 on pins 488 carried by the slides. The function of segments 489 is to support transfer slides 487 by engagement with pins 4882 between the times of action of trip cams 485 and transfer cams 496. After the subtotalizer has been added to or subtracted from by the downward movement of racks 230, cams 496 move any of the transfer slides which have been lowered by the transfer cams farther downward and thus because of the form of slots 490 of the slides again moving the slides forward so that certain notches 491 engage laterally extending tongues 492 of racks 230, and also through slots 493 engage pins 494 of pawls 245 rocking the pawls in the direction indicated by the arrow 495, thus causing their flanges 247 to pass out of notches 248 in the flanges 2481 of racks 401, thereby disconnecting racks 401 from racks 230 which are then carried downward the required extra unit for effecting the transfer, by continued action of cams 496 on pins 4882. After the carrying operation the slides 487 are returned slightly by cams 497, thus returning pawls 245 into engagement with notches 248. After the pawls are thus connected to racks 401, the racks are returned to normal position by the return rotation of shafts 41, previously described. The racks 230 are by this means returned to the positions to which they were carried by the downward rocking of arms 351. While the racks are in this position cams 497 lift the slides 487 to normal position, bringing the forward edges of slots 493 into engagement with rollers 494 of pawls 245. The pawls then rock out of engagement with notches 248 as urged by their springs 357 and arms 351 are returned to their upper position engaging pawls 245 at the shoulders 3511, causing racks 230 to be returned to normal positions. The movement of arms 351 during the return of the racks is such as not only to return the racks but also to tend to rock the pawls back into engagement with racks 401, but springs 357 are strong enough to overcome rocking of the pawls in this manner. By the lower ends of slots 560 in racks 230 engaging shaft 30 and rod 561, further upward movement of the racks 230 is prevented and the action of springs 357 is thereby overcome causing the pawls to rock back into engagement with racks 401 at which time arms 351 come to rest in their upper position.

At the completion of the first downward movement of racks 230 any of the slides 339 (Fig. 5) which may have been moved out of normal position, are restored to normal position out of coacting relation with plungers 343, by a yoke 680 loosely pivoted on shaft 327 and actuated by a cam 681 (Fig. 1) fixed to shaft 388. The yoke is arranged to coact with lateral extensions 683 of the slides 339 (Figs. 5 and 24ª).

The subtotalizer 233 (Fig. 31) is provided with alining pawls 515 which are pivoted to the totalizer carrying frame and carry a rod extending through a slot of such shape in a cam 516 that the cam serves to cause the alining pawls to rock into engagement with pinions 231 by rocking movement of the subtotalizer whenever either set of pinions of the subtotalizer is moved out of mesh with racks 230, thus preventing accidental rotation of the subtotalizer when out of mesh. Cam 516 is loosely pivoted on shaft 241 and has a forwardly extending arm 424 having a roller for coacting with a cam 422 fast to shaft 236. Cam 422 serves to rock the alining pawls 515 out of engagement with subtotalizer pinions when the subtotalizer is reset.

After the operation of racks 230 under the control of the punched slip on table 338, the slip is of no further use, and as it is desired to store the same in the receptacle in the machine, means are provided for removing the punched slip from table 338. This means consists of feed rollers 3381 (Figs. 22 and 23) carried by a shaft geared to one of the drive shafts of the machine. The receptacle to which the slips are fed by the rollers 3381 is omitted from the drawings. In order that centering pins 341 may not interfere with the removal of the slip by the feed rollers, the pins are carried by a flexible bar or spring 3382 which is cammed downwardly to remove the pins 341 from the holes in the slips when table 338 arrives at its inner position. The time of action of the feed rollers for removing the punched slip is shown in Fig. 60, cam 700.

Thus it will be seen that the punched slips constitute a second variety of total retaining devices, and differ in function from the salesman's total retaining devices only in that they are adapted to be taken out of and inserted into the machine each time. Like the salesman's devices they carry the total of a series of transactions, and are adapted, when placed in the machine, to return the total to a subtotalizer temporarily, and then another movement may be added or subtracted on the subtotalizer and the final sum or difference transferred to a slip. A duplicate of the slip is also issued by the machine for filing or handing to the customer.

*Sales slip printing and punching mechanism and check printing mechanism.*—During the first downward movement of racks 230 the customer's subtotalizer is held in the position in which it is indicated in Fig. 26 in mesh with racks 230 and certain segment gears 234. By this means the differential movement of racks 230 is transferred through the subtotalizers to segments 234 and these segments are each rigid with a type carrier 228 or 382 (Fig. 41). By this means type are set according to the customer's file number and the amount represented by punchings in the account card, which is on carriage 237. Of course when a "cash" or "paid out" entry is made, the account card carriage mechanism is not employed and therefore the type carriers 228 and 382 are not preliminarily set and printed from. These type carriers are, however, set when "charge" or "credit" entries are made and at such times sale slips 319, such as illustrated in Fig. 42, are employed one of which is placed on carriage 315 (Fig. 40) before operating the machine. Each sale slip is provided with a stub 320 which is punched to represent the amount of the transaction and the customer's file number. The record punched in the stub is employed, as previously described, to control racks 230 at succeeding entries when a charge transaction with the same customer or a credit transaction such as "received on account" or "paid in full," is entered.

The segments 234 are not normally in mesh with the customer's subtotalizer but before downward movement of racks 230, are lifted by their eccentric mountings into mesh with subtotalizer gears 232. This occurs after the subtotalizer has been rocked to its adding position as before described. The eccentric disks 324, upon which the segments 234 are journaled, are carried fast on a shaft 325 which is rotated to cause the segments to be lifted or lowered as desired by a cam 326 (Fig. 31), carried by the shaft 327, as illustrated in this figure, and acting on a segment gear 328 which meshes with a pinion 329 fast on the shaft 325. The shaft 325 is omitted in Fig. 38. After the type carriers 228 have been set, an alining bar 420 (Figs. 5 and 31), carried by bell crank levers 421 actuated by cams 422 (Fig. 32), is rocked into engagement with internal teeth of segments 234 (Fig. 5) and is held in engagement and permitted to move therewith while the segment gears 234 are rocked out of mesh by the eccentrics and in position to bring their type carriers 228 and 382, which last are the file number type carriers, into printing position. A platen 227 is then operated printing the file number and amount forward on line 560 of a slip 319 (Fig. 42) but rising only enough to meet the type carriers in their lower position which is below the printing point of certain other type carriers which this platen is adapted to print from. The platen is then lowered, the platen cams being suitably formed for this purpose, and the segments 234 are reset by an oscillating rod 3281 (Fig. 31) coacting with V shaped openings 332 (Figs. 5 and 25) in the segments. Rod 3281 is carried by a pair of bell crank levers 3291 having rollers 330 extending across the outer edges of cams 331 which actuate the bell crank levers in their active direction and permit the same to return to normal position under spring action at required times. After this first impression the subtotalizer remains with its adding pinions 231 in mesh with racks 230 or is rocked so that its subtracting pinions 232 are meshed with the racks 230, which are then moved downwardly, as was described, under the control of the differential mechanism controlled by the keyboard, causing the amount of the transaction to be added to or subtracted from the amount already set in the subtotalizer. The subtotalizer is next rocked to its normal position out of mesh with racks 230 and the segments 234 are again lifted into mesh with the subtotalizer gears 232, as shown in Figs. 29 and 31, and at the same time broad pinions 333, which at all times mesh with the segments, are rolled upwardly along the segments into mesh with racks 334, thus operatively connecting segments 234 with the racks 334. In Fig. 5 the segment gears 234 and the subtotalizer are shown in the same position as in Fig. 29, the machine being shown as partially operated in Fig. 5. These racks mesh with pinions which are carried by type carriers 335, 361, and 383 (Figs. 5 and 41) and are also connected at their forward ends to punch carrying slides 336 and 384. The subtotalizer is now reset causing the type carriers 335, 361, and 383 to be set, and the slides 336 and 384 to be positioned according to the differential rotation of the subtotalizer gears. The slides are alined by pawls 712 (Fig. 5) operated by a cam 702 (Fig. 60). The slides 36 and 384, respectively, carry the punches 337 and 399 for the purpose of punching amounts and the customers' file numbers in the stub parts of sale slips. The punches are accordingly differentially set along the length of the slip in correspondence to the rotation of the type carriers.

The resetting of the subtotalizer is accomplished by an oscillating segment gear 362 (Fig. 31) which meshes with a pinion 363 (Fig. 33) journaled on a shaft 364 supporting the subtotalizer subtracting gears 232 and provided with a groove in which is a spline plate 374 (Fig. 35), such as was previously described in connection with the main totalizer, and which coacts with lugs on the subtotalizer gears 232. The rocking of segment 362 is accomplished by a bell crank lever 365 (Fig. 31), pivoted on shaft 241 and actuated by a cam 366 on shaft 236. The spline plate is shifted in a longitudinal direction by cam 370 (Fig. 33) coacting with a fixed pin 371 and driven from shaft 327 through gears 378 and 379. The platen 227 is now again operated but this time is lifted high enough for effecting an impression from type carriers 335, 361, and 383 and forcing the punches through the inserted slip, thereby printing the detail amount on line 380, the detail amount and file number on line 381 and also properly punching the stub part of the slip to correspond to the detail amount and file number so that the stub may be employed in subsequent registrations to control the operation of the machine. The platen is then returned and segments 234 are rocked out of mesh with the subtotalizer, leaving it in its zero position, but the broad pinion connection between the segments 234 and racks 334 is retained. The rod 3281 is again actuated and by engagement with the V shaped openings, causes the segments to return to zero positions and as the segments are connected to racks 334 by the broad pinions 333, the racks are returned to zero positions thus restoring the type carriers and the slides 384 and 336 to zero positions. It will readily be understood that the cams causing these operations are so shaped and timed as to give a proper sequence to the operations.

At "charge" and "credit" entries the words "Charge" or "Credit" are printed on the sales slip as indicated in Fig. 42. The transaction type carrier 505 (Fig. 41) is set to printing position by movement of the transaction lever 28 to the "charge" or "credit" positions through a pinion 514 (Figs. 12, 13, and 52) fast to transaction shaft 30, meshing with a rack 507 which also meshes with a pinion 508 (Fig. 52) fast to a sleeve which carries the transaction type carriers 505.

Two initial type carriers 218 and 2181 (Fig. 41) are properly set by shaft 157, the rocking of which is controlled by the initial lever as previously described. This shaft carries splined to it a segment gear 579 (Fig. 41ª) meshing with a gear 580 loose on shaft 506 and meshing with a gear 582 fixed to a shaft 583 to which is secured one of the initial type carriers 218. This type carrier is connected to the other initial type carrier by a rack 584 meshing with pinions fast to the type carriers.

Dating wheels 685 (Fig. 41) are manually set by segments 686 (Fig. 5). Differential movement of these segments is communicated to the dating wheels by pinions 687, meshing with racks 688 (Fig. 41), which in turn mesh with pinions rigid with the dating wheels.

The platen 227 (Figs 5, 38, and 39) is carried by the upper ends of toggles 250 which are pivoted at their lower ends to rods 251 mounted in the machine frame and at their centers 252 to links 253. These links are reciprocated for the purpose of actuating the platen by a lever 254 (Fig. 5) pivoted loosely on a shaft 255 and actuated by a cam 256 (Fig. 32) on shaft 236.

An ink ribbon 257 (Fig. 5) is fed between the checks strip and the type carriers by a feeding device 258, which consists of a pair of ink ribbon carrying spools 259 provided with ratchets coacting with a reciprocating pawl 260, which is carried by a pitman 261 actuated by a cam on shaft 236. This pawl is provided with lugs coacting with the roll of ink ribbon whereby the pawl may be rocked on its pivot when a certain extent of ribbon is wound on one of the spools. By this means the direction of feed of the ink ribbon on reversed. The specific construction of this ribbon reverse mechanism is better shown in Fig. 51 which is a view of a similar ink ribbon feeding device for the record strip printer hereinafter described.

When cash transactions are entered in the machine a check is issued on which is printed in duplicate the amount of the transaction, the date, and the initial of the clerk who effects the sale, from the type carriers mounted on shafts 506 and 583 (Fig. 41). The check paper is preferably perforated, before being placed in the machine, so that it may easily be torn on a line passing between the duplicate impressions. A supply roll of check paper 215 is indicated in Fig. 43. The check strip is fed by two pairs of feed rollers 216 and 217 driven from drive shaft 4, as shown in Figs. 43 and 44, by gears 575, 576, shaft 388; gears 577 and 578 and shaft 327 which carries a gear 219 meshing with a gear 220 on a shaft 221. A bevel gear 222 is splined through a clutch to shaft 221, and normally meshes with a bevel gear 223 rigid with a gear 224 serving to communicate rotation to two sets of gears 225 and 226 which are each rigid with one of the feed rollers of each pair 216 and 217. From the feed rollers the check paper passes over platen 227 (Fig. 5), and below type carriers 335, 361, 2181, 218, and 685 to carriage 315 and by the carriage to a receiving table 229 located at the left of the machine (Fig. 1). The platen is provided with a knife 585 (Fig. 38) for severing checks from the remainder of the check strip when impressions are taken.

When other than "cash" transactions are entered, the check feeding mechanism is made inoperative by disconnecting bevel gear 222 from its drive shaft 221. Shaft 30 is for this purpose provided with a cam 311 for rocking a lever 312 which, at its lower end, is fitted to a clutch member 313 shiftable along a spline 314 in shaft 221. Clutch member 313 engages a suitably cut face of a clutch member 616 between it and bevel gear 222 for the purpose of rotating the bevel gear. The clutch member 616 may be moved out of engagement with the bevel gear 222 independently of movement of clutch member 313, the teeth of the members 616 and 313 being so formed as to permit this movement of the member 616. The object of the clutch member 616 is to provide a second means under the control of the resetting shaft 31 for making the check feeding mechanism inoperative. Rotation of shaft 31, through its pinion 610 (Fig. 13), actuates a rack 611 meshing with a pinion 612 (Fig. 43), secured together with a cam 614 to a sleeve 613 loose on shaft 30. The cam 614 actuates a lever 615 pivotally connected at its lower end to the member 616 of the clutch.

When "paid out" entries are made, specially printed slips are employed for receiving such entries and before operating the machine one of the slips is placed on carriage 315 (Fig. 40) so that it will be carried into the machine above platen 227 before the platen is operated.

The slip carrying table 315 (Fig. 40) is movable along tracks 419 of the platen 227 and is operated by a bell crank lever 316 pivoted to an actuating slide 317 and lever 318 pivoted on shaft 255 (Fig. 5) and operated by a cam 701 (Fig. 60) on shaft 236.

*Record strip printing mechanism.*—All entered transactions are printed on a record strip 34 (Fig. 5). At "cash" and "paid out" registrations, the amount of a transaction, clerk's initial, and a character representing the class of transaction, are printed on the strip. At "charge" and "credit" registrations there is printed in addition the amount forward, if any, and the customer's file number. At resetting operations there is printed the total amount accumulated by the totalizers in operation, a character indicating its class, and a salesman's initial.

The record strip printer consists of a plurality of type wheels which are arranged either singly or in groups for printing different matter and a separate platen or hammer is provided for each division of the type carriers. These hammers are not all normally operative certain of them being selected for operation according to the setting of the transaction lever 28 or the resetting lever 29. A transaction type hammer 262, a detail amount hammer 263, and a salesman's initial hammer 264 (Fig. 51) are normally operative when the transaction and resetting levers are at normal positions, and also when the transaction lever is in the "paid out" position and the resetting lever is left in its normal position. These hammers respectively coact with the class of transaction type carrier 265, detail amount type carriers 266, and an initial type carrier 267, and are operated by cams 268, two of which are pinned to a shaft 269 as shown in Fig. 51 and the other of which, for the detail amount type carriers, is loose on the shaft and connected thereto by a clutch 542 splined to the shaft. The remaining two type hammers 450 and 451 are respectively for coacting with the customer file number type carriers 453, and amount forward and total printing type carriers 2661. The cams for these two type hammers coact with clutches 510 and 481 which are driven by shaft 269 but normally out of coacting relation with their respective cams. The clutch 481 is splined to shaft 269 and the clutch 510 is normally rigid with shaft 269 by coacting with a second clutch 511 which is splined to the shaft. Shaft 269 is driven from drive shaft 3 (Fig. 13) through gears 580, 581, and 582. The cam 268 which coacts with the detail amount type hammer 263 is normally connected with a clutch 542 which is also splined to shaft 269. The clutches are shifted to make desired hammers operative or inoperative by movement of the sales lever 28 or the reset lever 29. The clutch shifting mechanism is shown in Figs. 1, 5, 49, 50, and 52. The transaction shaft 30 carries a cam 507 into which extends a roller of an arm which is fast to the rod 518 journaled in brackets carried by one of the frames of the machine. At its upper end rod 518 carries an arm 519 which extends into a slot in a slide 509 (Figs. 49 and 50), and when rod 518 is rotated by cam 507, slide 509 is moved to the right (Fig. 50) and the slide is provided with projections 420 extending into clutches 510 and 481. Therefore these clutches will be moved to the right by action of cam 507. The groove in the cam is so formed that rod 518 is not rotated while the transaction lever is passing from its normal or "cash" position to the "paid out" position, but serves to rotate the rod when the transaction lever is shifted from the "paid out" to the "credit" position; and when shifted from the "credit" to the "charge" position, rod 518 remains in its moved position. The right hand movement of clutches 510 and 481 serves to make the customer's file number hammer 450 and the amount forward hammer 2631 operative. Therefore when "credit" or "charge" entries are made, all of the type hammers of the record strip printer will be operated, but not or "cash" or "paid out" entries.

The resetting shaft 31 carries a cam 524, coacting with a roller pivoted on the arm of a rod 540, which is journaled in brackets carried by one of the frames of the machine, and provided with an arm similar to the rod 518, for coacting with a slide 5091, provided with extensions 477 extending into grooves in clutches 542, 511, and 546. The groove in cam 524 is so formed as to cause the slide 5091, which is actuated by the cam, to move to the left when the resetting lever is shifted from its normal position to the transaction totalizer position and to cause the slide to remain in its moved position when the reset lever is shifted from the transaction totalizer position to the balance totalizer or the salesmen's retaining device positions. Consequently at resetting operations the detail amount type hammer 263 and the customer file number type hammer 450 are inoperative as clutch 542 moves away from its coacting cam 268 and clutch 511 moves out of engagement with clutch 510 which is loose on shaft 269 and normally serves to connect clutch 511 with the cam 268 for the customer file number hammer. The clutch member 546 coacts with a cam 475 for operating the amount forward type hammer 2631 which, at resetting operations, is employed for printing the total of the particular totalizer which is reset. When the resetting lever is shifted, clutch 546 which is splined to shaft 269, causes cam 475 to rotate and consequently operate the hammer 2631. This cam is timed slightly different from the other cam which coacts with hammer 2631, because at resetting operations the type carriers 2661 are not set until later than at regular operations of the machine. All of the cams 268 and 475 are of the form of cam 268 shown in Fig. 49, therefore rotation of cam 268 for the hammer 2631 at resetting operations will not interfere with action of cam 475, as cam 475 permits the hammer to spring downward slightly after the high part of the cam 268 passes its respective pin or hammer 2631, at which time the cut away part of cam 268 is below the pin.

At regular operations of the machine when transactions are entered the detail amount type carriers 266 are set by a set of racks 282 (Fig. 48) meshing with pinions 587, carried by shafts 41 (Fig. 6). The racks 282 are provided with a set of rack teeth meshing with gears 276 which are connected by intermediate gears 277 with pinions 278 fast to the type carriers 266.

The amount forward type carriers 2661 are set by the racks 230 (Fig. 37), which are provided with rack teeth 275 meshing with another set of gears 2762 geared to the type carriers 2661. The hammer 2631 which coacts with these type carriers is operated while the racks 230 are at rest in their first downward movement when controlled by plungers 343. Thus the amount forward from the account card on carriage 338 is set on the type carriers 2661.

The initial type carrier 267 is set by a rack 282 such as shown in Fig. 48, and which meshes with a pinion 281 (Fig. 6) fast on shaft 280. This shaft carries a pinion 279 meshing with the rack 562 (Fig. 12$^a$) which is controlled by the initial lever 27.

The transaction type carrier 265 is normally set for printing a "cash" character and, therefore, its setting is not altered at a cash registration. It is geared to the transaction lever by a gear 277, pinions 276 and 2761 (Fig. 51) connected by a sleeve loose on the supporting shaft, rack 513 (Figs. 12, 13, and 52), pinion 514 on shaft 30 which carries the pinion 295 (Fig. 11) meshing with the transaction lever. Therefore by shifting the transaction lever 28 when other than "cash" registrations are made, the transaction type carrier 265 is set accordingly.

An ink ribbon feeding mechanism for the record strip printer is shown in Fig. 51. The ink ribbon 283 is carried by a pair of spools 284 and 285 and passes from one spool between the type carriers and type hammers around a roller 286 and back to the other spool. The spools are driven by a double pawl 287 which is pivoted to a pitman 288 actuated by a cam 289 fast on shaft 269. The pawl coacts with ratchets 290 fast to the ribbon spools and operates one of these ratchets until a certain extent of ribbon is wound on the spool thereof, when a flange 291 on the pawl is engaged by the roll of ink ribbon, rocking the pawl on its pivot so that a point 292 of the pawl passes the tip of a spring actuated pawl 293, whereupon pawl 287 rocks still further, so that at the next reciprocation of pitman 288 it will engage the other ratchet wheel and thereby cause the ribbon to be fed in the reverse direction.

The record strip 34 is fed by a ratchet mechanism shown in the upper part of Fig. 5 and operated by cam 704 (Fig. 60) on drive shaft 412. In Fig. 49 is shown an arm 3441 carrying rollers 3442 around which the record strip is actuated. The arm is pivoted to a pitman 3443 operated by a cam 3444 on shaft 269. Between the rollers 3442 are stationary rods 3445 over which the record strip passes before an impression arm 3441 is rocked counter-clockwise, thereby causing the record strip to be fed backwardly with respect to the type, after the impression arm is rocked clockwise, thereby, in combination with the strip feeding mechanisms, carrying the record strip forward far enough so that the impression will come to view in the glass cover opening shown in the front of Fig. 5. Thus by means of this oscillating arm it is possible to feed the record strip rearwardly and forwardly so that impressions may be read immediately after operations but still follow each other closely on the record strip.

*Resetting devices.*—As shown in Figs. 3 and 4, the main totalizer and the transaction totalizers are placed adjacent casing openings through which the amounts on said totalizers may at any time be read. As a preferred construction, however, mechanism is provided by which the totals on these totalizers, or any of them, may at any time be printed on the record strip, whereby possible errors in reading the totalizers and transferring their totals to a record of any kind are avoided. The operation of printing these totals, incidentally serves to reset the totalizers to normal zero position. Mechanism for printing the totals on the salesmen's total retaining devices and incidentally restoring their rollers 143 to normal zero position is also provided.

To determine which of the totalizers shall have their totals printed, a resetting lever is provided operable in connection with the transaction lever and the salesmen's initial lever. At resetting operations of the main totalizer or any of the transaction totalizers, the selected totalizer is rocked so that its subtracting gears are meshed with the actuating racks and then the totalizer is reset by separate mechanism thereby, through the subtracting gears, lowering the actuating racks extents equal to the extents of rotation of the totalizer pinions. By this means shafts 41 are differentially rotated and their differential movement is transferred to the amount forward and total printing type carriers 2661 (Figs. 37 and 51) of the record strip printer through racks 401 and 230.

When a salesman's total retaining device is reset, it is actuated up to a certain point the same as when a registration is made. Its setting is transferred to the salesmen's subtotalizer and the setting of the subtotalizer is then transferred to type carriers of the record strip printer, by resetting the subtotalizer when in mesh with intermediate racks between it and the type carriers.

Before actuating the machine at resetting operations, the reset lever 29 is moved downwardly one, two, or three spaces (Fig. 11), respectively, to the transaction, balance, or salesmen's retaining device positions, depending upon which class of device is to be reset. The transaction lever 28 is also moved away from its normal or cash position if other than a cash totalizer of the transaction totalizers or salesmen's retaining devices is to be reset. Operation of these two levers 28 and 29 and the initial lever 27 accomplishes the selecting of a desired totalizer and also adjusts elements of the driving or operating mechanism so that all totalizers except the one which is to be reset are made inoperative.

The shaft 31, which is rotated by the reset lever, carries two sets of cams 545 and 546 (Fig. 58) respectively coacting with extensions of key detents 547 and levers 548 loosely pivoted on one of the shafts 41. Movement of the resetting lever away from normal position causes cams 545 to lift the key detents 547 thereby bringing the edges 551 of the key detents before pins 549 of the amount keys, thus preventing their depression. Cams 546 also by rotation of shaft 31 are carried into engagement with the upper arms of levers 548, rocking these levers into engagement with extensions 550 of slides 45, thus lifting the slides and through the pins 48 (Fig. 8) releasing the driving racks 52 from pawls 47. The racks 52 are lowered their full extents upon oscillation of driving segments 54 and, therefore, racks 36 may follow racks 52 downwardly the desired extents. Levers 548 also engage pins 59 on the slides 38, and by lifting these trip slides pawls 55 are free to rock around their pivots when racks 52 are lowered, thereby disconnecting the driving racks 52 from the differential racks 36. Racks 36 are now free to move downwardly differential extents independently of segments 54, and therefore do not interfere with rotation of shafts 41 by the resetting of a special totalizer, and serve to drive these shafts when the main or balance totalizer is reset. Also at the setting of lever 29 to the transaction of the balance totalizer positions, a cam 5241 (Figs. 1, 52, 55, and 56), which is carried by the resetting shaft 31, through a lever 525 slides resetting cams 500 and 501 splined to drive shaft 5, into operative relation with a resetting segment 502 (Figs. 55 and 56). The segment 502 meshes with a pinion 602 (Fig. 6) on a shaft 600 and therefore serves to rotate this shaft, by means of which power is furnished to a rack 608, through pinion 609 on shaft 600 (Fig. 14) and a rack 603 (Fig. 59), which respectively drive the transaction and balance totalizers when reset.

A cam 526 (Figs. 12 and 52) also carried by shaft 31, through a lever 530 having ears 5301 by which it is pivoted, shifts a frame 527 and thus shifts a spline bar 528 into operative relation with the pinions 79 of the balance totalizer 20, and spline bars 606 (Fig. 14) into operative relation with the transaction totalizers. The reset shaft 31, carries cams 520 and 522 (Fig. 10), and if reset lever 29 is set to the transaction totalizer position, cam 520 by rocking a lever 519 shifts cams 98 and 521 which are sleeved together and splined on shaft 2 to an inoperative position out of engagement with both rollers 99 and 991 of the balance totalizer rocking slide 100, consequently it is inoperative, and cam 522, through lever 531, shifts cams 118 and 523 to the right so that cam 118 is disengaged from roller 120 of the transaction totalizer rocking slide 119 and reverse cam 523 is engaged with roller 1201 of this slide. Cam 523 serves to rock a selected transaction totalizer oppositely to the direction it is rocked when a transaction is entered and therefore causes its upper set of gears 598 to mesh with racks 117. If the reset lever 29 is set to the balance totalizer position, cam 520 by rocking lever 519 shifts the reverse cam 521 into engagement with the totalizer rocking slide 100 at the same time disengaging cam 98 from the slide, and cam 522 shifts the cams 118 and 523 for the transaction totalizers free from the totalizer rocking slide 119 thereby making the four transaction totalizers inoperative. If the reset lever 29 is shifted to the salesmen's retaining device resetting position, the transaction totalizers and the balance totalizer are made inoperative, as then movement of cams 522 and 520 causes cams 523, 118, 98, and 521 to come to rest in central positions out of engagement with the rollers of slides 119 and 100.

It may be seen from Figs. 10 and 11 that cams 520 and 522 are provided with annular flanges having grooves 670 coacting with flanges 671 of the slides 100 and 119. The flanges of the cams are cut away at certain points so as normally to permit free movement of the slides and also to permit free movement of the slide 119 when the reset lever is in the transaction totalizer position and to permit free movement of slide 100 when the reset lever is in the balance totalizer position, but the flanges prevent the slides from accidentally dropping when cams 523, 118, 98, and 521 are shifted while the reset lever is moving from one position to another.

When the balance totalizer or one of the transaction totalizers is reset, the salesmen's retaining devices are made inoperative by disengaging shaft 172 (Figs. 3 and 53), which serves to actuate them from the drive shaft 5 by shifting the clutch 605. The clutch is shifted by a cam 532 on shaft 31, which rocks a lever 533 carrying a roller 534 coacting with a groove in the clutch member 605.

At all resetting operations the check and slip printing and punching mechanism is made inoperative as the cam shaft 236 (Fig. 31) is disconnected from drive shaft 5 (Fig. 13) by shifting a clutch 504 (Fig. 52), which is operated by a cam 535 on shaft 31 through a lever 536. The check feeding mechanism is also made inoperative at this time, as before mentioned, by rotation of shaft 31 which, through its pinion 610 (Fig. 13), actuates rack 611 meshing with pinion 612 (Fig. 43), secured together with cam 614 to sleeve 613 loose on shaft 30. Cam 614 actuates lever 615 pivotally connected at its lower end to a member 616 of the clutch 313. The rocking of this lever disconnects the clutch from bevel gear 222.

Operation of the reset lever, by rotating shaft 31 makes a cam 552 (Fig. 52) effective, thereby rocking a lever 553 and by it shifting shaft 412 so that its cams 411 (Fig. 45) are disengaged from transfer slides 404, and circular grooves in disks 455 (Fig. 45ª) are engaged with the slides, thus preventing them from accidentally dropping during the resetting operation. The longitudinal shifting of the shaft 412 also disengages cams 555 and 190 (Fig. 46) from rollers 191 and 1910 of the salesmen subtotalizer carrying arms 192 and 185 and moves cams 554 and 555 into engagement with these carrying arms. Cams 554 and 555 serve to rock the salesmen's subtotalizer as required when any of the salesmen's retaining devices are reset, as later explained.

The selection for resetting of a desired transaction totalizer or of a group of salesmen's retaining devices is accomplished by transaction lever 28 in the usual manner as before described. Also a desired one of a group of retaining devices is selected by the initial lever 26.

If a transaction totalizer is selected for resetting, all of the splines 606 (Fig. 14), as explained, are in operative position with the transaction totalizer pinions. Operation of the transaction totalizer rocking slide 119 then meshes the upper pinions 598 (Fig. 17), of the selected totalizer, with racks 117 and pinion 607 (Fig. 15) with rack 608. Rack 608 is then driven downwardly by rotation of shaft 600 (Fig. 14), as described, and, through pinions 607 and 6071, drives the spline 606 of the meshed totalizer so that its pinions 597 are reversely rotated to zero position. This rotation of the pinions 597 will cause pinions 598 to move racks 117 (Fig. 17) downwardly the required distances to rotate shafts 41 so that the total accumulated by the totalizer may be set in the total printing type carriers 2661 (Figs. 37 and 51). Resetting occurs after lugs 4881 (Fig. 37) engage rollers 488, therefore racks 401, meshing with pinions on shafts 41, and racks 230, geared to type wheels 2661, are rigidly connected by pawls 245, the downward and forward movement of transfer slides 487 causing the rear edges of slots 493 to engage pins 494 of pawls 245 holding these pawls in such position that their flanges 247 are in the cuts 248 in racks 401.

When the main or balance totalizer is reset the rotation of shaft 600 (Fig. 6), through its pinion 601, actuates a rack 603 (Fig. 1) meshing with a pinion journaled on the rod 560 which supports the subtracting pinions 94 and meshing with a pinion 598 fast to the shaft 561 which supports the adding pinions 79 and in which the totalizer resetting spline 528 is slidable. Actuation of the totalizer shaft 561 through its spline causes resetting of the totalizer pinions and a consequent lowering of racks 36 which, through the shafts 41, transmit the differential movement to racks 401 (Fig. 37), and as these racks are connected by pawls 245 to racks 230 the type carriers 2661 will be properly set for printing the total.

When a salesman's retaining device is reset it is selected and its setting is transferred to the subtotalizer as when an entry is made. The cams 554 and 555 serve to first rock the subtotalizer to such position that its adding gears 180 mesh with racks 187 (Fig. 46), and while the adding gears are in mesh with these racks the racks are moved upwardly by the upward movement of the selected retaining device as before described, thereby differentially rotating the gears 180 according to the differential setting of rollers 148 of the retaining devices. The cams then rock the salesman's subtotalizer so that its subtracting gears are meshed with racks 193 (Fig. 45), while its adding gears remain in mesh with racks 187. Yoke 195 is then returned to its lower position in the usual manner and time, thereby causing all of the racks 187 to be returned to their home positions, and through the subtotalizer, which by the same movement is reset to its zero position, differentially lowering racks 193. Movement of racks 193 is communicated to type wheels 2661 by connecting pawls 400, racks 401, pawls 245 (Fig. 37), and racks 230. While the racks 230 are at rest in their lowered position the total is printed by operation of type hammer 2631 (Fig. 51), as in other reset operations.

The differential mechanism is restored to normal position by return of segments 54 (Fig. 8). These, as before mentioned, engage pins 51 of racks 52, lifting the racks to home position. During the upward movement of racks 52 their shoulders 68 engage pins 58 of pawls 55, rocking the pawls into engagement with pins 447 on the differential racks 36 thus rigidly connecting racks 36 with racks 52 so that racks 36 will be returned to home positions. The return of racks 36 causes shafts 41 to rotate backwardly to home positions and consequently racks 401 (Figs. 37 and 45) are returned and these racks, by connecting pawls 400 and 245, serve to return racks 193 and 230. The return of driving segments 54 occurs at resetting operations at the same time that it occurs when entries are made and at such times slides 487 (Fig. 37), as before explained, are in such position that the rear edges of slots 493 are in engagement with pins 494 of pawls 245 holding the pawls in connecting position. After the differential mechanism is restored cam 497 returns the slides 487 to upper position, thus causing the rear edges of slots 493 to move away from the pins 494 of pawls 245 which are then free to rock out of engagement with the slots of racks 401, and there is then nothing to hold the racks 230 in the upper position, but at this time arms 351 are returned, and therefore if racks 230 lower by their own weight they will be restored and also pawls 245 be rocked back into engagement with the upper ones of notches 248.

The type hammer 2631 when printing totals is actuated by cam 475 (Fig. 51), and, as previously mentioned, this cam is operatively connected to shaft 269 by a clutch 546. The clutch 546 is moved into engagement with the cam 475 by an extension 477 (Fig. 50) of slide 5091 pivotally connected to an arm 478 of a rod which is rotated by a cam 524 on shaft 31 (Fig. 52). Movement of the resetting lever away from normal position thereby effects the connection between cam 475 and the clutch. The reason for employing a different cam for actuating the type hammer 2631 at resetting operations, is that at such operations the type carriers 2661 are not set until after the time when amounts forward are printed, these type carriers ordinarily serving to print the amount forward.

The reset and sales levers 28 and 29 are restored to normal positions before the return of the key detents 547 (Fig. 58) and therefore cam 545 does not interfere with the lowering of the key detents under the action of pins 650 carried by the disks 651 fixed to shaft 4. The shafts 30 and 31 (Fig. 57) carry fixed thereon pinions 652 and 653 meshing with segment gears 654 and 655 pivoted to the frame of the machine by a pin 666 and provided with extensions 667 coacting with a pin 668 on gear 10. As the driving crank handle 1 nears its home position, and before the lowering of key detents 547, pin 668 strikes the extension 667 thereby rotating shafts 30 and 31 to normal position and consequently rotating cams 545 out of the paths of the key detents and returning the reset and sales levers to normal position. The detail racks 282 (Fig. 48) are operated as usual by rotation of shafts 41, but as the type hammer for the type carriers 266, which are set by the racks 282, is not operated during resetting operations, movement of racks 282 is merely idle.

Thus it will be seen that the objects first stated are well carried out by this construction, and that the field of possible use of the machine is wide. The usual main totalizer and set of transaction totalizers are provided and that much of the mechanism may be used to advantage by itself, especially as the main totalizer is adapted to be subtracted from for money paid out, thereby keeping a correct total of money on hand at all times, and as both main and transaction totalizers may have the totals thereon printed at any time on a permanent record strip. By the use of the salesman's total retaining devices, totals of the sales of each clerk may be kept separately for each class of transaction. The punched slips and the mechanism for operating on them furnish means for readily keeping an indefinite number of accounts of credit customers, and of being able at any time to tell instantly the standing of any account.

The description of the machine has throughout contemplated its use in a store, and the terms "customer" and "salesman" are employed as illustrative of such use, but it will be understood that these terms are employed merely by way of example and for simplicity and clearness, as the invention is of great utility in many other classes of work, where totals of values or amounts of quantities are desired to be retained under different plans of classification. The words "customer" and "salesman" and all such illustrative words should therefore not be understood as limiting the scope of the invention. It is further to be understood that a number of the groups of mechanism in the machine may be separately employed. For example, the main and the transaction totalizers with their operating mechanism constitute a practical cash register to which the check and strip printing mechanism may be added if desired. The salesmen's total retaining devices are valuable in connection with the main totalizer as taking the place of the multiple totalizer machines on the market, and presenting the possibility of summations under a large number of different heads, and if the transaction totalizers are added totals of groups of summations will be provided. The slip punching and printing mechanism is useful in keeping track of many things besides credit customers' accounts and is capable of being used independently if desired.

*Operation.*

*Cash entry.*—To enter a cash transaction, the operator depresses value keys 26 (Fig. 1) representing the amount of the transaction, and adjusts the initial lever 27 to a position representing by whom the transaction is effected. The operating handle is then, as in all operations of the machine, twice rotated, thereby effecting the operation of the machine. The punched stub controlled mechanism is not employed and the sales slip and stub printing and punching mechanism is only partly employed for the purpose of printing checks which at cash entries are issued by the machine. A cash transaction is entered in the machine by adding its amount to the main or balance totalizer 20, to the cash totalizer 21, and to one of the cash set of salesmen's total retaining devices, and by printing the amount, a character representing the word "cash," and a salesman's initial on the record strip, and by printing the amount and a salesman's initial on the strip of check paper. The adjustment of the manipulative devices of the key board serves to select or operatively connect these totalizers with the operating mechanism. The selected salesman's retaining device is then lifted out of its carrying frame into engagement with intermediate actuating racks 152 (Fig. 20), thereby causing the denominational pinions of the salesman's subtotalizer 170 to be rotated according to the setting of rollers 143 in the retaining device. By this means the amount which had been accumulated by the retaining device is set in the salesman's subtotalizer. The main differential mechanism of the machine is then actuated as controlled by the keyboard, thus adding the amount of the transaction to the balance totalizer 20, the cash totalizer 21, the salesman's subtotalizer 170, and setting the amount type wheel 266 (Fig. 51) of the record strip printer, and the two sets of amount type wheels 2181 and 218 (Fig. 41), of the slip and check printing mechanism. While this is occurring the selected salesman's retaining device is reset to zero. The platens are then operated printing the desired record and the salesman's subtotalizer is reset, transferring its setting to the retaining device which is then returned to its carrying frame, and finally the carrying frame, manipulative devices of the keyboard, and the differential mechanism are restored to initial positions completing the operation.

"*Paid out*" *entry*.—The operation of the machine when a "paid out" transaction is entered is quite similar to that for a cash transaction. The only differences are that the "paid out" totalizer 22 (Fig. 1) is added to instead of the cash totalizer 21, and the main or balance totalizer 20 is subtracted from instead of added to and the paid out bank of salesmen's retaining devices is selected for operation. Also the check and slip printing mechanism is employed to print upon an inserted slip instead of on a check. Selecting of the "paid out" totalizer 22 and the bank of "paid out" salesmen's retaining devices is accomplished by shifting transaction lever 28 (Fig. 11) downwardly one step. This effects one step longitudinal movement of shaft 157 (Fig. 7), causing segments 158 to mesh with racks 159 of the "paid out" bank of salesmen's retaining devices. The movement of lever 28 also adjusts the balance totalizer rocking devices so that it is rocked to subtracting position when crank 1 is rotated. The type wheels of the printing devices are set and the printing devices are operated as at a cash entry except that movement of lever 28 rotates the transaction type wheels from the cash position to the paid out position and effects the required forward movement of the paid out bank of salesmen's retaining devices.

"*Charge*" *entry*.—The value keys are depressed, and transaction lever 28 is set three spaces downwardly, rotating shaft 30 far enough to adjust the balance totalizer rocking devices to inoperative position and to select the charge totalizer 24 (Fig. 16) and to bring segments 158 (Fig. 7) into operative relation with racks 159 of the charge bank of salesmen's retaining devices. The initial lever 27 is then set causing the desired forward movement of the charge bank of retaining devices and setting the initial type wheels of the printing devices. A blank sales slip 319 (Fig. 42) is placed on carriage 315 (Fig. 1), and the customer file number setting slides 339 are adjusted to represent the customer's file number. By operation of crank 1, the slip carriage is drawn into the machine bringing the slip beneath the type carriers of the slip printing mechanism (Figs. 5 and 41), and the stub part of the slip beneath punches 337 and 399. The customer's subtotalizer 233 (Fig. 37) is then rocked to carry its adding gears 231 into mesh with racks 230 and the companion set of gears 232 are meshed with segments 234 (Fig. 26). The particular racks 230, which are controlled by the customers' file number slides 339 are then moved downwardly to set the file number in the subtotalizer and in type carriers 382 rigid with certain of the segments 234. The segments 234, still in their zero positions except those which serve in setting the file number, are next rocked into printing position and the platen is operated, printing the customer's file number on line 560 of the slip 319 (Fig. 42). While this is occurring the amount which had been accumulated by the selected salesman's retaining device is set in the salesmen's subtotalizer 170 (Fig. 45). Then both subtotalizers are rocked so that their adding gears are meshed with their respective racks 193 and 230, and by operation of these racks the amount of the transaction is added to the salesmen's subtotalizer 170 and set in the right hand set of pinions 231 (Fig. 38) of the customer's subtotalizer. Next, both subtotalizers are rocked to resetting position and segments 234 are lifted into mesh with the pinions 232 and broad pinions 333 are rolled upwardly thus connecting segments 234 with racks 334. The subtotalizers are then reset, for the purpose of setting the total amount on the salesmen's subtotalizer in the salesman's totalizer and the total amount on the customer's subtotalizer in the type wheels and punches of the sales slip printing and punching mechanism. The platens are now operated, printing a detailed record on the record strip 34 (Fig. 5), and printing and punching the sales slip. The stub of the sales slip is therefore in condition for controlling the operation of the machine to set up the amount forward at a succeeding charge or credit transaction with the same customer.

The following description will make clear the operation of the slip printing and punching mechanism upon the entry of a succeeding "charge" transaction. Before rotating crank handle 1, the stub part of the slip which was punched at the previous "charge" registration, is placed on carriage 338 (Figs. 1 and 22) and a blank sales slip is placed on carriage 315, the amount keys are depressed, and sales lever 28 is shifted to the "charge" position. During the operation of the machine the main totalizer, one of the transaction totalizers, and one of the salesman's retaining devices are selected and operated as required by the class of transaction, and the detail printer is also actuated as required, certain hammers being selected for operation as before explained. One of the first operations that occurs upon the rotation of crank 1 is that the carriages 338 and 315 are drawn into the machine, and at the same time the customer's subtotalizer 233 is rocked to carry gears 231 into mesh with racks 230. Then the segments 234 (Fig. 26) are, by the rotation of their carrying eccentric disks lifted into mesh with the subtotalizer gears 232. The amount represented by the punched stub which is placed upon carriage 338 is now set in the subtotalizer gears 231 by downward movement of racks 230 (Fig. 37). In order that these racks may be controlled in their movement by the punched stub, as before stated, the table 338 is provided with a plurality of holes 340 which correspond to all possible positions of the punches 337 (Fig. 5), and thus when a punched stub is placed on carriage 338 there will be a hole below each punching in it and when carriage 338 arrives at its inner position it comes to rest under the fixed frame 342 in which are slidably mounted the plungers 343 corresponding in number and location to the holes in table 338, and only such of the plungers will move downwardly as are permitted by the punched holes in the stub. Accordingly at the first downward movement of racks 230 they will move extents determined by the punched holes, except that if any of these holes are in zero positions the corresponding racks 230 will be retained in their zero positions. The differential movement of the racks sets up the amount and file number represented by the punchings in the slip in the record strip printer and in the customer's subtotalizer 233 by rotating its gears 231 in an additive direction. The rotation of gears 231 is communicated to the type carriers 228 and 382 through the subtracting gears 232 and the segments 234. Segments 234 are then rocked out of mesh with the subtotalizer gears and the platen 227 is operated effecting an impression of the amount forward file number on the new slip. The segments are now reset by oscillating rod 3281 but the subtotalizer remains with its adding gears in mesh with racks 230 which are additionally lowered as propelled by the differential mechanism under the control of the valve keys, for the purpose of adding the amount of the transaction to that already in the subtotalizer, but before downward movement of racks 230, plungers 343 are withdrawn to permit free movement of the racks. Further operation of the machine is the same as in a first charge entry, viz: both subtotalizers are reset, thus transferring the setting of the salesmen's subtotalizer to the salesman's retaining device and the setting of the customer's subtotalizer to the slip printing and punching mechanism. This latter mechanism is operated and the differential mechanism is then restored.

*Credit entry.*—When entering money received on account, the customer's account slip is placed upon carriage 338 and a new sales slip is placed upon carriage 229. The sales lever 28 is moved two spaces downwardly to the credit position and value keys representing the amount of the transaction are depressed and also the salesman's lever is adjusted to the desired position. Upon the rotation of crank 1, the credit transaction totalizer 23 is selected because of the angular position of lever 28 which causes the cam slide 302 (Fig. 16) to move upwardly two spaces thus rocking pawl 308 into selecting position. The balance totalizer 20 is also selected for addition by movement of lever 28 causing cam slide 297 (Figs. 10 and 11) to move upwardly two spaces and by this means rocking pawl 101 into engagement with pin 102. The rocking slide 100 which carries this pawl is then actuated by the forward rocking slide cam 98. The particular credit device of the salesmen's total retaining devices is selected by the longitudinal and rotative movements of shaft 157. Movement of lever 28 through the cam 154 (Fig. 1) and lever 155 (Fig. 12), effects the longitudinal shifting of shaft 157 so that certain of the segment gears 158 mesh with the racks 159 of the credit bank. Then rotation of shaft 157 through its connection to the rack 562, which is controlled in its movement by the initial lever, brings the desired retaining device of the bank into operative relation with the set of racks 152 (Fig. 20) which is opposite the credit bank of total retaining devices. All of the above totalizing devices, namely, the special totalizer 23, the balance totalizer 20, and the selected one of the salesmen's retaining devices are added to by the differential movement of racks 36, as previously described.

When the slip carrying table 338 moves into the machine it carries the customer's account slip beneath the plungers 343. The springs 346 of the plungers are then compressed by downward movement of the plate 345 causing certain of the plungers to be carried through the holes in the account slip. By this means the plungers are brought to position to regulate the movement of the driving racks 230 for the customer's subtotalizer 233. Accordingly racks 230 are permitted to move downwardly extents which correspond to the amount represented by the punchings in the customer's account slip. Racks 230 are, as before, driven by the oscillating rod 355, which, when moved downwardly permits pawls 245 to rock out of engagement with racks 401 provided no zero plunger is in the path of these pawls. When one of the pawls 245 engages a depressed plunger it is rocked back to latching position with its respective rack 401 and thereby becomes disengaged from the driving rod 355. During the downward movement of racks 230 the subtotalizer 233 is held in the position in which it is diagrammatically indicated in Fig. 26 by cam 235 (Fig. 32). In this position of the subtotalizer downward movement of racks 230 causes forward or additive rotation of pinions 231 and through these pinions, pinions 232 and segments 234, effects the setting of the type carriers 228 and segments 382 which are carried by the segments 234. These type carriers will therefore be set to the amount and file number represented by the punchings in the customer's account card. The segments are then rocked out of mesh with the gears 232, thus permitting further movement of racks 230 under the control of the value keys to actuate the subtotalizer 233 independently of the segments, and the platen 227 is then moved upwardly to effect an impression from the carriers 228 and 382 on the line 560 of slip 319 (Fig. 42). The platen is then dropped to normal position and the segments 234 are returned to their zero positions by the rod 328 (Fig. 31) entering the V shaped openings 332 in the segments. The subtotalizer is at this time rocked into subtracting connection with racks 230 as indicated by Fig. 28. The racks 230 are now moved downwardly, being controlled in their movement by the value keys thus causing subtotalizer pinions 232 to be rotated as indicated by the arrow in Fig. 28. Therefore a reverse rotation of the pinions 231 occurs according to the extent of downward movement of racks 230 when controlled by the keyboard. Therefore the final setting of pinions 231 will be equal to the difference between the "amount forward" from the customer's account slip and the amount of the transaction. The subtotalizer is then rocked to the normal or resetting position shown in Fig. 25, after which the shaft 325 is rocked slightly by segment gear 328 in order to cause the segments 234 to mesh with pinions 232. While segments 234 and pinions 232 are being meshed cam 360 on the shaft 327 rocks the arms 359 carrying the broad pinions 333 upwardly thus causing the pinions to mesh with racks 334. These racks as shown in Fig. 5 mesh with amount type carriers 361, 335, and file number carriers 383 and are also connected by pins to the slides 336 which carry the punches 337. While the subtotalizer is in this condition it is reset by the segment gear 362 (Fig. 33), as before described. As at this time the pinions 232 are in mesh with the segments 234 the segments will be correspondingly rotated, thereby transferring the final setting of the subtotalizer to the two sets of type carriers 335 and 361 and positioning the punches 337 accordingly. The platen 227 is then operated forcing the plungers 337 through the sales slip and printing the balance of the account on the lines 380 and 381 of the sales slip. Type carriers 228 and 382 are at this time in their upper positions out of operative relation with the platen. The platen is then returned to its normal position and the segments 234 are rocked out of mesh with the pinions 232, but the connection between the segments 234 and the racks 334 is retained. The restoring arms 329 for the segments 234 are now actuated, causing the segments to return to their zero positions and, through the broad pinion connection with racks 334, returning the type carriers 335 and 361 and the punches 337 to zero positions. The resetting spline plate 374 is then returned to its home position by continued rotation of cam 370 and the printed and punched slip is ejected from the machine, the carriage 315 returning to its outer position. The carriage 338 is also returned to its outer position and the old account card may be destroyed as the new account card 320, which is the stub of the sales slip 319, now contains a record of the standing of the customer's account and is filed in place of the old account card.

*Resetting the balance totalizer.*—To reset the balance totalizer, resetting lever 29 is rocked downwardly two spaces to the balance totalizer resetting position and the sales lever is left in its normal position and then crank 1 is rotated. Movement of the resetting lever away from normal position causes cams 545 on shaft 31 (Fig. 58) to lift the key detents, thereby preventing depression of amount keys. Also cams 546 on shaft 31 effect disconnection of racks 36 from racks 52. A cam 5241 (Figs. 1, 52, 55, and 56) on shaft 31 slides resetting cams 500 and 501 into operative relation with the resetting segment 502 which then serves to drive shaft 600 carrying a pinion 601 meshing with the resetting rack 603 for the balance totalizer. Rack 603 meshes with the pinion 940 (Fig. 59), which in turn meshes with the pinion 598 fast on the totalizer shaft 630, thus rotating this shaft and by means of its spline 528 resetting the totalizer pinions 79. Rotation of the pinions 79, through the subtracting pinions 94 and racks 36, shafts 41, rack 401 (Fig. 37), pawls 245, racks 230, gears 276 and 277, sets type wheels 2661 for printing the total. The totalizer is rocked so that its subtracting gears are meshed with racks 117 by cam 521 (Fig. 10). The transaction totalizers are inoperative as cam 522 of shaft 31 shifts arms 118 and 523 free from the transaction totalizer rocking slide 119.

The salesmen's retaining devices are made inoperative during the resetting of the balance totalizer by cam 532 on shaft 31, which shifts clutch 605 (Fig. 53) so that the retaining device driving shaft 172 is not rotated. The check and slip printing and punching mechanism is inoperative as cam 535 (Fig. 52) shifts clutch 504 disconnecting the cam shaft 236 from drive shaft 5. The check feeding mechanism (Fig. 43) is inoperative as rotation of shaft 31, through its pinion 610 (Fig. 13), lifts rack 611, thus rotating cam 614 and by it rocking lever 615 so that clutch 616 is disconnected from the bevel gear 222.

*Resetting of class of transaction totalizers.*—At this resetting operation the resetting lever 29 is rocked downwardly one space to the special totalizer resetting position. The sales lever 28 may be left in its normal or cash position or set to the paid out, charged, or credit positions, depending upon which totalizer it is desired to reset. The one space movement of the resetting lever, as before causes cam 5241 (Fig. 55), carried by the shaft 31, to slide the resetting cams 500 and 501 into operative relation with the segment 502 and the cam 526 (Fig. 52) shifts the spline carrying frame 527 (Figs. 12, 13, and 2), thereby carrying all of the splines 606 (Fig. 14) into operative position with the special transaction totalizer pinions. Then by rotation of resetting shaft 600, rack 608 (Fig. 14), by rotating the shaft of the selected totalizer, through the spline 606 resets the totalizer. The reverse rotation of the totalizer pinions is communicated to the type wheels 2661 of the record strip printing mechanism as when the balance totalizer is reset.

The balance totalizer is made inoperative by cam 520 (Fig. 10) on shaft 31, which serves to shift cams 98 and 521 out of engagement with the balance totalizer rocking slide 100. The salesmen's retaining devices and the check and slip printing and punching mechanism are made inoperative by the same means as are employed when the balance totalizer is reset.

*Resetting of salesmen's total retaining devices.*—When a salesman's total retaining device is reset its setting is transferred to the salesmen's subtotalizer and the latter is then engaged with racks 193 and reset, thus through these racks 401 and 230 setting the detail type carriers to print the total. Before actuating the machine on a salesman's retaining device resetting operation the reset lever 29 is moved downwardly three spaces (Fig. 11). The sales lever is left at its normal or cash position or moved to any of its positions according to what class of retaining device it is desired to reset. The shaft 172 (Figs. 3, 4, 53, and 54) is not disconnected from the driving shafts and therefore serves to actuate the selected retaining device in the usual manner. The desired one of the selected salesman's retaining devices is also selected, as previously described by the initial lever. Movement of the reset lever to the salesman's totalizer position through lever 553 (Fig. 52) shifts shaft 412 (Fig. 46) thus shifting cams 454, 190 and 455 so that the races therein, which normally rock the salesmen's subtotalizer when items are entered, are disengaged from rollers 191 and 1910 and other races in the cams are engaged therewith which serve first to rock the subtotalizer so that its gears 180 engage racks 187, the latter being then moved upwardly as shown opposite cam 173 (Fig. 60). The amount of the salesman's accumulator is thus set on the subtotalizer, which is then rocked so that its pinions 181 are meshed with racks 193, while its pinions 180 remain in mesh with racks 187, then as the yoke 195 is carried downward under the action of cam 197, the subtotalizer will be reset and drive racks 193 downwardly accordingly and thereby set the detail type carriers in position for printing the total. The downward movement of racks 187 serves to reset the salesman's total retaining device which is then returned to its respective bank of retaining devices in the manner before described. The special transaction totalizers remain inoperative as cams 118 and 523 (Fig. 10) on the shaft 2 are held free from the rocking slide 119. The main or balance totalizer is also inoperative as cams 521 and 98 on the drive shaft 2 are held free from rocking slide 100 (Fig. 10). The resetting segment 502 (Figs. 52 and 55) is disengaged from its operating cams 500 and 501 by the movement of the resetting lever 29. The slip printing and punching and the check printing mechanism and the check paper feeding mechanism are inoperative as the shaft 236 (Figs. 5, 13, and 52) is disconnected from the driving mechanism by cam 535 and the paper feed clutch is moved to inoperative position by arm 614 (Fig. 43). The hammer cams of the record strip printer are held in the same operative position, as previously described, as when the main and transaction totalizers are reset.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination with an accounting device and differential mechanism for operating it, of a plurality of plungers, and means for yieldingly projecting the plungers into the path of the differential mechanism, under control of a record material such as a card, and a separate means for controlling the differential mechanism for the purpose of altering the final setting of the accounting device.

2. In a machine of the class described, the combination with an accounting device and differential mechanism for operating it, of a plunger for controlling the movement of the differential mechanism, a movable member for operating the plunger, and a spring between said movable member and the plunger so that operation of the plunger may be prevented if holes in a punched record card are not in register therewith, and a separate means for controlling the differential mechanism for the purpose of altering the final setting of the accounting device.

3. In a machine of the class described, the combination with a totalizer and differential mechanism constructed to actuate said totalizer, of a carriage on which a portion of record material may be placed, a punch connected to each denominational element of said differential mechanism and movable therewith, and means for projecting all of said punches through the record material.

4. In a machine of the class described, the combination with an accounting device and mechanism for differentially operating said accounting device and including rack bars, of a carriage for a record material such as a punch card, plungers mounted in denominational sets on said carriage, and means for moving said carriage and thereby projecting said plungers into the paths of said rack bars under control of said record material, and a separate means for controlling the differential mechanism for the purpose of altering the final setting of the accounting device.

5. In a machine of the class described, the combination with an accounting device, and differentially movable rack bars constructed to actuate said accounting device of a movable carriage for a record material such as a card, spring pressed plungers mounted in said carriage, and means for moving said carriage and thereby projecting said plungers under control of said record material into the paths of said rack bars, and separate means for controlling the differential mechanism for the purpose of altering the final setting of the accounting device.

6. In a machine of the class described, the combination with a totalizer, and differentially movable rack bars constructed to actuate said totalizer, of a movable carriage for a record material such as a card, plungers mounted in said carriage, means for moving said carriage and thereby projecting said plungers, under control of said record material, operating devices for said rack bars, and means for connecting said rack bars to their operating devices, positioned and constructed to be disconnected by said projected plungers.

7. A total retaining device comprising a member having a plurality of tracks or ways, rollers differentially movable in said ways to various positions, and means for retaining the rollers in any of said positions in said member, and means for moving the rollers.

8. A total retaining device comprising a pair of plates movable toward and away from each other and having ways, rollers in said ways, and means for clamping said plates together so that the rollers may be retained in set positions.

9. A total retaining device comprising a plate having a plurality of ways, rollers differentially movable to ten different positions in said ways, means for retaining the rollers in any of said positions, and means for moving the rollers.

10. In a machine of the class described, the combination with a total retaining device comprising a plurality of tracks or ways, and rollers moving in said ways, of a totalizer, differential mechanism for actuating said totalizer, devices for giving said retaining device movements of invariable extents, and connections operated by movement of said rollers for positioning said differential mechanism.

11. In a machine of the class described, the combination with a total retaining device comprising a frame and rollers mounted in said frame and constructed to be given different positions in said frame, of a totalizer, differential mechanism for actuating said totalizer, devices for giving said retaining device movements of invariable extents, and connections from said differential mechanism positioned to be in the path of said rollers.

12. A total retaining device comprising a pair of plates having tracks or ways therein, one plate of each pair being corrugated transversely to the length of said ways, and rollers in said ways and retained against movement by said corrugations.

13. In a machine of the class described, the combination with a plurality of total retaining devices mounted in alinement and each comprising a pair of plates having ways and rollers riding in said ways, of a totalizer, differential mechanism for said totalizer, including elements positioned to be actuated by said rollers, and means for determining which of the total retaining devices shall actuate said differential mechanism elements.

14. In a machine of the class described, the combination with a plurality of total retaining devices, each comprising a pair of plates having ways and rollers in said ways, a frame in which all said retaining devices are mounted in alinement, a totalizer, differential mechanism for actuating said totalizer, and including elements positioned to be actuated by said rollers, and means for moving said retaining device frame and thereby bringing any desired retaining device into operative relation with said retaining device rollers.

15. A total retaining device, comprising a pair of plates provided with a plurality of grooves, rollers movably mounted in said grooves, one of said plates being provided with corrugations extending transversely to the direction of the grooves for the purpose of retaining the rollers in set positions, and coöperating flanges on said plates.

16. In a machine of the class described, the combination with a plurality of type carriers and mechanism for differentially setting the same, individual hammers for certain groups of type carriers, cams for operating the hammers, and means for causing desired ones of the hammers and cams to be in operative or in inoperative relation.

17. In a machine of the class described, the combination with a plurality of type carriers and mechanism for differentially setting the same, individual hammers for certain groups of type carriers, cams for operating the hammers, and devices for controlling the cams so that only desired ones of the hammers are operated.

18. In a machine of the class described, the combination with a plurality of totalizing devices, of a single set of actuators therefor, and means for rocking a desired totalizer into mesh with the actuators, said means comprising; a plurality of pawls, a reciprocable member carrying said pawls, and a cam slide for rocking any one of said pawls into engagement with its respective totalizer.

19. In a machine of the class described, the combination with a plurality of totalizing devices each consisting of two sets of intermeshing gears, of a single set of actuators, and means for rocking a desired totalizer so that either one or the other of its sets of gears is meshed with the actuators, said means comprising; a plurality of pawls, a reciprocable member carrying said pawls, a cam slide for rocking any one of said pawls into engagement with its respective totalizer, and cams for differentially reciprocating said reciprocable member so that the selected totalizer may be rocked to either an adding or subtracting position.

20. In a machine of the class described, the combination with a plurality of plungers, a way for each of the plungers, mechanism for differentially positioning the plungers in their ways, a totalizing mechanism for controlling said differential mechanism, and means for operating the plungers to force the same through material to be punched in any of their different positions.

21. In a machine of the class described, the combination with printing mechanism including type carriers, of a card punching device comprising a plurality of plungers, ways for the plungers, means for differentially setting the plungers and the type carriers of the printing mechanism, and a common means for effecting an impression from the type carriers and operating the plungers for the purpose of punching record material.

22. In a machine of the class described, the combination with a plurality of total retaining devices, of a supporting frame for such devices, said supporting frame constructed to lock said devices against operation while in the supporting frame, means for withdrawing any one of the total retaining devices from the supporting frame and differential mechanism for actuating the selected retaining device.

23. In a machine of the class described, the combination with an accounting device, of a printing mechanism, differential mechanism for operating the accounting device, and the printing mechanism, driving mechanism for the differential mechanism, manipulative devices for controlling the differential mechanism, a resetting device for the accounting device, and a manipulative device adapted to disconnect the differential mechanism from the driving mechanism and connect the resetting device with the driving mechanism whereby operation of the driving mechanism will effect resetting of the accounting device and by it actuate the differential mechanism and thereby the printing mechanism.

24. In a machine of the class described, the combination with an accounting device, of differential mechanism for operating the accounting device, driving mechanism for the differential mechanism, a resetting device for the accounting device, and a manipulative device, having connections to disconnect the differential mechanism from the driving mechanism and to connect the resetting device with the driving mechanism.

25. In a machine of the class described, the combination with an accounting device comprising two sets of intermeshing gears, of a printing mechanism, differential mechanism for operating the accounting device and the printing mechanism, driving mechanism for the differential mechanism, a normally inoperative resetting device for the accounting device, means for normally rocking one of the sets of intermeshing gears into operative relation with the differential mechanism upon operations of the machine, and a manipulative device for connecting the resetting device with the driving mechanism and causing a reverse rocking of the intermeshing gears upon the operation of the machine thereby through the accounting device actuating the differential mechanism in its normal direction.

26. In a machine of the class described, the combination with an accounting device comprising a plurality of denominational elements, of a differentially movable member, a rack for actuating the accounting device, a pawl pivoted to the rack and normally connecting the rack and the movable member, a transfer cam carried by a denominational element of the accounting device, a slidable plate constructed to be moved by the transfer cam, a second cam into operative relation with which said plate is brought by said transfer cam, and means for operating said second cam and thereby moving the plate so that it rocks the pawl out of engagement with the differentially movable member and into engagement with the slide, whereby continued movement of the slide may actuate the rack.

27. In a machine of the class described, the combination with an accounting device, of a differentially movable member, a rack for actuating the accounting device, a pawl normally connecting said member and the rack whereby differential movement of the member is imparted to the rack, means controlled by the accounting device for adjusting the pawl to disconnecting position, and means for then moving the rack an additional distance.

28. In a machine of the class described, the combination with an accounting device, of a differentially movable member, a rack for actuating the accounting device, a pawl normally connecting said member and the rack whereby differential movement of the member is imparted to the rack, means controlled by the accounting device for adjusting the pawl to disconnecting position, a transfer slide to which said pawl is then connected, and means for moving said slide and thereby moving said rack an additional distance.

29. In a machine of the class described, a subtotalizer, a set of racks for actuating the subtotalizer, a resetting mechanism for the subtotalizer whereby the setting of the subtotalizer may be transferred to the racks, and a movable yoke for restoring the racks.

30. In a machine of the class described, the combination with a slip printing and punching mechanism, of an accounting device, a resetting device for the accounting device, and means for making the slip printing and punching mechanism inoperative upon operation of the resetting device.

31. In a machine of the class described, the combination with two sets of differentially movable racks, of a subtotalizer comprising two sets of intermeshing gears, and means for moving the totalizer so that either set of its intermeshing gears may be meshed with either set of racks.

32. In a machine of the class described, the combination with two sets of differentially movable racks, of a subtotalizer comprising two sets of intermeshing gears, and means for rocking the totalizer so that one of its sets of gears mesh with one set of racks and the other of its sets of gears mesh with the other set of racks.

33. In a machine of the class described, the combination with a totalizer, comprising sets of two inter-meshing gears, one set for each denomination, of rack bars for actuating said totalizer, means for engaging corresponding gears of each set with said rack bars for operations of addition, means for resetting said totalizer to "zero" position, devices for engaging the others of said gears with said rack bars for purposes of resetting, and recording mechanism controlled by said rack bars.

34. In a machine of the class described, the combination with a totalizer comprising two inter-meshing gears, of a frame in which said gears are mounted, a rack bar for actuating said totalizer means for rocking said frame in one direction and thereby engaging one of said gears with said rack bar for operations of addition, means for resetting said totalizer gears to "zero" position, means for rocking said frame in a reverse direction and thereby engaging said other gear with said rack bar for operations of resetting, and a recording mechanism actuated by said rack bar.

35. In a machine of the class described, the combination with a totalizing device consisting of two intermeshing sets of gears, a set of actuators, means for engaging either set of gears with said actuators, alining devices for one set of gears, and a cam coöperating with said alining devices to cause the latter to be disengaged from said gears when either set is engaged with the actuators.

36. In a machine of the class described, the combination of a totalizer, of differentially movable actuators therefor, driving mechanism for the actuators, pawls carried by the actuators and connecting the actuators with the driving mechanism, and plungers positioned in the path of said pawls under the control of record cards and adapted to engage and rock the pawls and thereby disconnect the actuators from the driving mechanism.

37. In a machine of the class described, the combination with an operating mechanism, of an accounting device, differentially movable actuators for actuating the same, driving mechanism for the actuators having a constant extent of movement, pawls pivoted on the actuators for coupling the actuators to their driving mechanism, a member movable to an invariable extent by the operating mechanism, plungers adapted to be moved by said member, springs about said plungers so that only those plungers which register with punchings in punched record cards will be projected into the path of movement of said pawls to rock the pawls after the actuators have moved distances determined by the operated plungers, whereby the actuators are disconnected from their driving mechanism.

38. In a machine of the class described, the combination with type carriers, of punched card controlled mechanism for preliminarily setting the type carriers, means for then differentially adjusting backwardly or forwardly said type carriers, and impression mechanism operated after each setting of the type carriers.

39. In a machine of the class described, the combination with two sets of type carriers, of punched card controlled mechanism for preliminarily setting the type carriers, means for then differentially adjusting backwardly or forwardly said type carriers, and impression mechanism operative to print from one set of type carriers after the preliminary setting and from the remaining set after the second setting.

40. In a machine of the class described, the combination with type carriers, of punches movable with the type carriers, of punched card controlled mechanism for preliminarily setting the type carriers and punches, means for then differentially adjusting said type carriers and punches, and impression mechanism coöperating with the type carriers and punches to effect impressions from the type carriers after each adjustment and to make the punches effective to punch a record only on the second adjustment of the same.

41. In a machine of the class described, the combination with a plurality of totalizers having adjustable elements, of accounting mechanism, actuators for the accounting mechanism, and means for bodily moving any totalizer into engagement with the actuators so that the adjustable elements of the totalizer control differential movement of the actuators without effecting differential movement of the adjustable elements.

42. In a machine of the class described, the combination with a totalizer of a differential mechanism having a plurality of denominational elements for operating said totalizer, means for controlling said differential mechanism from two sources, a punch connected to each denominational element of said differential mechanism, a support for record material, means for effecting a relative movement between said punches and support so that a record material may be punched according to the setting of said punches.

43. In a machine of the class described, the combination with printing mechanism for printing on cards, of punching mechanism for punching said cards to represent the amount printed, common means for operating the printing mechanism and the punching mechanism, and mechanism controlled by said cards in subsequent operations of the printing mechanism whereby the printing mechanism is operated to print the amounts represented by the punchings in the cards.

44. In a machine of the class described, the combination of accounting mechanism; printing mechanism; card punching mechanism; and mechanism whereby the accounting mechanism is actuated, and the printing and punching mechanisms operated to respectively print and punch in accordance with the actuation of the accounting mechanism, the punching mechanism punching the cards in such a way that the latter may subsequently control accounting operations of said accounting mechanism.

45. In a machine of the class described, the combination of a totalizer; card punching mechanism; and mechanism whereby when the totalizer is actuated the punching mechanism will be operated to punch cards in such a way that they may control subsequent accounting operations of said totalizer.

46. In a machine of the class described, the combination of differentially adjustable printing mechanism; punching mechanism for punching cards for variously controlling subsequent operations of the printing mechanism; and manipulative mechanism for controlling the adjustment of the printing mechanism, and determining the punchings in the cards by the punching mechanism.

47. In a machine of the class described, the combination of a totalizer; punching mechanism for variously punching cards so that the latter may control subsequent accounting operations of said totalizer; and manipulative mechanism for controlling the actuation of the totalizer, and determining the punchings in the cards by the punching mechanism.

48. In a machine of the class described, the combination of a totalizer; adjustable printing mechanism; punching mechanism for variously punching cards so that the latter may control subsequent accounting operations; and a single set of manipulative devices for determining the actuation of the totalizer, the adjustment of the printing mechanism, and the punching of the cards by the punching mechanism.

49. In a machine of the class described, the combination with a registering mechanism; of a card punching mechanism; and means whereby the punched cards control the registering mechanism and the registering mechanism controls the card punching mechanism.

50. In a machine of the class described, the combination with a main operating mechanism, of punching mechanism for punching holes at different points in record material, totalizing mechanism for controlling the punching mechanism, and differential mechanism operated by the operating mechanism for actuating the totalizing mechanism, the latter being constructed to control the punching mechanism upon each operation of the differential mechanism.

51. In a machine of the class described, the combination with a main operating mechanism, of a punching mechanism for punching holes in cards at different points, an accounting mechanism, a totalizer, and differential mechanism operated by the operating mechanism for actuating the totalizer, the latter being adapted to control the punching mechanism and accounting mechanism upon each operation of the differential mechanism.

52. In a machine of the class described, the combination with a totalizer, of differential means for entering amounts thereon, operating mechanism for the differential means, differential card punching mechanism, and means for transferring the total of the amounts entered on the totalizing mechanism to the card punching mechanism upon each operation of the differential means.

53. In a machine of the class described, the combination with a registering mechanism; of two independent means for entering amounts on the same; and a differential record material punching mechanism controlled by said registering mechanism and constructed to punch holes at different points.

54. In a machine of the class described, the combination with record material punching mechanism for punching holes at different points, of a totalizing mechanism, and means for turning the totalizing mechanism to zero and actuating the punching mechanism accordingly.

55. In a machine of the class described, the combination with a punching mechanism for punching holes in cards at different points, of an accounting mechanism, a totalizer, and means for turning the totalizer to zero and actuating the card punching mechanism and accounting mechanism accordingly.

56. In a machine of the class described, the combination with a totalizer; of a differential card punching mechanism; and manipulative means together with punched cards for controlling the entering of the amounts represented by the manipulative means and the punched cards on the totalizer and for controlling the setting of the punching mechanism accordingly.

57. In a machine of the class described, the combination with a totalizer and differential mechanism constructed to be controlled by said totalizer; of a carriage on which a portion of record material may be placed; a punch connected to each demoninational element of said differential mechanism; and means for moving the carriage to project said punches through the record material.

58. In a machine of the class described, the combination with a totalizer; of means for adding or subtracting amounts therefrom; and a differential card punching mechanism controlled by the totalizer and constructed to punch holes at different points.

59. In a machine of the class described, the combination with a totalizer; of means for controlling the entering of amounts thereon; means independent of said first means controlling addition to or subtraction from the totalizer; and differential card punching mechanism set according to the final position of the totalizer and constructed to punch holes at different points.

60. In a machine of the class described, the combination with a totalizer; of means controlled by punched cards for controlling the entering of amounts upon the totalizer; manipulative means controlling addition to or subtraction from the totalizer; and differential card punching mechanism set according to the final position of the totalizer.

61. In a machine of the class described, the combination with a totalizer; of means for controlling the entering of amounts thereon; means independent of said first means for controlling addition to or subtraction from the totalizer; differential card punching mechanism; and means for turning the totalizer to zero and setting up the amount thereon on the differential card punching mechanism.

62. In a machine of the class described, the combination with a totalizer; of means controlled by punched cards for determining an amount to be entered thereon; manipulative means controlling the addition to or subtraction from the totalizer; differential card punching mechanism; and means for turning the totalizer to zero and setting up the amount thereon on the differential card punching mechanism.

63. A total retaining device comprising; a member having a plurality of tracks or ways rollers differentially movable in said ways to various positions, and adjustable means for retaining the rollers in any of said positions in said ways.

64. A total retaining device comprising; a plate having a plurality of ways; rollers differentially movable to ten different positions in said ways, and adjustable means for retaining the rollers in any of said positions.

65. A total retaining device comprising; a pair of plates having tracks or ways therein, one plate of each pair being corrugated transversely to the length of said ways, rollers in said ways and retained against movement by said corrugations; and means for moving the rollers differentially in said ways.

66. A total retaining device, comprising; a pair of plates provided with a plurality of grooves, rollers movably mounted in said grooves, one of said plates being provided with corrugations extending transversely to the direction of the grooves for the purpose of retaining the rollers in set positions, and coöperating flanges on said plates; and means for moving the rollers differentially in said ways.

67. A total retaining device comprising a pair of plates movable toward and away from each other and having ways, and rollers in said ways; means for clamping said plates together so that the rollers may be retained in set positions; and operating means for effecting the unclamping of said plates so that the rollers may be moved.

68. A total retaining device comprising; a pair of plates having tracks or ways therein, one plate of each pair being corrugated transversely to the length of said ways, and rollers in said ways and retained against movement by said corrugations; and means for separating the tracks or ways for said plates to permit movement of said rollers.

69. In a machine of the class described, the combination with a totalizer having adjustable elements; of an accounting device; actuating mechanism for the accounting device; and means for bodily moving said totalizer to an invariable extent without changing the position of the adjustable elements, the elements by such movement being designed to actuate the actuating mechanism to set up the total on the totalizer on said accounting device.

70. In a machine of the class described, the combination with a totalizer having adjustable elements; of an accounting device; actuating mechanism for the accounting device; means for bodily moving said totalizer to an invariable extent without changing the position of the adjustable elements, the elements by such movement being designed to actuate the actuating mechanism to set up the total on the totalizer on said accounting device; and means for adding or subtracting amounts from the totals set up on the accounting device.

71. In a machine of the class described, the combination with a plurality of totalizers having adjustable elements; of accounting mechanism; actuators for the accounting mechanism; means for bodily moving any totalizer into engagement with the actuators so that the adjustable elements of the totalizer control differential movement of the actuators without effecting differential movement of the adjustable elements; and manipulative means for controlling the actuators for the purpose of altering the setting of the accounting device after the totalizer has controlled the actuators.

72. In a machine of the class described, the combination with a plurality of groups of totalizers each having adjustable elements; of means for selectively moving any desired group of totalizers for selecting any totalizer of the selected group for actuation; accounting mechanism; actuating mechanism for the accounting mechanism; and common means for bodily moving the selected totalizer in any group into engagement with the actuating mechanism so that the adjustable elements of the totalizer control differential movement of the actuators without effecting differential movement of the adjustable elements.

73. In a machine of the class described, the combination with a plurality of total retaining devices each comprising separately movable elements; of a frame carrying all of the total retaining devices; means for moving the frame differentially to select a retaining device for actuation; differentially movable members; means for moving a selected retaining device an invariable distance independent of the other total retaining devices and without affecting the position of the movable elements whereby the entry on the selected retaining device is transferred to the differentially movable members; means for introducing another entry into the machine; and means for adjusting the selected total retaining device to a position determined by both entries.

74. In a machine of the class described, the combination with a totalizer having adjustable elements and constructed to be retained permanently in the machine; of an accounting device; actuating mechanism for the accounting device; and means for bodily moving said totalizer to an invariable extent without changing the position of the adjustable elements, the elements by such movement being designed to actuate the actuating mechanism to set up the total on the totalizer on said accounting device.

75. In a machine of the class described, the combination with an accounting device; of differential mechanism for operating it; a plurality of plungers; an operating mechanism for the differential mechanism; means operated by the operating mechanism for yieldingly projecting the plungers under control of record material, such as a card, into the path of the differential mechanism; and separate means for controlling the differential mechanism for the purpose of altering the setting of the accounting device.

76. In a machine of the class described, the combination with a totalizer having adjustable elements and constructed to be retained permanently in the machine; of an accounting device; actuating mechanism for the accounting device; means for bodily moving said totalizer to an invariable extent without changing the position of the adjustable elements, the elements by such movement being designed to actuate the actuating mechanism to set up the total on the totalizer on said accounting device; and means for adding or subtracting amounts from the totals set up on the accounting device.

77. In a machine of the class described, the combination with an accounting device having differential mechanism for operating it; of operating mechanism for the differential mechanism; a plunger for controlling the movement of the differential mechanism; a movable member actuated by the operating mechanism for operating the plunger; a spring between said movable member and the plunger so that operation of the plunger may be prevented by record cards; and a separate means for controlling the differential mechanism for the purpose of altering the final setting of the accounting device.

78. In a machine of the class described, the combination with a plurality of totalizers having adjustable elements and constructed to be retained permanently in the machine; of accounting mechanism; actuators for the accounting mechanism; means for bodily moving any totalizer into engagement with the actuators so that the adjustable elements of the totalizer control differential movement of the adjustable elements; and manipulative means for controlling the actuators for the purpose of altering the setting of the accounting device after the totalizer has controlled the actuators.

79. In a machine of the class described, the combination with an accounting mechanism; of differential mechanism therefor; a plurality of plungers the operation of which is controlled by punched cards for controlling the extent of movement of said differential mechanism; and manipulative means for also controlling the operation of said plungers when they are not to be controlled by cards.

80. In a machine of the class described, the combination with an accounting mechanism; of differential mechanism therefor; a plurality of plungers the operation of which is controlled by punched cards for controlling the extent of movement of said actuating mechanism; manipulative means for also controlling the operation of said plungers when they are not to be controlled by cards; and means for returning said manipulative means to uncontrolling position at the end of the operation of the machine.

81. In a machine of the class described, the combination with a plurality of plungers; of a movable case for depressing the said plungers, springs permitting movement of the case without movement of the plungers; a carriage for punched cards which control the movement of the plungers by the case; and manipulative means movable at an angle to the direction of movement of the plungers to prevent movement of desired plungers when a card is not on the carriage.

82. In a machine of the class described, the combination with an operating mechanism; of a plurality of plungers; a case moved by the operating mechanism for depressing said plungers; springs permitting movement of the case without movement of the plungers; a carriage for punched cards which control the movement of the plungers by the case; and manipulative means movable at an angle to the direction of movement of the plungers to prevent movement of the desired plungers when a card is not on the carriage.

83. In a machine of the class described, the combination with an operating mechanism; of a plurality of plungers; of a case moved by the operating mechanism for depressing said plungers; springs permitting movement of the case without movement of the plungers; a carriage for punched cards which control the movement of the plungers by the case; manipulative slides movable at an angle to the direction of movement of the plungers to prevent movement of the desired plunger when a card is not on the carriage; and means operated by the operating mechanism for moving the manipulative slides to normal position.

84. In a machine of the class described, the combination with an operating mechanism; of a plurality of plungers; differential mechanism controlled by the plungers; a case operated by said operating mechanism for depressing said plungers; springs permitting movement of the case without effecting depression of the plungers; a carriage normally out of operative relation with the plungers for carrying punched cards which control operation of the plungers; means operated by the main operating mechanism for moving the carriage into operative relation with the plungers; manipulative slides for engaging any of said plungers to prevent movement thereof upon movement of said case; and a yoke moved by the operating mechanism for restoring the manipulative slides to a position permitting operation of the plungers.

85. In a machine of the class described, the combination with a plurality of totalizers; of a plurality of sets of type carriers; means for differentially adjusting any totalizer and the type carriers; independent hammers for certain groups of type carriers; operating means for the hammers; and means for selecting any totalizer to be actuated and as an incident thereto permit the operation of only desired ones of the hammers by the operating means.

86. In a machine of the class described, the combination with a plurality of totalizers; of a plurality of type carriers; mechanism for differentially actuating the type carriers and the selected totalizer; independent hammers for certain groups of type carriers; cams operating the hammers; and an adjustable lever for selecting the totalizer to be actuated and as an incident thereto control said cams so that only desired ones of the hammers will be operated.

87. In a machine of the class described, the combination with a plurality of plungers, the operation of which is controlled by punched cards; of a movable carriage for carrying the cards into operative relation with the plungers; and means for removing the cards from the carriage to deposit them in the machine after they have controlled the plungers.

88. In a machine of the class described, the combination with an operating mechanism; of a differential mechanism driven thereby; a plurality of plungers controlled by punched cards for controlling the movement of the differential mechanism; a carriage normally out of the machine for carrying the punched cards; and means driven by the operating mechanism for moving the carriage into the machine so that the cards are in operative relation with the plungers, for removing the cards from the carriage to deposit the same into the machine and finally return the carriage to normal position.

89. In a machine of the class described, the combination with an operating mechanism; of a differential mechanism driven thereby; a plurality of plungers operated by the operating mechanism and controlled by punched cards for controlling the movement of the differential mechanism; a carriage normally out of the machine for carrying punched cards; and means driven by the operating mechanism for moving the carriage into the machine so that the cards are in operative relation with the plungers and for removing the cards from the carriage to deposit the same into the machine.

90. In a machine of the class described, the combination with a totalizer; of a set of differentially movable actuators therefor; means for giving the actuators two movements of differential extents in the same direction without first moving the actuators in a reverse direction before the second movement is imparted thereto; and two independent means controlling the extents of movement of the actuators.

91. In a machine of the class described, the combination with a totalizer; of differential actuators therefor; two driving means for giving the actuators two movements of differential extents and adapted to be coupled and uncoupled from the actuators; determining means controlling the extent of one differential movement of the actuators when the actuators are being driven by one of the driving means and effecting coupling of the actuators with the other driving means; and other determining means for controlling the second extent of movement of the actuators.

92. In a machine of the class described, the combination with a totalizer; of differential actuators therefor constructed to receive two movements of differential extents; two driving means therefor; pawls carried by the actuators for coupling the actuators with either driving mechanism; determining means for controlling the movement of said actuators when the latter are coupled by said pawls to one driving mechanism and adapted to cause the pawls to couple said actuators with the other driving mechanism; and other determining means controlling the extent of the second movement of the actuators.

93. In a machine of the class described, the combination with a totalizer; of a set of differential actuators therefor; means for giving the actuators two movements of differential extents in the same direction without moving them in a reverse direction before the second differential movement is imparted thereto; plungers, the operation of which is controlled by record cards, for controlling the differential extent of one movement of the actuators; and manipulative means for controlling the differential extent of the other movement.

94. In a machine of the class described, the combination with a totalizer; of differential actuators therefor; two driving means for giving the actuators two movements of differential extents; plungers the operation of which is controlled by record cards for controlling the extent of one movement of the actuators when being driven by one of the driving means and for effecting the coupling of the actuators with the other driving means; and manipulative means for controlling the second extent of movement of the actuators.

95. In a machine of the class described, the combination with a totalizer; of differential actuators therefor constructed to receive two movements of differential extents; two driving means therefor; pawls carried by the actuators by coupling the actuators with either driving mechanism; plungers the operation of which is controlled by record cards for controlling the movement of said actuators when the actuators are coupled to one driving mechanism and adapted to operate said pawls to couple the actuators with the other driving mechanism; and manipulative means controlling the second differential movement of the actuators.

96. In a machine of the class described, the combination with a totalizer, normally standing at zero and adapted to have two items entered thereon at each operation; of a set of differential actuators for entering both amounts on the totalizer without moving the actuators in the reverse direction after the first amount is entered thereon; two independent differential mechanisms each controlling the differential extent of one movement of the actuators; transfer mechanism prepared for effecting required transfers during the second extent of movement of the actuators; and means controlled by the transfer mechanism for giving the actuators an extra step of movement after the actuators have received their second differential movement.

97. In a machine of the class described, the combination with a totalizer; of a set of actuators therefor; pawls carried by said actuators and each pawl having a flange; differentially movable members each having a plurality of notches; means for effecting differential movement of the actuators independently of said differentially movable members to enter an amount on the totalizer; determining means in the path of said pawls for rocking said pawls and thereby causing the flanges on the same to engage the notches in the differentially movable members; and means for then moving the differentially movable members to cause the actuators to enter a second amount on the totalizer.

98. In a machine of the class described, the combination with a totalizer; of a set of actuators therefor; pawls carried by the actuators and having flanges; differentially movable members having a plurality of notches; means for effecting differential movement of the actuators independently of the differentially movable members to enter an amount on the totalizer; plungers which, under the control of record cards, are projected into the path of said pawls, limit the first movement of the actuators and rock the pawls to cause the flanges on the pawls to engage notches in said differentially movable members; means for then moving the differentially movable members to cause the actuators to enter a second amount on the totalizer; and manipulative means for determining the second amount to be entered on the totalizer.

99. In a machine of the class described, the combination with a totalizer; of a set of differentially movable actuators therefor; means for giving the actuators during one operation two movements of differential extents in the same direction without first moving the actuators in a reverse direction before the second movement is imparted thereto; two independent means controlling the extents of differential movement of the actuators; and means for effecting the return of the actuators to normal position during the same operation of the machine.

100. In a machine of the class described, the combination with a totalizer; of a single set of actuators movable to two differential extents in the same direction without moving them in the reverse direction before the second differential movement is imparted thereto; two driving means each constructed to give the actuators one extent of differential movement and return the actuators to normal position after the actuators have been given a second extent of movement; means for coupling one driving means with the actuators and uncoupling the other driving means therefrom after the first extent of movement of the actuators; and means for again effecting the coupling of the actuators with their first driving means after the actuators have been returned to their position in which they were at the end of their first extent of movement.

101. In a machine of the class described, the combination with a totalizer; of a single set of actuators movable to two differential extents in the same direction without being moved in the reverse direction before the second movement is given thereto; two driving means, each constructed to give the actuators one extent of differential movement, and for returning the actuators to normal position after the second extent of movement is imparted thereto; members for coupling the actuators with the driving means; determining means, controlled by punched cards, for determining the first extent of movement of the actuators and causing said members to uncouple the actuators from one driving mechanism and couple them to the other; manipulative means determining the second extent of movement of the actuators; and means for coupling the first driving means with actuators by said pawls when the actuators are returned to the position in which they were at the end of their first extent of movement.

102. In a machine of the class described, the combination with a totalizer, consisting of two sets of intermeshing gears; of a single set of actuators adapted to be given two differential extents of movement in the same direction at each operation; means for always engaging one set of gears of the totalizer with the actuators upon the first extent of movement of the actuator to enter an amount on the totalizer, and for engaging either one of the sets of gears upon the second movement of the actuators to add or subtract an amount on the totalizer.

103. In a machine of the class described, the combination with a totalizer consisting of two sets of intermeshing gears; of a single set of actuators adapted to be given two differential extents of movement in the same direction at each operation; means for always engaging one set of gears of the totalizer with the actuators upon the first extent of movement of the actuator to enter an amount on the totalizer, and for engaging either one of the sets of gears upon the second movement of the actuators to add or subtract an amount on the totalizer; determining means controlled by record cards for controlling one extent of movement of the actuators; manipulative means for controlling the second extent of movement of the actuators.

104. In a machine of the class described, the combination with a totalizer, comprising a pivoted frame, carrying two sets of intermeshing gears; of a single set of actuators therefor; a reciprocating slide; two pawls on said slide for engaging said totalizer frame on either side of its pivot and meshing said set of actuators with either set of gears; and a differentially movable bar for effecting the engagement of the frame with either one of said pawls and holding the other pawl out of engagement therewith.

105. In a machine of the class described, the combination with a totalizer comprising, a pivoted frame carrying two sets of intermeshing gears; of a single set of actuators therefor; a reciprocating slide; two pawls on said slide for engaging said totalizer frame on either side of its pivot to mesh said set of actuators with either set of gears; and a differentially movable bar for effecting the engagement of the frame with either one of said pawls and holding the other pawl out of engagement therewith, or for holding both pawls out of engagement with said frame; and a third pawl for engaging said frame when the pawls on said slide are out of engagement with the frame.

106. In a machine of the class described, the combination with a totalizer, comprising a pivoted frame carrying two sets of intermeshing gears; of a single set of actuators therefor; a reciprocating slide; a cam for moving said slide an invariable distance; two pawls on said slide and engaging said frame on either side of its pivot to mesh said actuators with either set of said gears; a differentially movable bar for effecting the engagement of the frame with either one of the pawls and holding the other pawl out of engagement with the frame; and a hand lever for moving said bar differentially.

107. In a machine of the class described, the combination with a totalizer, comprising two sets of intermeshing gears; of actuators therefor; means for engaging either set of gears with said actuators; a pawl for holding said totalizer out of engagement with the actuators when neither set of gears is to be engaged with the actuators; and cam means controlling the engaging means and said pawl.

108. In a machine of the class described, the combination with a main totalizer, a clerk's subtotalizer, and a customer's subtotalizer; of clerks' totalizers; means, controlled by punched record cards, for entering amounts on the customer's subtotalizer; means for causing any one of the clerks' totalizers to set up the amount thereon on the clerk's subtotalizer; manipulative means; mechanism controlled by the manipulative means for entering amounts on the main totalizer, and one of the clerk's and customer's subtotalizers; means for transferring the amount on the clerk's subtotalizer to the selected clerk's totalizer; and means for printing the amount on a customer's subtotalizer.

109. In a machine of the class described, the combination with a clerk's subtotalizer and a customer's subtotalizer; a clerk's totalizer; means controlled by punched record cards for entering amounts on the customer's subtotalizer; means for setting the amount on the clerk's totalizer upon the clerk's subtotalizer; manipulative means; mechanism controlled by the manipulative means for entering the amount represented by the manipulative means on the clerk's subtotalizer and the customer's subtotalizer; means for transferring the total on the clerk's subtotalizer to a clerk's totalizer; and means for printing the total on the customer's subtotalizer.

110. In a machine of the class described, the combination with a main totalizer, a clerk's subtotalizer and a customer's subtotalizer; of a plurality of clerks' totalizers; means, controlled by punched record cards, for entering amounts on the customer's subtotalizer; means for causing any one of the clerk's totalizers to set up the amount thereon on the clerk's subtotalizer; manipulative means; mechanism controlled by the manipulative means for entering amounts on the main totalizer, and on the clerk's and customer's subtotalizers; means for transferring the amount on the clerk's subtotalizer to the selected clerk's totalizer; differential card punching mechanism; and mechanism for transferring the total on the customer's subtotalizer to the card punching mechanism.

111. In a machine of the class described, the combination with a main totalizer, a clerk's subtotalizer and a customer's subtotalizer; of clerks' totalizers; means controlled by punched record cards, for entering amounts on the customer's subtotalizer; means for causing any one of the clerks' totalizers to set up the amount thereon on the clerk's subtotalizer; manipulative means; mechanism controlled by the manipulative means for entering amounts on the main totalizer, and on the clerk's and customer's subtotalizers; means for transferring the total on the clerk's subtotalizer to the selected clerk's totalizer; differential card punching mechanism; mechanism for transferring the total on the customer's subtotalizer to the card punching mechanism; and mechanism for also printing on the cards punched by the punching mechanism the total amount entered on the customer's subtotalizer.

112. In a machine of the class described, the combination with a main totalizer, a clerk's subtotalizer, and a customer's subtotalizer; of clerks' totalizers; means for entering amounts on the customer's subtotalizer; means for causing any one of the clerks' totalizers to set up the amount thereon on the clerk's subtotalizer; manipulative means; mechanism controlled by the manipulative means for entering amounts on the main totalizer, and on the clerk's and customer's subtotalizers; means for transferring the amount on the clerk's subtotalizer to the selected clerk's totalizer; differential card punching mechanism; and mechanism for transferring the total on the customer's subtotalizer to the card punching mechanism.

113. In a machine of the class described, the combination with a main totalizer, a clerk's subtotalizer and a customer's subtotalizer; of clerks' totalizers; means for entering amounts on the customer's subtotalizer; means for causing any one of the clerks' totalizers to set up the amount thereon on the clerk's subtotalizer; manipulative means; mechanism controlled by the manipulative means for entering amounts on the main totalizer, and on the clerk's and customer's subtotalizers; means for transferring the amount on the clerk's subtotalizer to the selected clerk's totalizer; differential card punching mechanism; mechanism for transferring the total on the customer's subtotalizer to the card punching mechanism; and mechanism for also printing on the cards, punched by the punching mechanism, the total amount entered on the customer's totalizer.

114. In a machine of the class described, the combination with a plurality of groups of totalizers, each group movable as a unit, independent of the remaining groups; of common actuating mechanism for all of the totalizers; manipulative means for determining the group of totalizers to be moved; and common manipulative means for moving the selected group differentially and thereby selecting a totalizer in the group for actuation.

115. In a machine of the class described, the combination with a plurality of groups of clerks' totalizers, each group being used for one class of transactions and one totalizer in each group being used for each clerk; of common actuating mechanism for all the totalizers; a transaction lever for predetermining which group is to be moved; and an initial or clerk's hand lever for differentially moving the group selected to be moved in order to select a totalizer of the selected group for actuation.

116. In a machine of the class described, the combination with a plurality of groups of clerks' totalizers, each group being used for one class of transactions and one totalizer in each group being used by one clerk; of actuating mechanism therefor; manipulative means; means controlled by the manipulative means for moving any one of the groups of totalizers independently of the other groups to select a totalizer for actuation; differentially adjustable means for coupling any desired group of totalizers with said moving means; and a hand lever controlling the differential adjustment of said adjustable means for this purpose.

117. In a machine of the class described, the combination with a plurality of groups of totalizers; of frames one for each group of totalizers and movable independently of each other; racks mounted on said frames; a differentially shiftable and rotatable shaft; segment gears differentially arranged on said shaft; manipulative means controlling the differential shifting of the shaft to mesh the racks on any totalizer frame with corresponding segment gears on the shaft; and manipulative means controlling the differential rotation of the shaft to move the totalizer frame having its racks meshing with its corresponding segment gears and thereby bring the desired totalizer into operative relation with the actuating mechanism.

118. In a machine of the class described, the combination with a plurality of groups of totalizers, each group being movable as a unit independent of the other groups; of common actuating means for all of the totalizers; adjustable means for moving any group of totalizers differentially and normally in position to effect the movement of one of said group of totalizers; manipulative means controlling said adjustable means to select any group of totalizers for movement; other manipulative means for controlling said adjustable means whereby the selected group of totalizers is moved differentially; and means for returning the adjustable means and both manipulative means to normal position at each operation.

119. In a machine of the class described, the combination with a plurality of groups of totalizers, each group movable as a unit independently of the remaining groups; of common actuating mechanism for all the totalizers; manipulative means for determining which group of totalizers is to be moved and normally in position permitting movement of a certain group of totalizers; a hand lever for moving the selected group of totalizers differentially and thereby selecting the desired totalizer to be actuated; and means for restoring the manipulative means to normal position at each operation.

120. In a machine of the class described, the combination with a plurality of groups of clerks' totalizers, each group being assigned to one class of transactions and one totalizer in each group being assigned to one clerk; of frames, one for each group of totalizers; manipulative means; means controlled by the manipulative means for moving any one of the totalizer frames differentially independently of the other frames to select the desired totalizer for actuation; differentially adjustable means for selectively coupling any desired totalizer frame with said moving means and normally in position to couple a certain totalizer frame with said moving means; a manipulative device controlling the adjustment of said adjustable means for this purpose; and means for restoring the adjustable means and manipulative means and device to normal position at each operation of the machine.

121. In a machine of the class described, the combination with a plurality of groups of totalizers, each group movable as a unit independently of the remaining groups; of common actuating mechanism for all of the totalizers; manipulative means for determining the group of totalizers to be moved; common manipulative means for moving the selected group differentially and thereby selecting a totalizer in the group for actuation; and means preventing the operation of the first mentioned manipulative means after the second mentioned manipulative means has been adjusted.

122. In a machine of the class described, the combination with a plurality of groups of clerks' totalizers, each group being used for one class of transactions and one totalizer in each group being used for each clerk; of common actuating mechanism for all the totalizers; manipulative means for predetermining which group is to be moved; and an initial or clerk's hand lever for differentially moving the group selected to be moved in order to select a totalizer of the selected group for actuation; and means locking said manipulative means against operation after said hand lever is adjusted.

123. In a machine of the class described, the combination with a plurality of groups of clerks' totalizers, each group being used for one class of transactions and one totalizer in each group being used by one clerk; of actuating mechanism therefor; manipulative means; means controlled by the manipulative means for moving any one of the groups of totalizers independently of the other groups to select a totalizer for actuation; differentially adjustable means for coupling any desired group of totalizers with said moving means; other manipulative means controlling the differential adjustment of said adjustable means for this purpose; and means for locking said second mentioned manipulative means against operation after the first mentioned manipulative means is operated.

124. In a machine of the class described, the combination with a plurality of groups of totalizers; of frames, one for each group of totalizers and movable independently of each other; actuating mechanism for said totalizers; racks mounted on said frames;

a differentially shiftable and rotatable shaft; segment gears differentially arranged on said shaft; manipulative means controlling the differential shifting of the shaft to mesh the racks on any totalizer frame with corresponding segment gears on the shaft; manipulative means controlling the differential rotation of the shaft to move the totalizer frame having its racks meshing with its corresponding segment gears and thereby bring the desired totalizer into operative relation with the actuating mechanism; and means preventing the operation of the second mentioned manipulative means after the first mentioned manipulative means has been operated.

125. In a machine of the class described, the combination with a plurality of groups of totalizers, each group movable as a unit independently of the other groups; of common actuating means for all of the totalizers; adjustable means for moving any group of totalizers differentially and normally in position to effect the movement of a particular one of totalizers; manipulative means controlling said adjustable means to select any group of totalizers for movement; other manipulative means for controlling said adjustable means whereby the selected group of totalizers is moved differentially; operating means for returning the adjustable means and both manipulative means to normal position at each operation; and means preventing the operation of the first mentioned manipulative means after the second mentioned manipulative means is operated.

126. In a machine of the class described, the combination with a plurality of groups of totalizers, each group movable as a unit independently of the remaining groups; of common actuating mechanism for all of the totalizers; manipulative means for determining the group of totalizers to be moved; a hand lever for moving the selected group differentially and thereby selecting a totalizer in the group for actuation; and transaction totalizers one for each group of totalizers and selected for operation by the first mentioned manipulative means whereby each transaction totalizer accumulates the amounts entered on all the totalizers of its corresponding group.

127. In a machine of the class described, the combination with a plurality of groups of clerks' totalizers, each group being used for one class of transactions and one totalizer in each group being used for each clerk; of common actuating mechanism for all the totalizers; manipulative means for predetermining which group is to be moved; an initial or clerk's hand lever for differentially moving the group of totalizers selected to be moved, in order to select a totalizer of the selected group for actuation; and transaction totalizers one for each group of clerks' totalizers and selected for operation by the first mentioned manipulative means whereby each transaction totalizer accumulates the amounts entered on all the totalizers of its corresponding group.

128. In a machine of the class described, the combination with a plurality of groups of clerks' totalizers, each group being used for one class of transactions and one totalizer in each group being used by one clerk; of actuating mechanism therefor; manipulative means; means controlled by the manipulative means for moving any one of the groups of totalizers independently of the other groups, to select a totalizer for actuation; differentially adjustable means for coupling any desired group of totalizer with said moving means; a hand lever controlling the differential adjustment of said adjustable means for this purpose; and transaction totalizers one for each group of totalizers selected for operation by the first mentioned manipulative means whereby each transaction totalizer accumulates the amount entered on all the totalizers of its corresponding group.

129. In a machine of the class described, the combination with a plurality of groups of totalizers; of frames one for each group of totalizers and movable independently of each other; racks mounted on said frames; a differentially shiftable and rotatable shaft; segment gears differentially arranged on said shaft; manipulative means controlling the differential shifting of the shaft to mesh the racks on any totalizer frame with corresponding segment gears on the shaft; other manipulative means controlling the differential rotation of the shaft to move the totalizer frame having its racks meshing with its corresponding segment gears and thereby bring the desired totalizer into operative relation with the actuating mechanism; and transaction totalizers, one for each group of totalizers, selected for operation by the first mentioned manipulative means whereby each transaction totalizer accumulates the amounts entered on all the totalizers of its corresponding group.

130. In a machine of the class described, the combination with a main totalizer; of a subtotalizer; means for entering one amount on the main totalizer and the subtotalizer; means for entering a second amount on the subtotalizer; a differential card punching mechanism; and means for transferring the total from said subtotalizer to the card punching mechanism.

131. In a machine of the class described, the combination with a main operating mechanism, of a differential card punching mechanism actuated thereby, an accounting device, resetting means for the accounting device and operated by the operating mechanism, and means for making the punching mechanism inoperative upon operation of the resetting means.

132. In a machine of the class described, the combination with a plurality of clerks' total retaining devices, each comprising a pair of parallel plates, having ways and one having flanges, and rollers adjustable in said ways; of a slidable frame for carrying said retaining devices; actuating mechanism for the total retaining devices; a sliding device for engaging the flanges on any desired retaining device and sliding the device out of said frame; and means for moving said frame differentially to bring the flanges of the desired total retaining device into operative relation with said sliding device.

133. In a machine of the class described, the combination with a plurality of clerks' total retaining devices, each comprising a pair of parallel plates, having ways and one having flanges, and rollers adjustable in said ways; of a slidable frame for carrying said retaining devices; actuating mechanism for the total retaining devices; a sliding device for engaging the flanges on any desired retaining device and sliding the device out said frame; means for moving said frame differentially to bring the flanges of the desired total retaining device into operative relation with said sliding device; members having ways in which slide parallel edges of the plates of any total retaining device slid out of said frame; and means for moving one of said members to separate the plates of the selected total retaining device.

134. In a machine of the class described, the combination with a plurality of totalizers, of common means for selectively actuating the same, and two classes of manipulative means operable conjointly to select any one of the totalizers for actuation.

135. In a machine of the class described, the combination with a plurality of totalizers, of common means for selectively actuating the same, and two differentially adjustable manipulative devices operable conjointly to control the selection of any one of the totalizers for actuation.

136. In a machine of the class described, the combination with a plurality of totalizers, of common means for selectively actuating the same, and two separate means operable conjointly to control the selection of any one of the totalizers for actuation.

137. In a machine of the class described, the combination with a plurality of accounting devices, of common means for selectively actuating the same, and two separate means operable conjointly to control the selection of any one of the accounting devices for actuation.

138. In a machine of the class described, the combination with a plurality of accounting devices, of common means for selectively actuating the same, and two classes of manipulative means operable conjointly to select any one of the accounting devices for actuation.

139. In a machine of the class described, the combination with a plurality of totalizers, of common means for selectively actuating the same and normally out of engagement therewith, operating mechanism for operating the actuating means and moving the selected totalizer into engagement with the actuating means, and two classes of manipulative means operable conjointly to select any one of the totalizers for actuation.

140. In a machine of the class described, the combination with a plurality of totalizers, of common means for selectively actuating the same and normally out of engagement therewith, operating mechanism for operating the actuating means and moving the selected totalizer into engagement with the actuating means, and two separate means operable conjointly to select any one of the totalizers for actuation.

141. In a machine of the class described, the combination with a plurality of totalizers, of common means for selectively actuating the same and normally out of operative relation therewith, a main operating mechanism for operating the actuating means and establishing operative relation between the selected totalizer and the actuating means, and two classes of manipulative means operable conjointly to select any one of the totalizers for actuation.

142. In a machine of the class described, the combination with a plurality of totalizers, of common means for selectively actuating the same and normally out of operative relation therewith, a main operating mechanism for operating the actuating means and establishing operative relation between the selected totalizer and the actuating means, and two differentially adjustable manipulative devices operable conjointly to select any one of the totalizers for actuation.

143. In a machine of the class described, the combination with a plurality of groups of totalizers, of common means for selectively actuating the same, manipulative means for selecting the group including the totalizer to be actuated, and manipulative means for selecting the totalizer to be actuated in the selected group.

144. In a machine of the class described, the combination with a plurality of groups of totalizers, of common means for selectively actuating the same, a manipulative device for selecting the group including the totalizer to be actuated, and a manipulative device for selecting the totalizer to be actuated in the selected group.

145. In a machine of the class described, the combination with a plurality of groups of totalizers, of common means for selectively actuating the same, means for selecting the group including the totalizer to be actuated, and independent means for selecting the totalizer to be actuated in the selected group.

146. In a machine of the class described, the combination with a plurality of totalizers, of common means for selectively actuating the same, two classes of manipulative means operable conjointly to select any one of the totalizers for actuation, and means preventing operation of the manipulative means except in a predetermined sequence.

147. In a machine of the class described, the combination with a plurality of totalizers, of common means for selectively actuating the same, two differentially adjustable manipulative devices operable conjointly to control the selection of any one of the totalizers for actuation, and means preventing adjustment of both of said devices except in a predetermined order.

148. In a machine of the class described, the combination with a plurality of totalizers, of common means for selectively actuating the same, a main operating mechanism for actuating said means, two differentially adjustable manipulative devices having a normal position and operable conjointly to control the selection of any one of the totalizers for actuation, and means for restoring said devices to normal position upon each operation of the machine.

149. In a machine of the class described, the combination with a plurality of groups of totalizers, of common actuating means for selectively actuating the same, manipulative means for selecting the group including the totalizer to be actuated, manipulative means for selecting the totalizer to be actuated in the selected group, and additional totalizers, one for each group of the above mentioned totalizers for accumulating the amounts entered on the corresponding group.

150. In a machine of the class described, the combination with a plurality of groups of totalizers, of common actuating means for selectively actuating the same, manipulative means for selecting the group including the totalizer to be actuated, manipulative means for selecting the totalizer to be actuated in the selected group, and additional totalizers, one for each group of the above mentioned totalizers for accumulating the amounts entered on the corresponding group, the additional totalizers being selected for actuation by the first mentioned manipulative means.

151. In a machine of the class described, the combination with amount determining manipulative means, of an accounting device and mechanism constructed to enter amounts on the accounting device under the control of said manipulative means and punched cards.

152. In a machine of the class described, the combination with a totalizer, of differential means therefor, and amount determining manipulative means for controlling in conjunction with punched cards said differential means.

153. In a machine of the class described, the combination with a main operating mechanism, of manipulative means, a totalizer, and differential means therefor operated by said mechanism and constructed at one operation of said mechanism to be actuated under the control of said manipulative means and punched cards.

154. In a machine of the class described, the combination with a main operating mechanism, of manipulative means, a totalizer, differential means for the totalizer constructed to be operated at each operation of the machine either under the control of the manipulative means and punched cards or under the control of only the manipulative means.

155. In a machine of the class described, the combination with keys, and an accounting device constructed to have amounts entered thereon under the control of said keys and punched cards.

156. In a machine of the class described, the combination with a totalizer, of differential means therefor, and keys for controlling in conjunction with punched cards said differential means.

157. In a machine of the class described, the combination with a main operating mechanism, of keys, a totalizer, and differential means therefor operated by said mechanism and constructed at each operation of said mechanism to be actuated under the control of said keys and punched cards.

158. In a machine of the class described, the combination with a main operating mechanism, of keys, a totalizer, differential means for the totalizer constructed to be operated at each operation of the machine either under the control of the keys and punched cards or under the control only of the keys.

159. In a machine of the class described, the combination with amount determining manipulative means, of an accounting device and mechanism constructed to enter amounts on the accounting device under the control of said manipulative means and means having apertures representing amounts.

160. In a machine of the class described, the combination with a totalizer, of differential means therefor, and amount determining manipulative means for controlling in conjunction with means having apertures representing amounts said differential means.

161. In a machine of the class described, the combination with a main operating mechanism, of manipulative means, a totalizer, and differential means therefor operated by said mechanism and constructed at one operation of said mechanism to be actuated under the control of said manipulative means and means having apertures representing amounts.

162. In a machine of the class described, the combination with a differentially adjustable accounting element, and manipulative means for controling in conjunction with apertured means said accounting element.

163. In a machine of the class described, the combination with a differentially adjustable recording element, and manipulative means for controlling in conjunction with apertured means said recording element.

164. In a machine of the class described, the combination with a main operating mechanism, of manipulative means, an accounting element, and differential means therefor operated by said mechanism and constructed at one operation of said mechanism to be actuated under the control of said manipulative means and punched cards.

In testimony whereof I affix my signature in the presence of two witnesses.

JOHN A. WERNER.

Witnesses:
R. C. GLASS,
CARL W. BEUST.

DISCLAIMER.

1,205,298.—*John A. Werner*, Dayton, Ohio. CASH AND CREDIT ACCOUNTING MACHINE. Patent dated November 21, 1916. Disclaimer filed December 3, 1926, by the assignee by mesne assignments, *The National Cash Register Company*.

Hereby disclaims any structure falling within the terms of claim 29, except those in which the actuating racks and resetting mechanism are separate and distinct elements.

[*Official Gazette December 21, 1926.*]